United States Patent
Lambert

(10) Patent No.: US 9,829,631 B2
(45) Date of Patent: Nov. 28, 2017

(54) VERTICAL OUTPUT COUPLERS FOR PHOTONIC DEVICES

(71) Applicant: Skorpios Technologies, Inc., Albuquerque, NM (US)

(72) Inventor: Damien Lambert, Los Altos, CA (US)

(73) Assignee: Skorpios Technologies, Inc., Albuquerque, NM (US)

( * ) Notice: Subject to any disclaimer, the term of this patent is extended or adjusted under 35 U.S.C. 154(b) by 0 days.

(21) Appl. No.: 15/133,898

(22) Filed: Apr. 20, 2016

(65) Prior Publication Data

US 2016/0306110 A1   Oct. 20, 2016

Related U.S. Application Data

(60) Provisional application No. 62/150,139, filed on Apr. 20, 2015, provisional application No. 62/150,144, filed on Apr. 20, 2015.

(51) Int. Cl.
*G02B 6/125* (2006.01)
*G02B 6/132* (2006.01)
(Continued)

(52) U.S. Cl.
CPC .......... *G02B 6/125* (2013.01); *G02B 6/132* (2013.01); *G02B 6/136* (2013.01);
(Continued)

(58) Field of Classification Search
CPC .......... G02B 6/122; G02B 2006/12147; G02B 2006/12104; G02B 6/125; G02B 6/1228;
(Continued)

(56) References Cited

U.S. PATENT DOCUMENTS 4,182,545 A   1/1980 Greer
4,293,826 A   10/1981 Scifres et al.
(Continued)

FOREIGN PATENT DOCUMENTS

CN   101637007 A   1/2010
EP   0696747 A2    2/1996
(Continued)

OTHER PUBLICATIONS

Non-Final Office Action dated Oct. 6, 2016 for U.S. Appl. No. 15/133,920; all pages.
(Continued)

*Primary Examiner* — Thanh Y Tran
*Assistant Examiner* — Antonio Crite
(74) *Attorney, Agent, or Firm* — Kilpatrick Townsend & Stockton LLP

(57) ABSTRACT

A method forms a vertical output coupler for a waveguide that propagates light along a horizontal propagation direction, through a waveguide material that overlies a buried oxide layer. The method includes etching the waveguide to remove a portion of the waveguide. The etching forms at least a first plane that is at an edge of the waveguide, is adjacent to the removed portion of the waveguide, and is tilted at a vertical angle between 20 degrees and 70 degrees with respect to the propagation direction. The method further includes coating the first tilted plane with a reflective metal to form a mirror, such that the mirror reflects the light into a direction having a vertical component.

20 Claims, 39 Drawing Sheets

(51) Int. Cl.
*G02B 6/136* (2006.01)
*G02B 6/42* (2006.01)
*G02B 6/12* (2006.01)

(52) U.S. Cl.
CPC .............. *G02B 2006/12061* (2013.01); *G02B 2006/12097* (2013.01); *G02B 2006/12104* (2013.01); *G02B 2006/12147* (2013.01); *G02B 2006/12169* (2013.01)

(58) Field of Classification Search
CPC ............ G02B 6/136; G02B 6/132; G02B 2006/12097; G02B 6/42; G02B 6/4214; G02B 6/10; G02B 6/26; G02B 6/0055; G02B 2006/12119; G02B 6/12147
USPC .............. 385/14, 88, 132; 257/186; 438/48; 216/24
See application file for complete search history.

(56) References Cited

U.S. PATENT DOCUMENTS

| | | | |
|---|---|---|---|
| 5,190,883 A | 3/1993 | Menigaux et al. | |
| 5,319,667 A | 6/1994 | Dutting et al. | |
| 5,333,219 A | 7/1994 | Kuznetsov | |
| 5,579,424 A | 11/1996 | Schneider | |
| 5,838,070 A | 11/1998 | Naruse et al. | |
| 5,858,814 A | 1/1999 | Goossen et al. | |
| 5,981,400 A | 11/1999 | Lo | |
| 5,987,050 A | 11/1999 | Doerr et al. | |
| 6,101,210 A | 8/2000 | Bestwick et al. | |
| 6,192,058 B1 | 2/2001 | Abeles | |
| 6,229,792 B1 | 5/2001 | Anderson et al. | |
| 6,690,857 B2 | 2/2004 | Zhao et al. | |
| 6,714,566 B1 | 3/2004 | Coldren et al. | |
| 6,728,279 B1 | 4/2004 | Sarlet et al. | |
| 6,768,855 B1 | 7/2004 | Bakke et al. | |
| 6,829,561 B2 | 12/2004 | Keller et al. | |
| 6,846,694 B2 | 1/2005 | Fukushima | |
| 6,888,989 B1 | 5/2005 | Zhou et al. | |
| 6,931,178 B2 | 8/2005 | Saccomanno | |
| 7,058,096 B2 | 6/2006 | Sarlet et al. | |
| 7,257,283 B1 | 8/2007 | Liu et al. | |
| 7,326,611 B2 | 2/2008 | Forbes | |
| 7,392,247 B2 | 6/2008 | Chen et al. | |
| 7,464,147 B1 | 12/2008 | Fakhouri et al. | |
| 7,531,395 B2 | 5/2009 | Blomiley et al. | |
| 7,598,527 B2 | 10/2009 | Behfar | |
| 7,633,988 B2 | 12/2009 | Fish et al. | |
| 7,701,985 B2 | 4/2010 | Webster et al. | |
| 7,939,934 B2 | 5/2011 | Haba et al. | |
| 7,972,875 B2 | 7/2011 | Rogers et al. | |
| 8,025,444 B2 | 9/2011 | Choi | |
| 8,106,379 B2 | 1/2012 | Bowers | |
| 8,254,735 B2 | 8/2012 | Tsai | |
| 8,271,205 B2 | 9/2012 | Reja et al. | |
| 8,290,014 B2 | 10/2012 | Junesand et al. | |
| 8,542,763 B2 | 9/2013 | Forenza et al. | |
| 8,620,230 B2 | 12/2013 | Sanderovitz et al. | |
| 9,268,088 B2 | 2/2016 | Mizrahi et al. | |
| 9,348,099 B2 | 5/2016 | Krishnamurthi | |
| 2001/0010743 A1 | 8/2001 | Cayrefourcq et al. | |
| 2002/0064337 A1 | 5/2002 | Behin | |
| 2002/0097962 A1* | 7/2002 | Yoshimura .............. G02B 6/10 385/50 | |
| 2002/0197013 A1 | 12/2002 | Liu et al. | |
| 2003/0042494 A1 | 3/2003 | Worley | |
| 2003/0081877 A1 | 5/2003 | Nakata et al. | |
| 2003/0128724 A1 | 7/2003 | Morthier | |
| 2003/0129660 A1 | 7/2003 | Zien et al. | |
| 2004/0017962 A1 | 1/2004 | Lee et al. | |
| 2004/0022223 A1 | 2/2004 | Billhartz | |
| 2004/0037342 A1 | 2/2004 | Blauvelt et al. | |
| 2004/0077135 A1 | 4/2004 | Fan et al. | |
| 2004/0111397 A1 | 6/2004 | Chen et al. | |
| 2004/0120675 A1* | 6/2004 | Skinner .............. G02B 6/12002 385/129 |
| 2004/0182914 A1 | 9/2004 | Venugopalan | |
| 2004/0228384 A1 | 11/2004 | Oh et al. | |
| 2004/0245425 A1 | 12/2004 | Delpiano et al. | |
| 2004/0259279 A1 | 12/2004 | Erchak et al. | |
| 2004/0264840 A1 | 12/2004 | Mule et al. | |
| 2005/0033858 A1 | 2/2005 | Swildens et al. | |
| 2005/0058416 A1 | 3/2005 | Hoon Lee et al. | |
| 2005/0082552 A1 | 4/2005 | Fang et al. | |
| 2005/0123244 A1 | 6/2005 | Block et al. | |
| 2005/0202554 A1 | 9/2005 | Luo et al. | |
| 2005/0211465 A1 | 9/2005 | Sunohara et al. | |
| 2005/0211993 A1 | 9/2005 | Sano et al. | |
| 2005/0213618 A1 | 9/2005 | Sochava et al. | |
| 2005/0226284 A1 | 10/2005 | Tanaka et al. | |
| 2006/0002443 A1 | 1/2006 | Farber et al. | |
| 2006/0093002 A1 | 5/2006 | Park et al. | |
| 2006/0104322 A1 | 5/2006 | Park et al. | |
| 2006/0115215 A1 | 6/2006 | Liu | |
| 2006/0285797 A1 | 12/2006 | Little | |
| 2007/0002924 A1 | 1/2007 | Hutchinson et al. | |
| 2007/0280326 A1 | 12/2007 | Piede et al. | |
| 2008/0002928 A1 | 1/2008 | Li | |
| 2008/0266639 A1 | 10/2008 | Melloni et al. | |
| 2009/0016399 A1 | 1/2009 | Bowers | |
| 2009/0020499 A1 | 1/2009 | Nottola et al. | |
| 2009/0087137 A1 | 4/2009 | Doan | |
| 2009/0135861 A1 | 5/2009 | Webster et al. | |
| 2009/0225796 A1 | 9/2009 | Kato | |
| 2009/0267173 A1 | 10/2009 | Takahashi et al. | |
| 2009/0278233 A1 | 11/2009 | Pinnington et al. | |
| 2009/0294803 A1 | 12/2009 | Nuzzo et al. | |
| 2009/0310140 A1 | 12/2009 | Smith et al. | |
| 2010/0040327 A1 | 2/2010 | Deki et al. | |
| 2010/0042668 A1 | 2/2010 | Liang et al. | |
| 2010/0111128 A1 | 5/2010 | Qin et al. | |
| 2010/0114846 A1 | 5/2010 | Lachapelle et al. | |
| 2010/0123145 A1 | 5/2010 | Lee | |
| 2010/0238855 A1 | 9/2010 | Yoshida et al. | |
| 2010/0247037 A1 | 9/2010 | Little | |
| 2010/0302992 A1 | 12/2010 | Zhuang | |
| 2011/0012261 A1 | 1/2011 | Choi et al. | |
| 2011/0032964 A1 | 2/2011 | Sauer et al. | |
| 2011/0044193 A1 | 2/2011 | Forenza et al. | |
| 2011/0085572 A1 | 4/2011 | Dallesasse et al. | |
| 2011/0085577 A1 | 4/2011 | Krasulick et al. | |
| 2011/0085760 A1 | 4/2011 | Han et al. | |
| 2011/0089524 A1 | 4/2011 | Nonagaki | |
| 2011/0158584 A1 | 6/2011 | Popovic | |
| 2011/0163444 A1 | 7/2011 | Hayashi | |
| 2011/0165707 A1 | 7/2011 | Lott et al. | |
| 2011/0205660 A1 | 8/2011 | Komura et al. | |
| 2011/0211604 A1 | 9/2011 | Roscher | |
| 2011/0216997 A1 | 9/2011 | Gothoskar et al. | |
| 2011/0267676 A1 | 11/2011 | Dallesasse et al. | |
| 2012/0001166 A1 | 1/2012 | Doany et al. | |
| 2012/0002694 A1 | 1/2012 | Bowers et al. | |
| 2012/0002931 A1 | 1/2012 | Watanabe | |
| 2012/0057079 A1 | 3/2012 | Dallesasse et al. | |
| 2012/0057609 A1 | 3/2012 | Dallesasse et al. | |
| 2012/0057610 A1 | 3/2012 | Dallesasse et al. | |
| 2012/0057816 A1 | 3/2012 | Krasulick et al. | |
| 2012/0091594 A1 | 4/2012 | Ladesberger et al. | |
| 2012/0120978 A1 | 5/2012 | Budd et al. | |
| 2012/0149148 A1 | 6/2012 | Dallesasse et al. | |
| 2012/0170931 A1 | 7/2012 | Evans et al. | |
| 2012/0189317 A1 | 7/2012 | Heck et al. | |
| 2012/0264256 A1 | 10/2012 | Dallesasse et al. | |
| 2012/0320939 A1 | 12/2012 | Baets et al. | |
| 2013/0037905 A1 | 2/2013 | Shubin et al. | |
| 2013/0051727 A1 | 2/2013 | Mizrahi et al. | |
| 2013/0107741 A1 | 5/2013 | Huang et al. | |
| 2013/0210214 A1 | 8/2013 | Dallesasse et al. | |
| 2013/0216177 A1 | 8/2013 | Tseng | |
| 2013/0251299 A1 | 9/2013 | He et al. | |
| 2013/0301975 A1 | 11/2013 | Spann et al. | |
| 2013/0302920 A1 | 11/2013 | Dallesasse et al. | |
| 2014/0179036 A1 | 6/2014 | Krasulick et al. | |

(56) References Cited

U.S. PATENT DOCUMENTS

| | | | |
|---|---|---|---|
| 2014/0252411 | A1 | 9/2014 | Kang |
| 2014/0319656 | A1 | 10/2014 | Marchena et al. |
| 2015/0097211 | A1 | 4/2015 | Krasulick et al. |
| 2015/0219853 | A1 | 8/2015 | Kumar et al. |
| 2015/0234124 | A1* | 8/2015 | Won .................. G02B 6/30 385/14 |
| 2015/0346429 | A1 | 12/2015 | Lambert et al. |
| 2015/0362673 | A1* | 12/2015 | Zheng ................ G02B 6/122 385/14 |

FOREIGN PATENT DOCUMENTS

| | | |
|---|---|---|
| EP | 2141525 A1 | 10/2008 |
| EP | 2544319 A1 | 1/2013 |
| EP | 2648906 A1 | 10/2013 |
| EP | 2751603 A1 | 7/2014 |
| JP | 09197179 A | 7/1997 |
| JP | 2000089054 A2 | 3/2000 |
| JP | 2003-078530 A | 3/2003 |
| JP | 2006-186446 A | 7/2006 |
| JP | 2007-074202 A | 3/2007 |
| JP | 2010-522372 A | 7/2010 |
| JP | 2010-199972 A | 9/2010 |
| JP | 2013507792 A | 4/2013 |
| JP | 2014525608 A | 9/2014 |
| KR | 20140060547 A | 5/2014 |
| TW | 201140975 A | 11/2011 |
| WO | 03-012512 A1 | 2/2003 |
| WO | 2010/033435 A2 | 3/2010 |
| WO | 2011/046898 A1 | 4/2011 |
| WO | 2012/078361 A1 | 6/2012 |
| WO | 2013/033252 A1 | 3/2013 |
| WO | 2013/109955 A1 | 7/2013 |
| WO | 2014/025824 A2 | 2/2014 |
| WO | 2014/176561 A1 | 10/2014 |
| WO | 2015/054491 A1 | 4/2015 |

OTHER PUBLICATIONS

International Search Report dated May 31, 2011 PCT/JP2011/001032, filed Feb. 23, 2011; all pages.

Analui et al., "A Fully Integrated 20-Gb/s Optoelectronic Transceiver Implemented in a Standard 0.13-mu-m CMOS SOI Technology", IEEE Journal of Solid State Circuits, vol. 41, No. 12, Dec. 2006, retrieved from the Internet <http://ieeexplore.ieee.org/xpls/abs_all.jsp?arnumber=4014595&tag=1>, 11 pages.

Barkai, A., et al., "Efficient Mode Converter for Coupling between Fiber and Micrometer Size Silicon Waveguies." *2007 4th IEEE Interntional Conference on Group IV Photonics* (2007): pp. 49-51.

Coldren et al., "Tunable Semiconductor Lasers: A Tutorial," Journal of Lightwave Technology, Jan. 2004; 22(1):193-202.

Coldren, "Monolithic Tunable Diode Lasers," IEEE Journal on Selected Topics in Quantum Electronics, Nov./Dec. 2000; 6(6):988-999.

Hildebrand et al., "The Y-Laser: A Multifunctional Device for Optical Communication Systems and Switching Networks," Journal of Lightwave Technology, Dec. 1993; 11(12):2066-2075.

Isaksson et al., "10 Gb/s Direct Modulation of 40 nm Tunable Modulated-Grating Y-branch Laser," 10 Gb/s Direct Modulation of 40 nm Tunable Modulated-Grating Y-Branch Laser, in Optical Fiber Communication Conference and Exposition and the National Fiber Optic Engineers Conference, Technical Digest (CD) (Optical Society of America, 2005), paper OTuE2.

Khilo, A., et al., "Efficient Planar Fiber-to-Chip Coupler Based on Two-Stage Adiabatic Evolution." *Optics Express* 18. 15 (2010): pp. 1579-15806.

Kuznetsov et al., "Asymmetric Y-Branch Tunable Semiconductor Laser with 1.0 THz Tuning Range," IEEE Photonics Technology Letters, Oct. 1992; 4(10):1093-1095.

Laroy et al., "Characteristics of the New Modulated Grating Y laser (MG-Y) for Future WDM Networks," Proceedings Symposium IEEE/LEOS Benelux Chapter, 2003, Enschede, pp. 55-58, retrieved from the Internet: <http://leosbenelux.org/symp03/s03p055.pdf>.

Laroy, "New Concepts of Wavelength Tunable Laser Diodes for Future Telecom Networks," [dissertation] Universiteit Gent, 2006 [in Dutch and English], 162 pages.

Laroy, "New Widely Tunable Laser Concepts for Future Telecommunication Networks," FTW-symposium, Belgium, 2002;retrieved from the Internet: <http://photonics.intec.ugent.be/download/pub_1625.pdf>, 2 pages total.

Magno et al., "Multiphysics Investigation of Thermo-optic Effect in Silicon-on-Insulator Waveguide Arrays," Excerpt from the Proceedings of the COMSOL Users Conference 2006, retrieved from the Internet: <http://cds.comsol.com/access/dl/papers/1628/Magno.pdf>, 6 pages total.

Morthier et al., "New Widely Tunable Edge-Emitting Laser Diodes at 1.55 μm Developed in the European IST-project NEWTON," Semiconductor and Organic Optoelectronic Materials and Devices. Edited by Zah, Chung-En; Luo, Yi; Tsuji, Shinji. Proceedings of the SPIE, 2005; 5624:1-8; retrieved from the Internet: <http://photonics.intec.ugent.be/download/pub_1800. pdf>.

Morthier, "Advanced Widely Tunable Edge-Emitting Laser Diodes and Their Application in Optical Communications," [presentation], Ghent University—IMEC, 2000, 23 pages total. Can be retrieved from the Internet: <broadband02.ici.ro/program/morthier_3a.ppt>.

Morthier, "New Widely Tunable Lasers for Optical Networks," NEWTON Project No. IST-2000-28244, Dec. 2001; retrieved from the Internet: <http://www.ist-optimist.unibo.it/pdf/network/projects_public/NEWTON/Deliverables/D01.pdf>, 5 pages total.

Park, H., et al., "A Fiber-to-Chip Coupler Based on Si/SiON Cascaded Tapers for Si Photonic Chips." *Optics Express* 21.24 (2013): pp. 29313-29319.

Passaro et al., "Investigation of Thermo-Optic Effect and Multireflector Tunable Filter/Multiplexer in SOI Waveguides," Optics Express, May 2, 2005; 13(9):3429-3437.

Wesström et al., "Design of a Widely Tunable Modulated Grating Y-branch Laser Using the Additive Vernier Effect for Improved Super-Mode Selection," IEEE 18th International Semiconductor Laser Conference, 2002, 99-100; retrieved from the Internet: <http://photonics.intec.ugent.be/download/pub_1603.pdf>.

Wesström et al., "State-of-the-Art Performance of Widely Tunable Modulated Grating Y-Branch Lasers," Optical Fiber Communication Conference, Technical Digest (CD) (Optical Society of America, 2004), paper TuE2.

Yamada, K.; "Chapter 1: Silicon Photonic Wire Wavefuides: Fundamentals and Applications"; Silicon Photonics II, Topics in Applied Physics 119 (2011); pp. 1-29.

European Supplemental Search Report dated Apr. 9, 2015 for International Patent Application No. 12827040.2-1553 filed on Aug. 29, 2012, all pages.

International Preliminary Report on Patentability dated Mar. 13, 2014 for International Patent Application No. PCT/US2012/052913, filed Aug. 29, 2012; all pages.

International Search Report and Written Opinion dated Feb. 15, 2011 for International Patent Application PCT/US2010/052249 filed on Oct. 12, 2010, all pages.

International Search Report and Written Opinion dated Mar. 21, 2012 for International Patent Application PCT/US2011/061951 filed on Nov. 22, 2011, all pages.

International Search Report and Written Opinion dated Nov. 16, 2012 for International Patent Application PCT/US2012/052913 filed on Aug. 29, 2012, all pages.

International Search Report and Written Opinion dated May 15, 2013 for International Patent Application PCT/US2013/022244 filed on Jan. 18, 2013, all pages.

International Search Report and Written Opinion dated Jan. 29, 2014 for International Patent Application PCT/US2013/053856 filed on Aug. 6, 2013, all pages.

International Search Report and Written Opinion dated Aug. 27, 2014 for International Patent Application PCT/US2014/035563 filed on Apr. 25, 2014, all pages.

International Search Report and Written Opinion dated Jan. 22, 2015 for International Patent Application PCT/US2014/059900 filed on Oct. 9, 2014, all pages.

(56) References Cited

OTHER PUBLICATIONS

International Search Report and Written Opinion dated May 11, 2015 for International Patent Application PCT/US2015/014801 filed on Feb. 6, 2015; all pages.
International Search Report and Written Opinion dated Aug. 27, 2015 for International Patent Application PCT/US2015/032725, filed May 27, 2017; all pages.
International Search Report and Written Opinion dated Jul. 28, 2016 for International Patent Application PCT/US2016/028431, filed Apr. 20, 2016; all pages.
Restriction Requirement for U.S. Appl. No. 12/902,621 dated May 17, 2012, all pages.
Non-Final Office Action for U.S. Appl. No. 12/902,621 dated Sep. 18, 2012, all pages.
Non-Final Office Action for U.S. Appl. No. 12/902,621 dated Apr. 23, 2013, all pages.
Notice of Allowance for U.S. Appl. No. 12/902,621 dated Oct. 2, 2013, all pages.
Non-Final Office Action for U.S. Appl. No. 12/903,025 dated Dec. 29, 2011, all pages.
Final Office Action for U.S. Appl. No. 12/903,025 dated May 16, 2012, all pages.
Non-Final Office Action for U.S. Appl. No. 12/903,025 dated Dec. 5, 2012, all pages.
Final Office Action for U.S. Appl. No. 12/903,025 dated May 29, 2013, all pages.
Notice of Allowance for U.S. Appl. No. 12/903,025 dated Aug. 8, 2013, all pages.
Non-Final Office Action for U.S. Appl. No. 13,040,154 dated Jan. 31, 2012, all pages.
Final Office Action for U.S. Appl. No. 13/040,154 dated May 16, 2012, all pages.
Non-Final Office Action for U.S. Appl. No. 13/040,154 dated Dec. 4, 2012, all pages.
Final Office Action for U.S. Appl. No. 13/040,154 dated Jun. 17, 2013, all pages.
Notice of Allowance for U.S. Appl. No. 13/040,154 dated Jul. 26, 2013, all pages.
Non-Final Office Action for U.S. Appl. No. 13/040,179 dated Mar. 13, 2012, all pages.
Final Office Action for U.S. Appl. No. 13/040,179 dated Aug. 13, 2012, all pages.
Non-Final Office Action for U.S. Appl. No. 13/040,179 dated Dec. 12, 2012, all pages.
Notice of Allowance for U.S. Appl. No. 13/040,179 dated Jun. 12, 2013, all pages.
Non-Final Office Action for U.S. Appl. No. 13/040,181 dated May 22, 2012, all pages.
Final Office Action for U.S. Appl. No. 13/040,181 dated Dec. 5, 2012, all pages.
Notice of Allowance for U.S. Appl. No. 13/040,181 dated Jun. 16, 2014, all pages.
185. Restriction Requirement for U.S. Appl. No. 13/040,184 dated Dec. 21, 2012, all pages.
Non-Final Office Action for U.S. Appl. No. 13/040,184 dated Apr. 23, 2013, all pages.
Notice of Allowance for U.S. Appl. No. 13/040,184 dated Oct. 4, 2013, all pages.
Notice of Allowance for U.S. Appl. No. 13/076,205 dated Sep. 19, 2012, all pages.
Notice of Allowance for U.S. Appl. No. 13/112,142 dated Mar. 20, 2012, all pages.
Non-Final Office Action for U.S. Appl. No. 13/527,394 dated Aug. 31, 2012, all pages.
Notice of Allowance for U.S. Appl. No. 13/527,394 dated Jan. 29, 2013, all pages.
Non-Final Office Action for U.S. Appl. No. 13/869,408 dated Aug. 30, 2013, all pages.
Notice of Allowance for U.S. Appl. No. 13/869,408 dated Jan. 6, 2014, all pages.
Non-Final Office Action dated Sep. 2, 2014 for U.S. Appl. No. 13/597,117, filed on Aug. 28, 2012; all pages.

\* cited by examiner

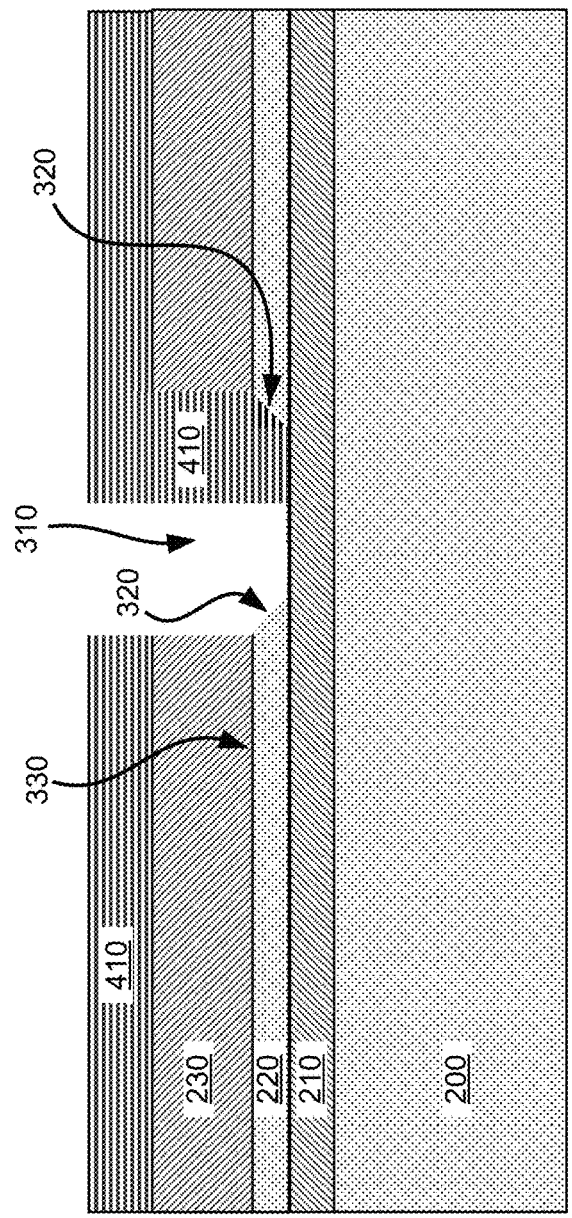
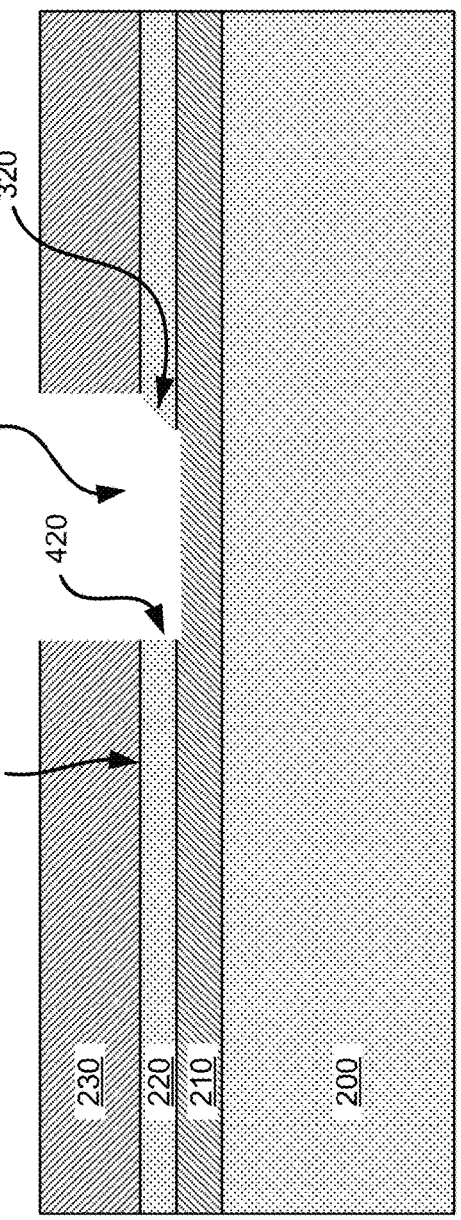
FIG. 4
FIG. 5

VERTICAL OUTPUT COUPLERS FOR PHOTONIC DEVICES

CROSS-REFERENCE TO RELATED APPLICATIONS

This application is a non-provisional application of, and claims the benefit of priority to, U.S. Provisional Patent Application Nos. 62/150,139, filed Apr. 20, 2015, and 62/150,144, filed Apr. 20, 2015. Both of the above-identified patent applications are incorporated by reference in their entireties for all purposes.

The following three patent applications (including this one) are being filed concurrently, and the entire disclosure of each application is incorporated by reference into this application for all purposes:
U.S. patent application Ser. No. 15/133,898, filed Apr. 20, 2016, entitled "VERTICAL OUTPUT COUPLERS FOR PHOTONIC DEVICES";
U.S. patent application Ser. No. 15/133,920, filed Apr. 20, 2016, entitled "BACK SIDE VIA VERTICAL OUTPUT COUPLERS"; and
International application PCT/US2016/028431, filed Apr. 20, 2016, entitled "VERTICAL OUTPUT COUPLERS FOR PHOTONIC DEVICES".

FIELD OF THE INVENTION

This application relates to vertical output couplers for photonic devices, such as, for example, waveguides manufactured using wafer-based microelectronic processes.

BACKGROUND

On-wafer, in-line testing of output light power and spectrum of Photonic Integrated Circuits (PICs) can be challenging, especially for wide spectral band applications. One challenge relates to the fact that light is typically routed in the plane of the wafer through waveguides. It is difficult to measure or extract such light for testing purposes while PIC chips are still in wafer form, without diverting the light away from a surface of the wafer.

SUMMARY OF THE INVENTION

In an embodiment, a method forms a vertical output coupler for a waveguide that propagates light along a horizontal propagation direction, through a waveguide material that overlies a buried oxide layer. The method includes etching the waveguide material to form the waveguide, and etching the waveguide material to remove at least a first portion of the waveguide. The etching forms at least a first tilted plane in the waveguide material, and a space between an unetched portion of the waveguide and the first tilted plane. The method further includes coating the first tilted plane with a reflective metal to form a tilted mirror, and depositing an index matching material into the space between the unetched portion of the waveguide and the tilted mirror. Light propagating through the waveguide into the space continues through the index matching material to the tilted mirror, and the tilted mirror reflects the light upwardly.

In an embodiment, a method forms a vertical output coupler for a waveguide that propagates light along a horizontal propagation direction, through a waveguide material that overlies a buried oxide layer. The method includes etching the waveguide material to form the waveguide, and etching the waveguide material to remove at least a first portion of the waveguide. The method further includes etching the buried oxide layer to form a recess in an area where the first portion of the waveguide was removed and the buried oxide layer was etched, and bonding a chip within the recess. The method further includes etching a side of the chip that faces an unetched portion of the waveguide to form a tilted plane, coating the tilted plane with a reflective metal to form a tilted mirror, and depositing an index matching material into a space between the unetched portion of the waveguide and the tilted mirror. Light propagating through the waveguide continues through the index matching material to the tilted mirror, and the tilted mirror reflects the light upwardly.

In an embodiment, a method forms a vertical output coupler for a waveguide that propagates light along a horizontal propagation direction, through a waveguide material that overlies a buried oxide layer. The method includes etching the waveguide to remove a portion of the waveguide. The etching forms at least a first plane that is at an edge of the waveguide, is adjacent to the removed portion of the waveguide, and is tilted at a vertical angle between 20 degrees and 70 degrees with respect to the propagation direction. The method further includes coating the first tilted plane with a reflective metal to form a mirror, such that the mirror reflects the light into a direction having a vertical component.

In an embodiment, a method forms a vertical output coupler for a waveguide formed of a waveguide material that is disposed within a layer stack on a top surface of a wafer. The method includes defining a via photoresist mask on a back surface of the wafer. The via photoresist mask exposes a via shape on the back surface of the wafer and protects other surfaces of the back surface of the wafer. The method further includes etching through a portion of the wafer where the via shape is exposed, to form a via that exposes the waveguide material, and etching the waveguide material to remove at least a first portion of the waveguide. The etching forms at least a first tilted plane in the waveguide material. The method further includes removing the via photoresist mask, and coating the first tilted plane with one or more reflective layers, to form a tilted mirror in contact with the first tilted plane in the waveguide material. The tilted mirror forms the vertical output coupler such that light propagating through the waveguide is deflected by the tilted mirror, exiting the waveguide.

BRIEF DESCRIPTION OF THE DRAWINGS

FIG. 4 illustrates a structure formed by applying photoresist to the wafer of FIG. 3, exposing one tilted crystal plane on one side of a window, and covering the other tilted crystal plane with photoresist, in accord with an embodiment.

FIG. 5 illustrates a structure formed by removing the exposed, tilted crystal plane shown in FIG. 4 by etching, in accord with an embodiment.

DETAILED DESCRIPTION

Figure 1:
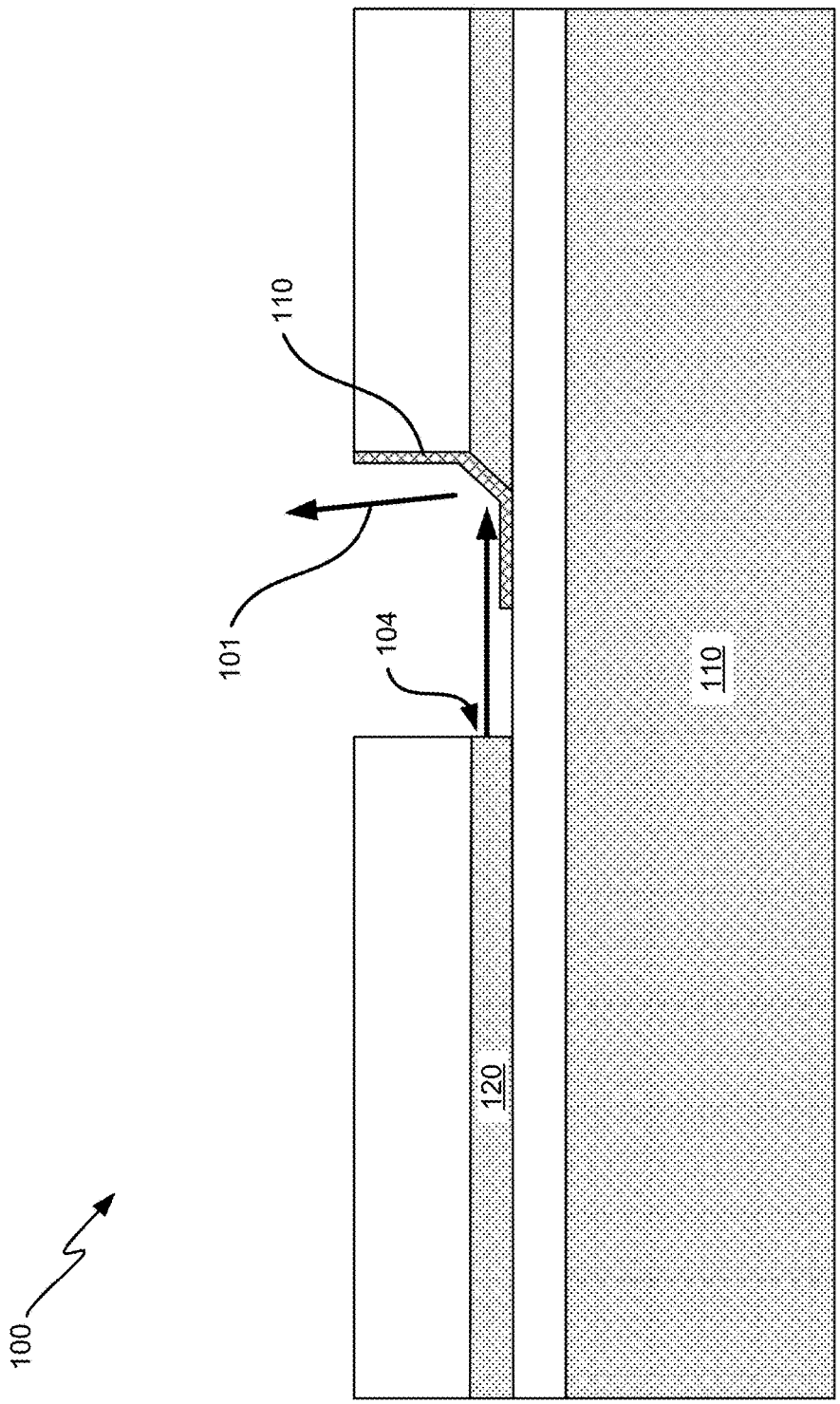
FIG. 1 schematically illustrates a first arrangement that includes a mirror that acts as a vertical output coupler, extracting light from a waveguide on a substrate, in accord with an embodiment.

FIG. 1 schematically illustrates a first arrangement 100 that includes a mirror 110 that acts as a vertical output coupler, extracting light 101 from a waveguide 120 on a substrate 130. Light traveling in waveguide 120 exits the waveguide at a vertical surface 104, travels through free space, and reflects off mirror 110. Vertical surface 104 may be covered by an anti-reflective (AR) coating.

Arrangement 100, FIG. 1, as well as other arrangements described below, can be used to deflect light originating in a waveguide, outwardly into free space. This can be useful for several purposes.

For example, in testing of PICs in wafer form, light that is diverted into free space can be directed toward a fiber optic probe that is monitored by test equipment. It is advantageous in these applications that the fiber optic be mechanically independent of the PIC so that a wafer with a large number of PICs available for testing can be moved relative to the fiber optic probe (e.g., similar to semiconductor integrated circuit testing). In some testing cases, light output can be monitored on a relative basis, that is, it may suffice to test for the presence of some amount of light reaching a fiber optic probe, with optical losses associated with the reflecting arrangement, the fiber probe, scattering and the like not considered critical. The light detected by the probe can be considered a known fraction of the light in a particular path of the PIC.

In another example, light that is diverted into free space can also be utilized as the output of the PIC, that is, such light can be captured by into optics associated with a package. In this case, losses, scattering and the light may require tight control to maximize light output from the PIC and in the case of high powered PICs (e.g., laser devices) to minimize heat that will be generated wherever losses occur. It is possible to form PICs with some light paths leading to mirrored arrangements suitable for testing purposes, while other light paths are optimized for low losses, as discussed below.

Figure 46:
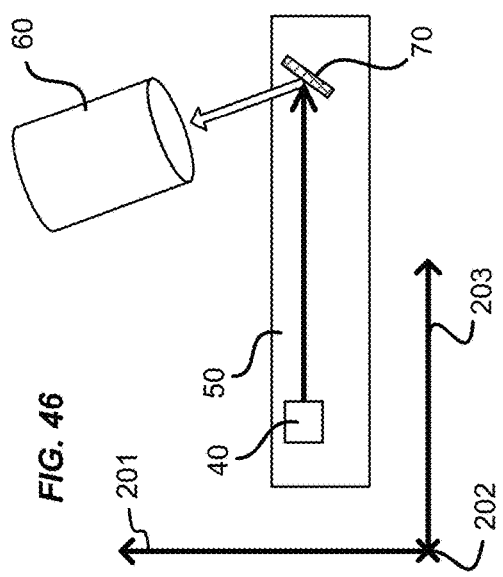
FIG. 46 is a schematic cross-section illustrating a photonic integrated circuit (PIC) that includes a mirror for deflecting light into free space, in accord with an embodiment.

FIG. 46 is a schematic cross-section illustrating a PIC 50 that includes a mirror 70 for deflecting light into free space. In FIG. 46, light transmitted in free space is indicated by an open arrow while light guided through one or more waveguides is indicated by a solid arrow. Light may originate in a gain chip 40, and/or may be manipulated by other optical components within PIC 50. The light transmits toward mirror 70 and is reflected upward into free space where it is captured by optics 60 (e.g., a fiber optic or package optics). When mirror 70 is the main mechanism for getting light out of PIC 50, mirror 70 is advantageously optimized for minimal losses and scattering, as discussed further below. Also illustrated is a normal axis 201 in a vertical direction on the page, and a horizontal axis 202. Normal axis 201 points in a normal direction from a front surface of the PIC. A lateral axis 203 points into the page, as illustrated.

Figure 47:
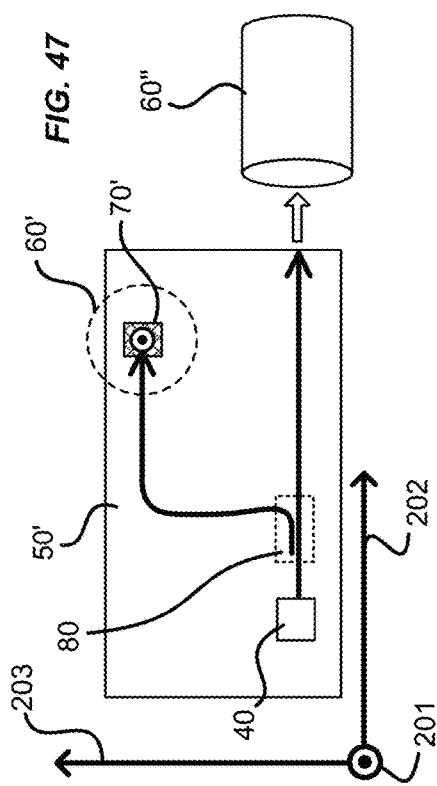
FIG. 47 schematically illustrates a PIC that includes a splitter and a mirror, in accord with an embodiment.

FIG. 47 schematically illustrates a PIC 50' that includes a splitter 80 and a mirror 70'. FIG. 47 is a plan view (note that axes 201 and 203 are exchanged relative to FIG. 46). Splitter 80 diverts a fraction (usually a small fraction such as 5%-10%) of light from gain chip 40 into a waveguide that leads to a mirror 70'. Mirror 70' deflects the light split off in splitter 80, into free space where it may be captured by fiber probe 60', shown in ghost outline. The arrangement by which light is output through mirror 70' can be considered a test node for assessing performance of PIC 50'. The larger fraction of light, not diverted by splitter 80, travels to a different location where it is captured by package optics 60". In this embodiment, mirror 70' need not be optimized for low losses, scattering and the like as a small fraction of optical output gathered by fiber probe 60' can suffice to test the performance of PIC 50', while the output gathered by package optics 60" can be considered the primary output of PIC 50'.

Returning to FIG. 1, one issue associated with first arrangement 100 is that a beam of light traveling past surface 104 may diverge in the free space between surface 104 and mirror 110. Another issue is that surface 104 may be dry etched and/or rough, resulting in scattering losses. Further, it may be hard to control certain qualities of a vertically-deposited AR-coating (e.g., shadowing effects and non-uniform thickness can occur) on surface 104.

Chip singulation (e.g., during a dicing process) can generate sidewalls that are rough, which may generate a need for possibly expensive, chip-level polishing and/or AR-coat for edge coupling. In some embodiments, a process enabling light propagation in a direction away from the wafer/chip plane can significantly reduce manufacturing costs because a need for polishing is reduced or eliminated. The light could be diverted to an angle that is close to normal to the chip's surface, or any angle between 90 and 0 degrees from normal. In these and other embodiments, AR-coating can be performed at wafer level (i.e., processing all chips on a wafer at once, rather than repeating the process for each chip).

Embodiments relate to forming a vertical coupler that can extract light from a waveguide in a wafer. In some embodiments, reflections and/or loss are reduced and/or minimized. In some embodiments, the vertical coupler is manufacturable with standard integrated circuit process modules. In some embodiments, a reflective crystal plane (tilted surface) is formed on a waveguide at 54.7 degrees from the wafer plane on a front side of the wafer. In these and other embodiments, reflective metal may be deposited on the tilted surface, and a waveguide bridge is formed (e.g., of amorphous silicon) between the waveguide and mirror.

The present disclosure and appended claims use relative position terminology such as "up," "down," "above," "below," "height," "depth," "overlying," "underlying," "top," "bottom" and the like. All such terms are to be understood in the context of the structures shown in FIGS. 1-11, 14-19, 21, 22, 24-27, 30, 31, 36, 39, 40, 42 and 43 in the orientation in which these drawings are labeled. That is, with reference to FIG. 2 for example, layer stack 209 is on a top surface of substrate 200; nothing is shown beneath a bottom surface of substrate 200. Substrate 200 is at the bottom, layers 230, 220, and 210 successively overlie substrate 200. And, with reference to FIG. 14, antireflective coating 550 is the uppermost or top layer, and is above layer 945; waveguide bridge 540 is at the same height as waveguide layer 220; metal 470 overlies adhesion liner 460, and the like. When a "front" surface of a wafer is referenced, this is understood as meaning the surface that is shown above a substrate layer, while a "back" surface of a wafer is understood as meaning a surface that is shown below the substrate layer. Also, the drawings are not to any particular scale, and features therein may not be drawn in proportion to one another, but may be exaggerated for clarity of illustration.

In some embodiments, a process for creating a vertical coupler comprises one or more steps of:

Forming a recess in cladding that overlies a waveguide.
Etching the waveguide to form tilted crystal planes.
Etching a waveguide to form a vertical facet; leaving a tilted plane.
Coating the tilted plane with reflective metal.
Filling the recess with a suitable first material (e.g., $SiO_2$) and planarizing the surface.
Etching back the first material within the recess to form a bridge support.

Filling the recess with a suitable index matching material (e.g., amorphous silicon (a-Si)) and planarizing the surface.

Etching back the index matching material to from a bridge.

Patterning the bridge for lateral confinement of an optical beam.

AR-coating the top surface.

Etching one or more vias (e.g., through-silicon vias (TSV) to expose a silicon waveguide).

Creating a tilted surface in the silicon waveguide.

Coating the tilted surface with metal.

Plugging (e.g., filling) the one or more vias.

In some embodiments, advantages related to the methods and devices disclosed include one or more of:

Light that propagates through a waveguide (e.g., in the in-wafer plane) may be reflected into an angle that is within 30 degrees of a normal angle from a surface of the wafer. In embodiments, the angle is 19.4 degrees from normal.

AR-coating on vertical facets may be eliminated because uniformity and shadowing effects are reduced and/or eliminated.

A wafer-level process (e.g., similar to and compatible with typical integrated circuit processing) can be applied to create an output coupler.

Reduction and/or elimination of free space propagation loss (e.g., beam divergence) may be provided by guiding light through a bridge of an index matching material.

A highly reflective metal coating can be formed inside a TSV to improve light reflection.

Reflection and/or losses of various origins may be reduced. In particular, light scattering at vertical sidewalls may be reduced and/or eliminated.

Certain thin membranes (e.g., anti-reflective coatings) are prevented from breaking.

Simplified, low cost vertical couplers can be fabricated for test nodes while main outputs of a PIC are processed differently to form couplers for lowest optical reflections and/or losses.

Embodiments are now described to enable one skilled in the art to understand and practice techniques for forming vertical couplers. Although many illustrated embodiments are shown forming a single instance of a structure, it is understood that the instance shown is part of a wafer with multiple instances of the structure, being processed to produce all of the instances at the same time. Thus, it is also understood that references to processing steps being performed on or to "the wafer" represent all such instances being processed at the same time, as will be readily understood by one skilled in the art.

Figure 2:
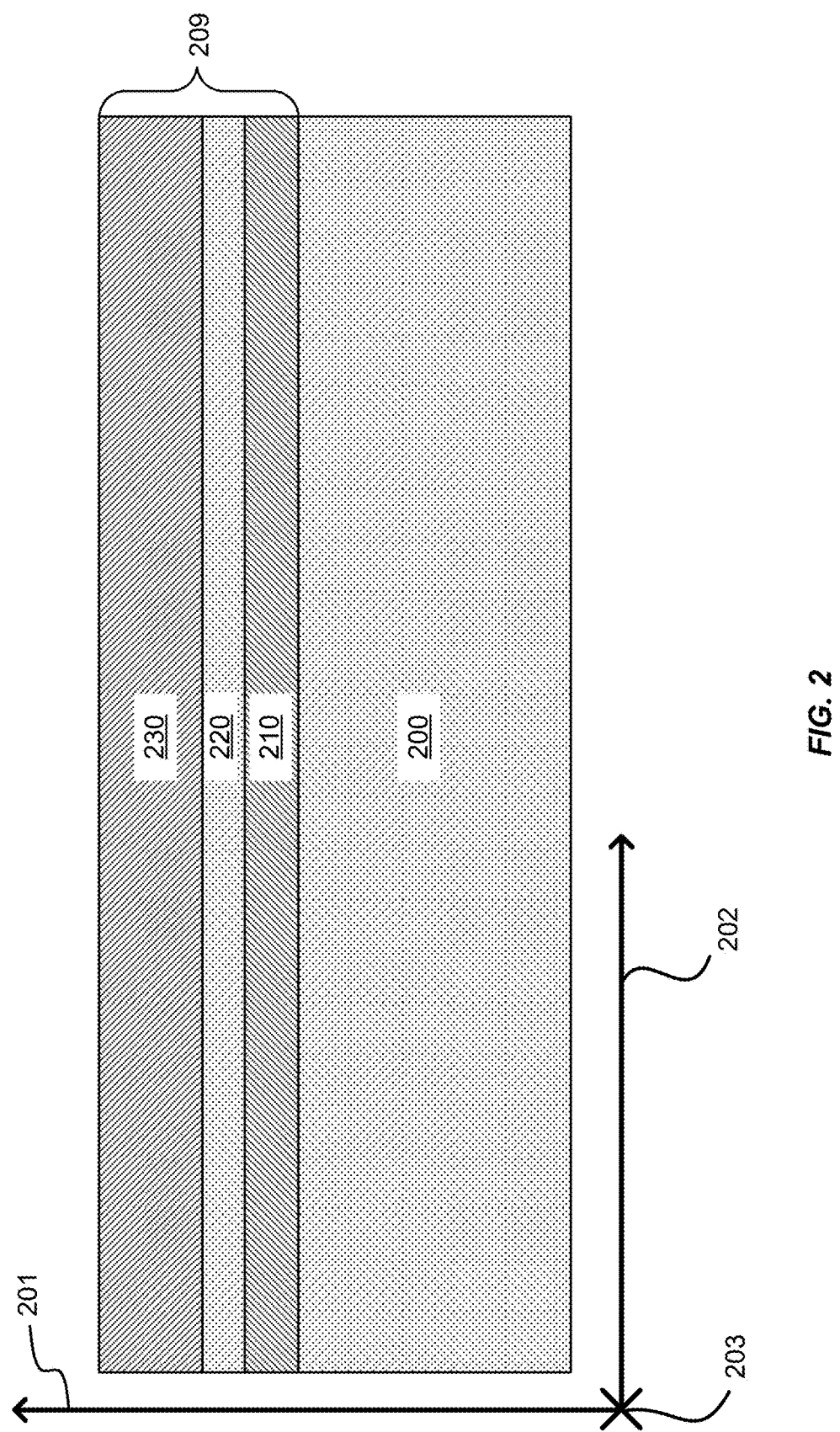
FIG. 2 depicts a wafer substrate 200 with depositions of layers, in accord with an embodiment.

FIG. 2 depicts a cross-sectional view of a wafer substrate 200 with depositions of layers involved in many of the following descriptions. A waveguide layer 220 is buried between a buried oxide (BOX) layer 210 and a cladding (e.g., SiO$_2$) layer 230. In some embodiments, BOX layer 210 is made of SiO$_2$ so that one or more waveguides formed in layer 220 represent structures in what may be called a device layer, and substrate 200 may be called a handle layer or handle portion, of a silicon-on-insulator (SOI) wafer. The one or more waveguides are typically fashioned from waveguide layer 220 by photolithography and etching before cladding layer 230 is deposited such that the waveguides are buried between BOX layer 210 and cladding layer 230. In some embodiments, waveguide layer 220 has a height (e.g., vertical, in the orientation of FIG. 2) equal to or less than 12, 10, 8, 5, 4, 3, 2, 1.7, 1.6, or 1.5 µm. BOX layer 210 is typically used for cladding, electrical insulation and mechanical support, and as such its thickness may not be critical, but thicknesses in the range of 0.25 to 5 µm are typical. In some embodiments, cladding layer 230 is 5 to 6 µm thick.

FIG. 2 can be considered to show a front or side surface of substrate 200 and the layers thereon. Layers 210, 220, 230 and/or any other layers disposed on a top surface of substrate 200 are sometimes referred to collectively as a layer stack 209. For continuity and simplicity, the reference numerals used for each layer will be used throughout the present disclosure, even when the layers are modified by etching or other processes. Also illustrated are normal axis 201 in a vertical direction on the page, horizontal axis 202, and lateral axis 203. Normal axis 201 points in a normal direction from the front surface of the wafer. In some of the structures discussed below, light is guided in waveguide layer 220 along horizontal axis 202.

Figure 3:
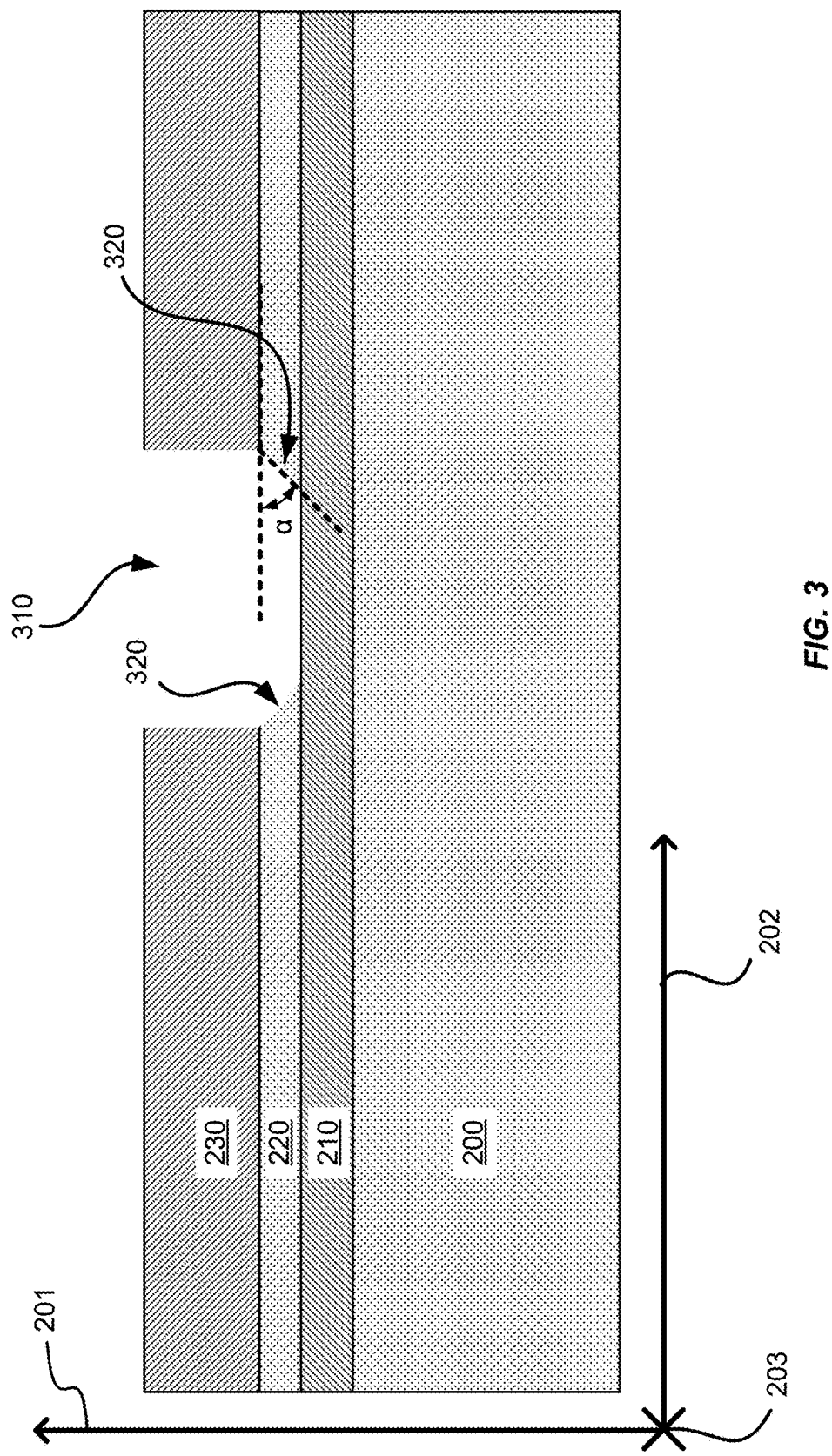
FIG. 3 illustrates a structure formed from the layers illustrated in FIG. 2, with a window opened in a cladding layer by an etch that is selective to Si, in accord with an embodiment.

FIG. 3 illustrates a structure formed from the layers illustrated in FIG. 2, with a recess 310 opened in cladding layer 230 by an etch that is selective to Si, that is, the etch removes cladding layer 230 at a much higher rate than it removes waveguide layer 220. After removal of cladding layer 230, an alkaline etch (e.g., KOH or tetramethylammonium hydroxide (TMAH)) removes waveguide layer 220 to form tilted crystal planes 320. That is, the etchants listed above, and others, tend to etch preferentially along specific Si crystal planes so that crystal planes 320 are defined along a known tilt angle α relative to a top surface 330 of waveguide layer 220. Depending on variables such as etchant, etch conditions such as concentration and temperature, and a crystal structure of waveguide layer 220, the angle α can vary. In some embodiments, the waveguide is crystalline silicon etched along the {111} plane, such that α=54.7 degrees. But other semiconductors having different lattice structures, and/or different etchants or etch conditions, could be used and may generate different angles. Angles that are relatively close to 45 degrees are advantageous, because they will reflect light that was originally transmitted horizontally, into a near-vertical angle. However, light angles deviating by as much as about 30 degrees from vertical are useful, and mirror angles from about 30 to 60 degrees will provide these light angles (see FIG. 45).

Figure 6:
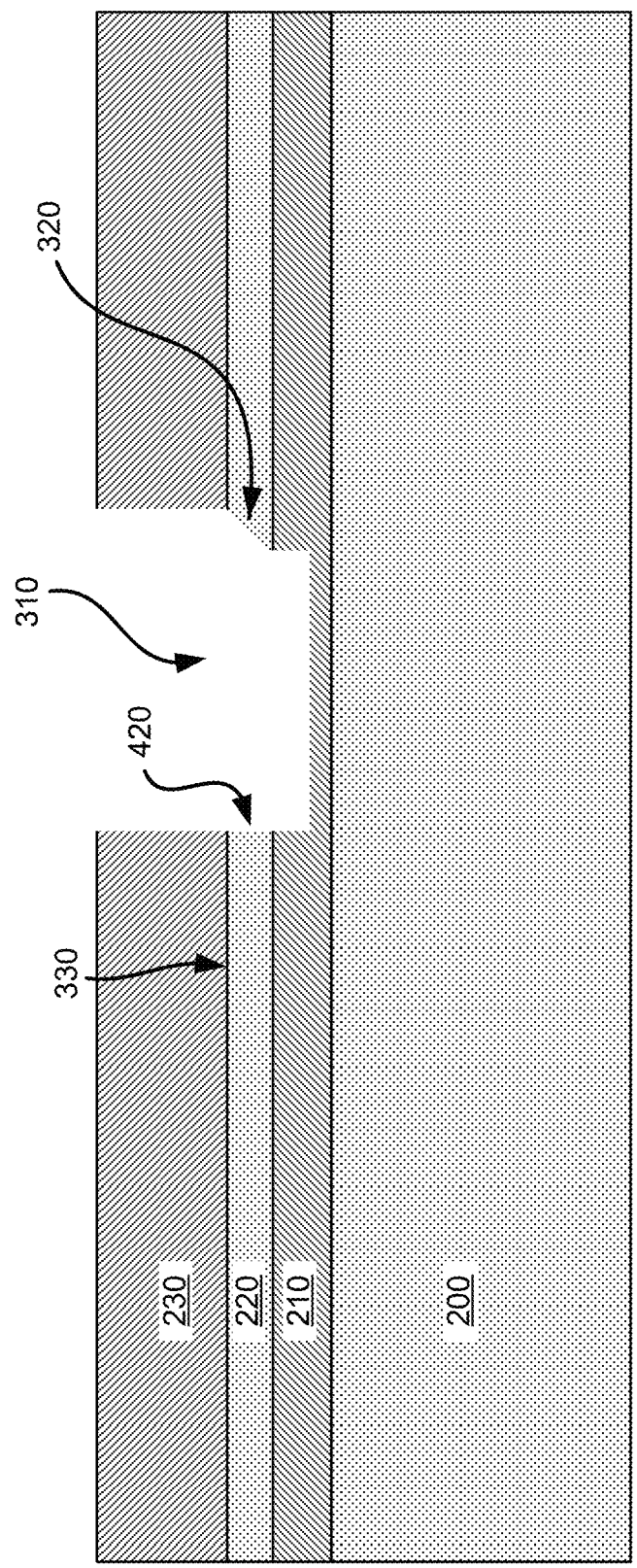
FIG. 6 illustrates a structure formed by etching a BOX layer with an etch that is selective to Si, in accord with an embodiment.
Figure 7:
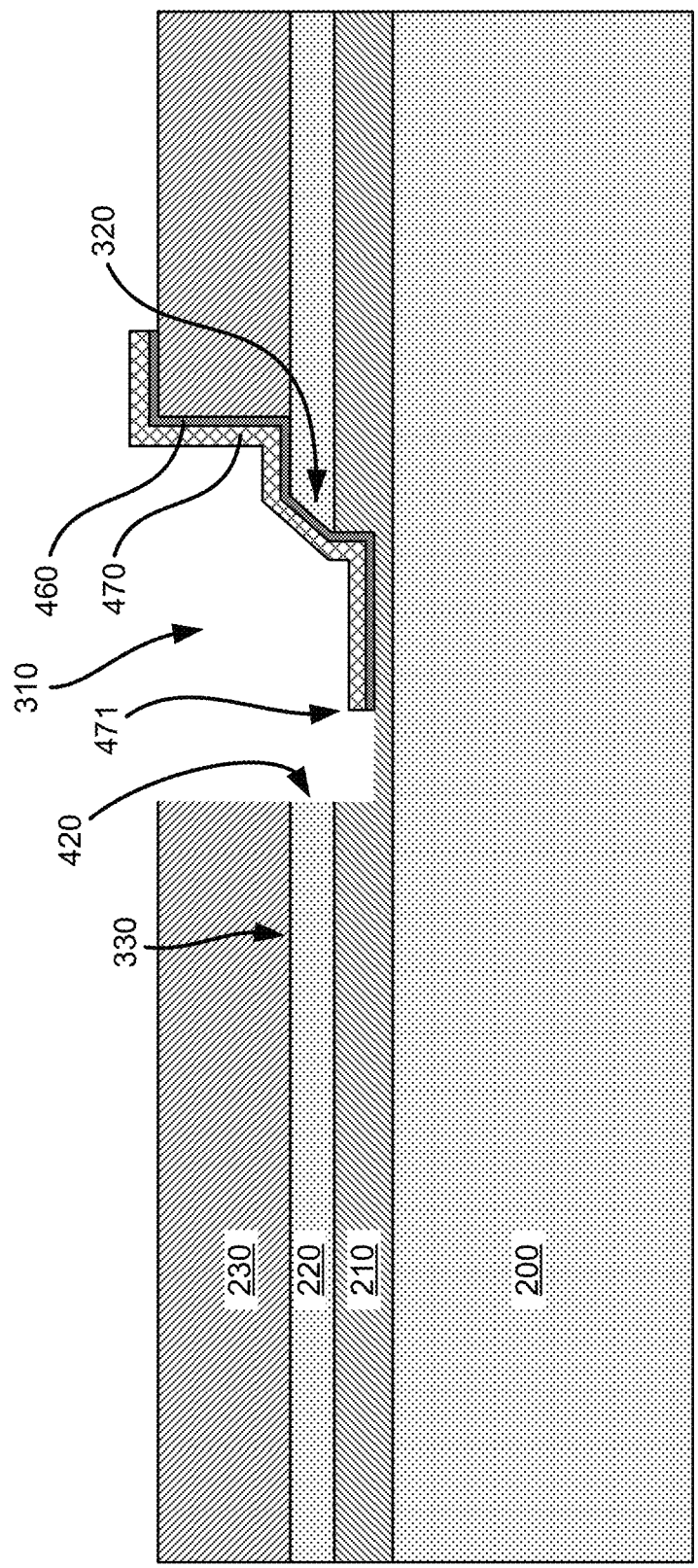
FIG. 7 illustrates deposition of an adhesion liner and a metal on tilted crystal plane and surrounding surfaces shown in FIG. 6, in accord with an embodiment.

In some embodiments, it is possible to fabricate a mirror directly on one of crystal planes 320 by depositing an adhesion liner and/or metallization directly thereon, as shown in FIG. 7. In other embodiments, it is considered advantageous to modify the geometries illustrated in FIG. 3 slightly, to remove one of the crystal planes (e.g., not the one which will form a mirror) and/or to remove some of the underlying BOX layer. Thus, the processes described in connection with FIGS. 4, 5 and 6 may be considered optional and may be omitted for process simplification and cost savings. Reasons for performing or not performing the optional steps will be discussed. Upon reading and understanding the disclosure herein, one skilled in the art will readily recognize many variations, modifications and equivalents, and will understand that completed output couplers made with such variations, modifications and equivalents will appear slightly different than other embodiments illustrated herein.

FIG. 4 illustrates a structure formed by applying photoresist 410 to wafer 300, FIG. 3, exposing one tilted crystal plane 320 on one side of recess 310, and covering the other tilted crystal plane 320 with photoresist 410. FIG. 5 illustrates a structure formed by removing the exposed, tilted crystal plane 320 by etching. For example, a dry etch may be used to remove tilted crystal plane 320, leaving a vertical edge 420, as shown. FIG. 6 illustrates a structure formed by etching BOX layer 210 with an etch that is selective to Si. The advantages of removing the exposed crystal plane 320 and etching BOX layer 210 are to prepare the structures around recess 310 to form a lowest insertion-loss waveguide bridge to a mirror that will be formed, and/or to minimize back reflections from the mirror structure into waveguide layer 220, as discussed below in connection with FIGS. 7 and 11.

FIG. 7 illustrates deposition of an optional adhesion liner 460 and a metal 470 on tilted crystal plane 320 and surrounding surfaces. Placement of adhesion liner 460 and/or metal 470 can be controlled by photolithography. For example, in some embodiments, liner 460 and metal 470 can be deposited across an entire top surface, areas where liner 460 and metal 470 are to be preserved can be masked, and etching can be performed in unprotected areas. Alternatively, photoresist can be patterned to mask areas that are not to receive liner 460 and metal 470, the liner and metal layers can be deposited into the openings thus formed and excess materials removed by a liftoff process. Also, lateral and horizontal extents of optional liner 460 and metal 470 may vary somewhat; they should cover tilted crystal plane 320, but need not necessarily overlap the edge of recess 310, as shown in FIG. 7. One skilled in the art will readily recognize many variations, modifications and equivalents.

The choice of liner 460 and/or metal 470 may be influenced by availability of a suitable etch chemistry; the liftoff process may allow more latitude in the choice of liner 460 and metal 470. Various high-reflective metals and/or adhesion liners can be used (e.g., any of tantalum (Ta), tantalum nitride (TaN), titanium (Ti), titanium nitride (TiN), aluminum (Al), gold (Au), platinum (Pt), silver (Ag), tin (Sn), chromium (Cr), or alloys of these materials).

Considering the structure shown in FIG. 7 reveals one advantage of etching BOX layer 210, as shown in FIG. 6. Etching BOX layer 210 allows a leading edge 471 of metal 470 to be recessed beneath a level of waveguide layer 220, as shown. Not etching BOX layer 210 would raise the height of leading edge 471, so that the waveguide bridge formed later (see FIG. 11) would run into, instead of over, leading edge 471. Thus, the arrangement shown in FIG. 7 offsets leading edge 471 from a beam path of light within waveguide layer 220, reducing the possibility of leading edge 471 generating reflections. Reflections generated by leading edge 471, were they to occur, could both reduce the efficiency of the forward light throughput of the vertical coupler, and/or generate back reflections into waveguide layer 220. However, some applications may not be impacted by impaired forward efficiency and/or back reflections. For example, in embodiments the vertical coupler being fabricated implements a test node, and can be characterized to establish a ratio of light that is observable at the test node to light from a main output of a PIC (see FIGS. 46, 47 and discussion above). In such embodiments, higher losses can be tolerated, and back reflections are attenuated by the fact that little light is being transmitted in the forward direction at the test node to begin with. Also, in these and other embodiments, when waveguide layer 220 is relatively thick such that only a small amount of light being transmitted through waveguide layer 220 is near the bottom of the layer, reflections generated by leading edge 471 would be less significant.

It will also be understood by one skilled in the art, upon reviewing FIGS. 4 through 7, that the step of removing one of the tilted crystal planes 320, as shown in FIG. 5, could be done before or after the deposition of liner 460 and/or metal 470, as shown in FIG. 7. Also, etching BOX layer 210, as shown in FIG. 6, could be done whether the one of the tilted crystal planes is removed, or not.

In some embodiments, a waveguide bridge, which may overlie a waveguide bridge support, are formed using techniques described in one or more of the following U.S. patent applications, which are incorporated by reference in their entireties for all purposes: 61/528,398, filed on Aug. 30, 2011; Ser. No. 13/517,117, filed Aug. 28, 2012; Ser. No. 14/755,545, filed Jun. 30, 2015; and Ser. No. 14/996,001, filed Jan. 14, 2016.

Figure 8:
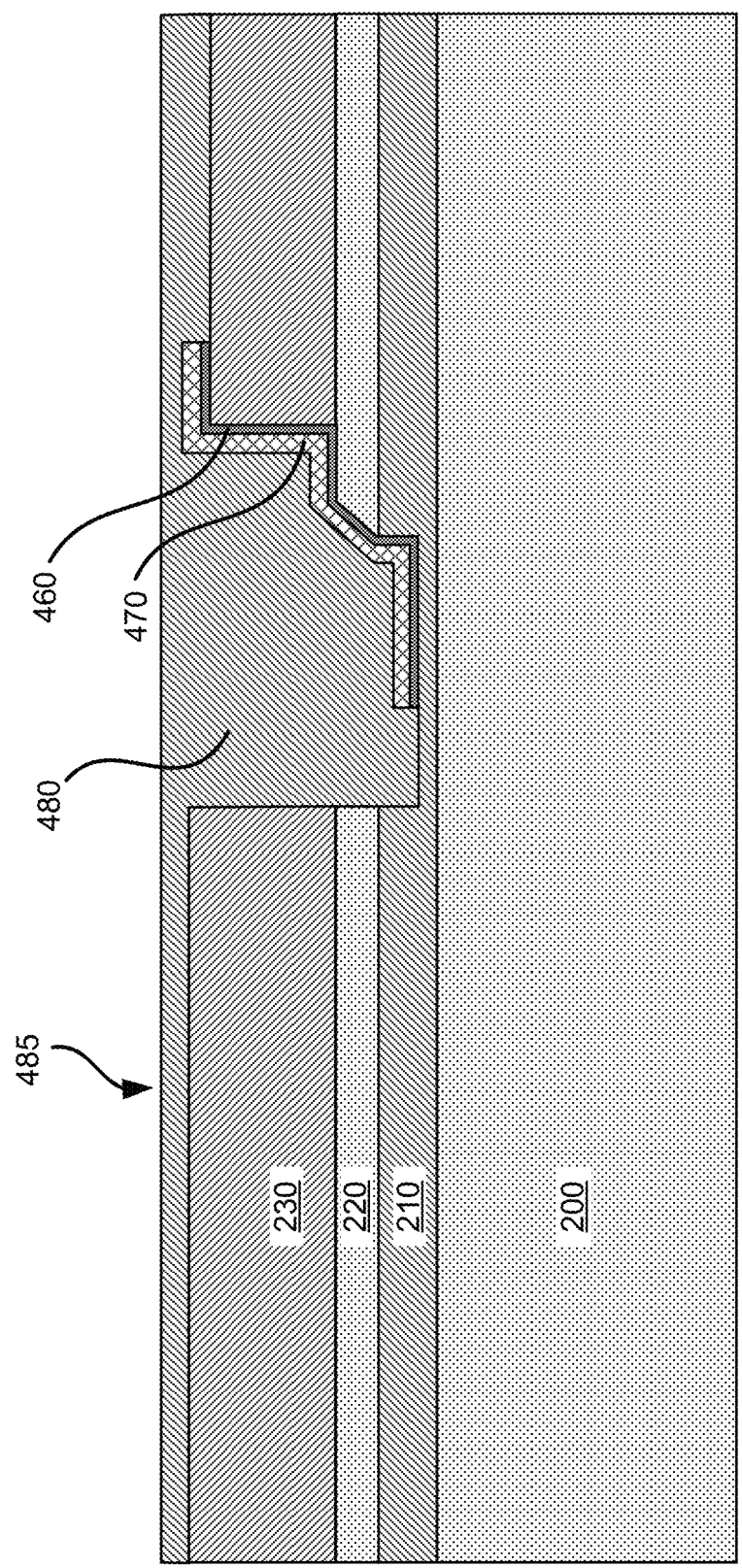
FIG. 8 illustrates a structure formed by filling recess 310 (FIGS. 3-7), and polishing back the structure to form a planar top surface, in accord with an embodiment.

FIG. 8 illustrates a structure formed by filling recess 310 (FIGS. 3-7), for example with a support material 480 such as $SiO_2$, to a depth sufficient to overfill recess 310 to and above a height of adhesion liner and metal 470, as shown. Support material 480 may then optionally be polished back using CMP to form a planar top surface 485. Use of $SiO_2$ as support material 480 may be advantageous in embodiments that use $SiO_2$ as cladding layer 230, but is not required. Some considerations for support material 480 are that it have a coefficient of temperature expansion (CTE) that is reasonably similar to surrounding materials, for best resistance to thermal cycles, and good adhesion to such materials. Another consideration is that support material 480 have a similar index of refraction to that of BOX layer 210, in applications where continuity with BOX layer 210 as a cladding layer for waveguide layer 220 is important. Other materials that could be used for support material 480 include alumina and silicon nitride.

Figure 9:
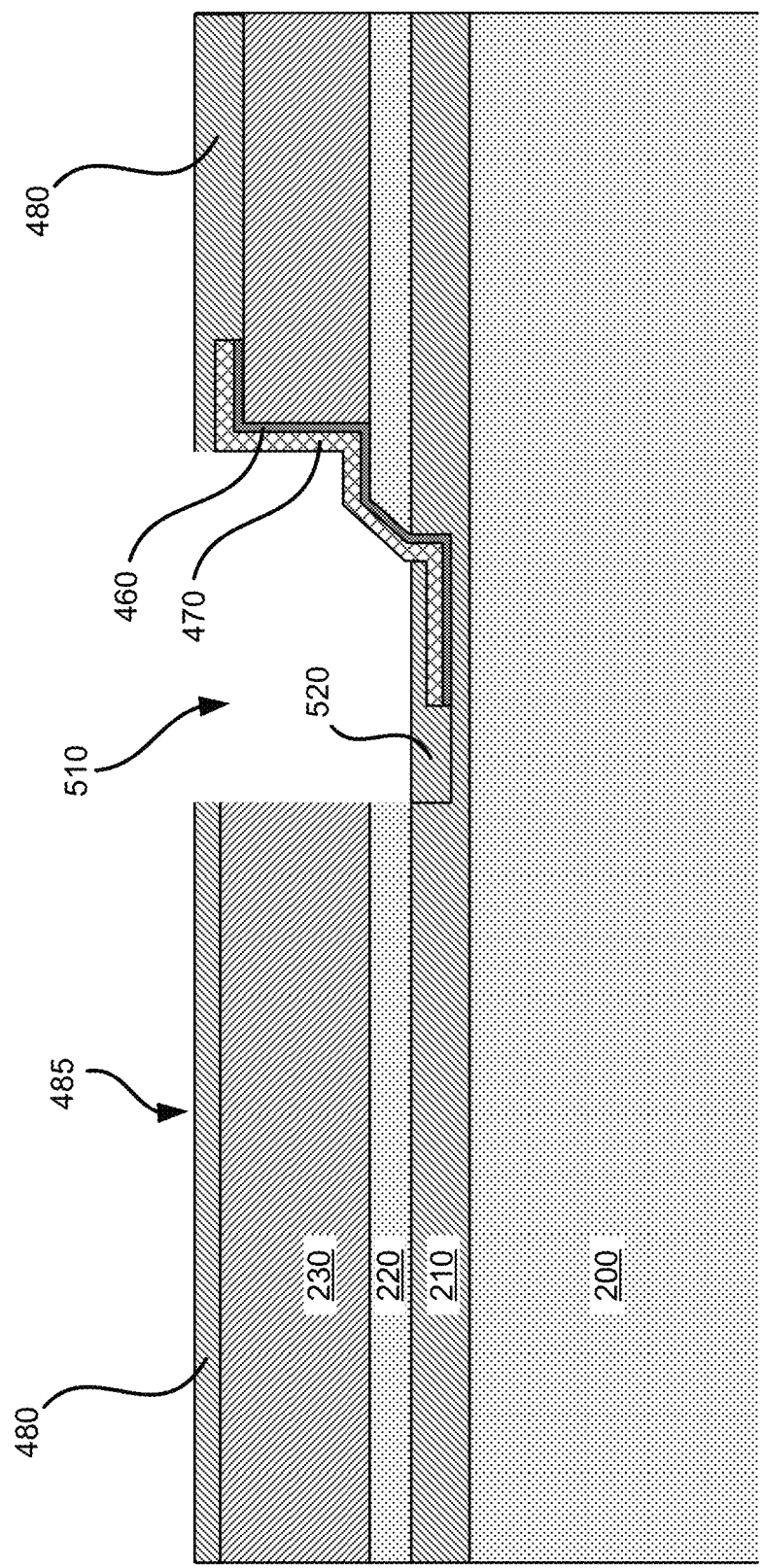
FIG. 9 illustrates a structure formed by patterning photoresist on the structure depicted in FIG. 8, and etching back support material to open a second recess, in accord with an embodiment.

FIG. 9 illustrates a structure formed by patterning photoresist on the structure depicted in FIG. 8, and etching back support material 480 to open a second recess 510. The photoresist edge that defines second recess 510 need not exactly align with the edges of previous recess 310 (see FIG. 7) as suggested by FIG. 9, but may extend outward from recess 310 so that the etchback does not leave support material 480 within recess 510. These and other considerations for etching back material at edges of a recess for a waveguide are related to effects discussed in U.S. Provisional Patent Application No. 62/292,663, filed 8 Feb. 2016 and incorporated by reference herein in its entirety for all purposes. A selective etch may be used to avoid etching metal 470. The etch is controlled so as to leave an oxide structure, referred to as a bridge support 520, that fills recess 510 to about the original height of BOX layer 210. Although FIGS. 9-11 and 14 show bridge support 520 as being at exactly the same height as an interface between BOX layer 210 and waveguide layer 220, this height control is not critical in some embodiments. Considerations for height control of bridge support 520 include the possibility of generating partial reflections at edge 420, similar to the case discussed below in connection with FIG. 10, and whether an optical mode guided by a waveguide bridge (see FIGS. 11, 14) intersects the desired region of a mirror formed by metal 470, for best reflection.

The steps of filling recess 310 with oxide and forming bridge support 520 from the oxide may also be considered optional. The reason for these steps is to provide a location for a continuation of waveguide layer 220 toward metal 470 with maximum continuity and minimal reflections. For example, if these steps are omitted, a bridge waveguide could be provided that would extend downwardly into the etched BOX recess. This would likely generate reflections and/or diffraction effects due to the sudden expansion of the waveguide material as light propagating through waveguide layer 220 "sees" the additional material below. Also, a mode propagating through waveguide layer 220 would likely expand into the additional material, leading to reduced mode confinement and reduced coupling efficiency in the forward propagation direction. However, for the same reasons as discussed above, such effects may be tolerable when a vertical coupler formed thereby is used only as a test node, in view of reduced cost of fabrication by omitting the oxide deposition, planarization and etchback steps.

Figure 10:
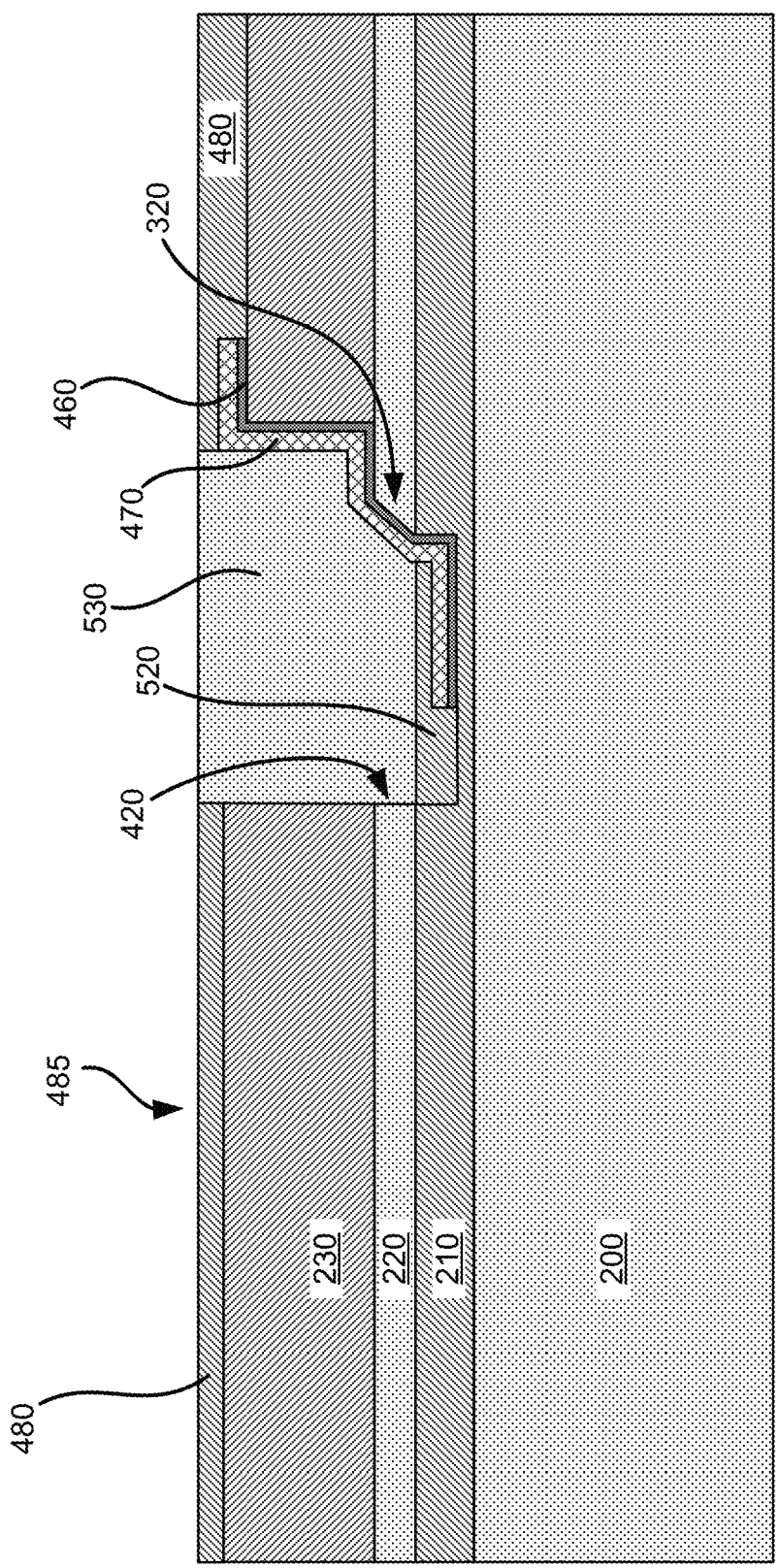
FIG. 10 illustrates a structure formed by filling the recess shown in FIG. 9 with an index matching material, and polishing back the structure thus formed using CMP, in accord with an embodiment.

FIG. 10 illustrates a structure formed by filling recess 510 (FIG. 9) with an index matching material 530, and polishing back (e.g., planarizing) the structure thus formed, using CMP. Although planarizing the index matching material is not required in all embodiments, such planarizing advantageously provides a stable upper reference surface so that the index matching material can be accurately etched back to a known thickness using a timed etch. In embodiments, particularly when waveguide layer 220 is formed of silicon, index matching material 530 may be amorphous silicon (a-Si). Other materials may also be used, with the understanding that a mismatch of refractive index between index matching material 530 and waveguide layer 220 can have consequences. In some embodiments, index matching material 530 has a refractive index that matches the refractive index of waveguide layer 220 within a tolerance of less than 2%. In these embodiments, an interface of waveguide layer 220 with index matching material 530 does not generate back reflections, or reduce optical power of light received from waveguide layer 220, through Fresnel reflections at vertical edge 420. This illustrates another reason for possibly omitting the step of removing one of the tilted planes 320 (see FIG. 4). If an interface between waveguide layer 220 and index matching material 530 exists at all, it may be advantageous that such interface be angled so that slight reflections therefrom scatter harmlessly upwards and downwards instead of back into waveguide layer 220. These and other considerations for the shape of an interface between waveguide layer 220 and index matching material 530 are related to effects discussed in U.S. Provisional Patent Application No. 62/292,675, filed Feb. 8, 2016 and incorporated by reference herein in its entirety for all purposes.

Figure 11:
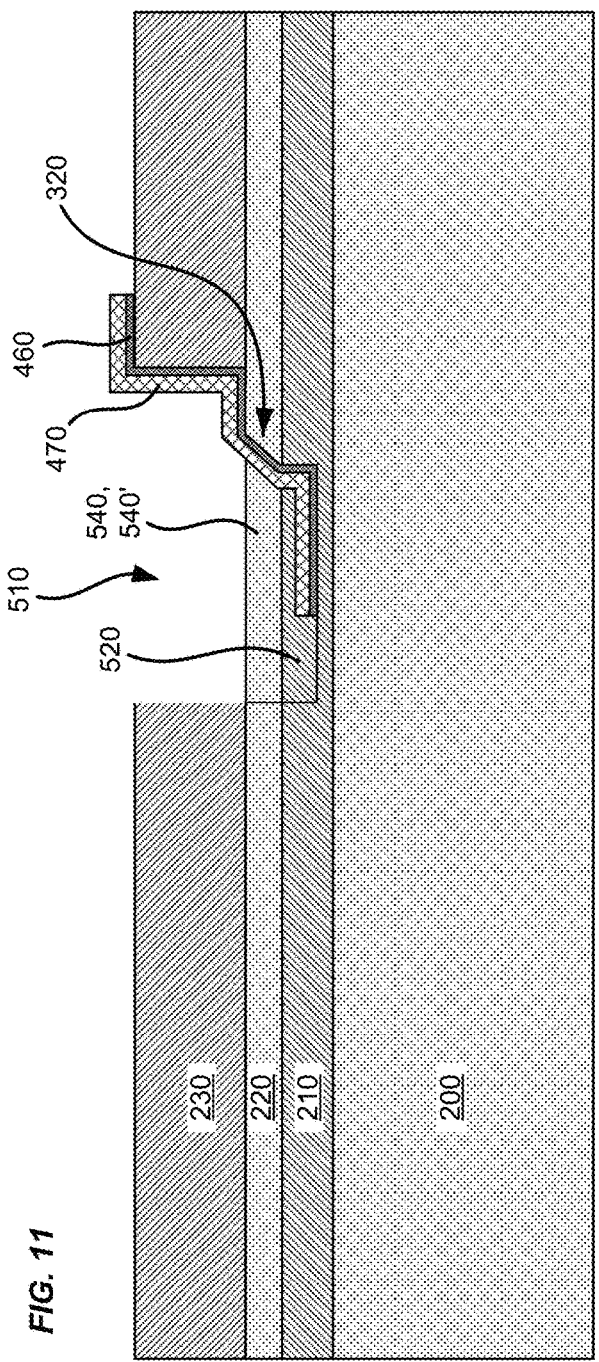
FIG. 11 illustrates a structure formed by etching back an index matching material shown in FIG. 10 to a height of a waveguide layer, in accord with an embodiment.

FIG. 11 illustrates a structure formed by etching back index matching material 530 to a height of waveguide layer 220. The etch may be a wet or a dry etch that in embodiments, is selective, advantageously etching index matching material 530 faster than surrounding oxides. Then, in embodiments, index matching material 530 is laterally patterned to define a ridge waveguide in index matching material 530 that acts as a waveguide bridge 540 (or 540', see FIG. 13). In some embodiments, when index matching material 530 is a-Si, the structure is temperature treated (e.g., annealed) so that the a-Si converts partially or completely to polysilicon. Converting a-Si to polysilicon can help to ensure a precise index match between waveguide layer 220 and waveguide bridge 540, to minimize reflections within the structure thus formed. In other embodiments, a-Si is not temperature treated, thus avoiding a conversion to polysilicon, because propagation losses are higher in polysilicon than in a-Si.

Figure 12:
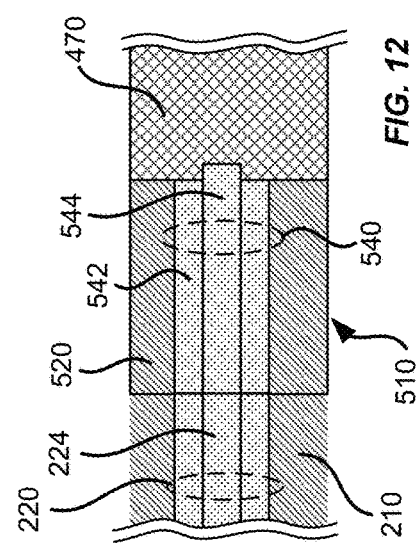
FIG. 12 is a simplified top view of one embodiment, showing a portion of FIG. 11 with an upper cladding layer not shown, in accord with an embodiment.

FIG. 12 is a simplified top view of one embodiment, illustrating a portion of FIG. 11 with upper cladding layer 230 not shown. A waveguide bridge 540, defined by photolithography and etching of waveguide bridge 540, includes a shoulder portion 542 and a ridge portion 544 that matches, and adjoins, a ridge 224 defined in waveguide layer 220. Thus, in use, light propagating in waveguide layer 220 is guided by ridge 224 and transitions to waveguide bridge 540, guided by ridge portion 544. Waveguide bridge 540 confines light from waveguide bridge 540 to metal 470 (mirror). In certain embodiments, waveguide bridge 540 also reduces reflections back into waveguide layer 220, by matching the shape and/or the refractive index thereof. Ridge portion 544 extends further to the right in FIG. 12 because both metal 470 and ridge portion 544 follow the angled slope of tilted plane 320.

Figure 13:
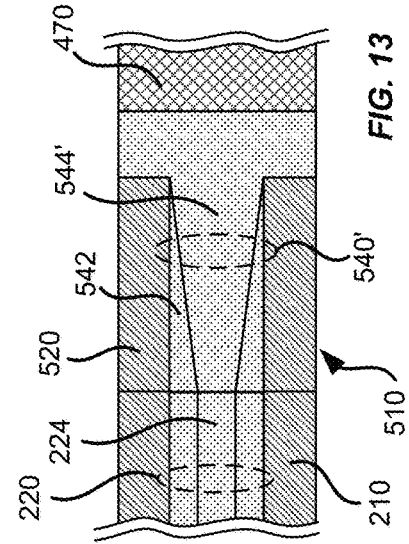
FIG. 13 is a simplified top view of another embodiment, again showing a portion of FIG. 11 with the upper cladding layer not shown, in accord with an embodiment.

FIG. 13 is a simplified top view of another embodiment, again illustrating a portion of FIG. 11 with upper cladding layer 230 not shown. In FIG. 13, a waveguide bridge 540', defined by photolithography and etching of waveguide bridge 540, includes a shoulder portion 542 and a ridge portion 544' that matches a ridge 224 defined in waveguide layer 220 where waveguide bridge 540' and waveguide layer 220 meet, but ridge portion 544' tapers outwardly to form a wider interface with metal 470. This enables a beam size of the light propagating through the waveguide to expand as it propagates toward the mirror formed by metal 470. The ridge portion 544' could taper linearly, as shown, or could taper with a curve (that is, the end of ridge portion 544' that is closest to metal 470 could flare outwardly toward sides of recess 510).

Building on discussions above related to coupling efficiency in the forward propagation direction, it will be appreciated by one skilled in the art that definition of ridge portions 544, 544' may be considered optional. That is, especially in embodiments wherein a vertical coupler being formed is for a test node, it may be acceptable to interface waveguide ridge 224 with a waveguide bridge that does not form a corresponding ridge. In such embodiments, a light propagation mode guided within waveguide layer 220 may generate reflections or cease to be guided in the same manner within the waveguide bridge, but the consequences may be negligible.

Figure 14:
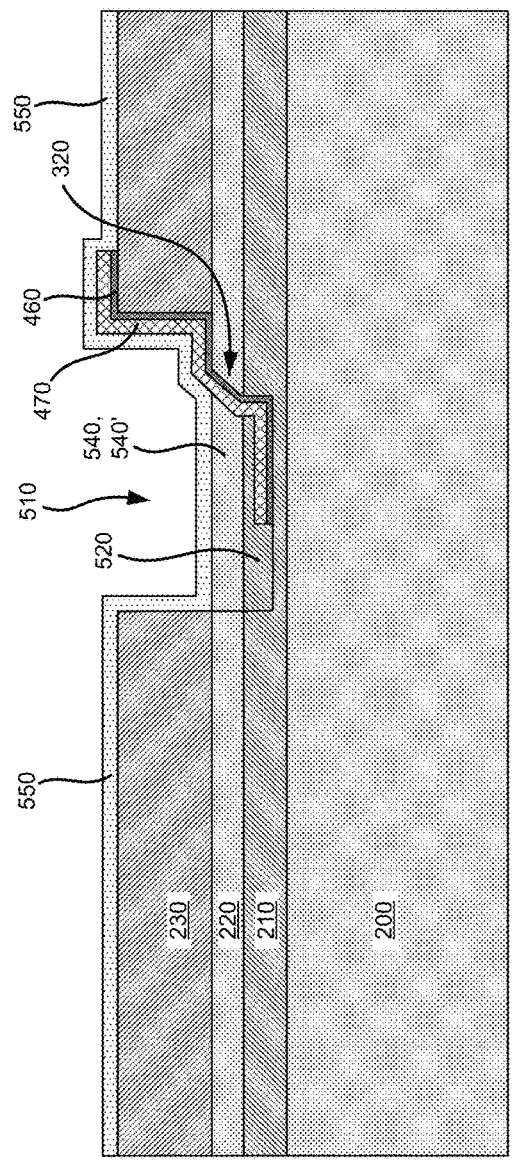
FIG. 14 illustrates a top surface of the structure shown in FIG. 11, coated with an anti-reflective coating, in accord with an embodiment.
Figure 23A:
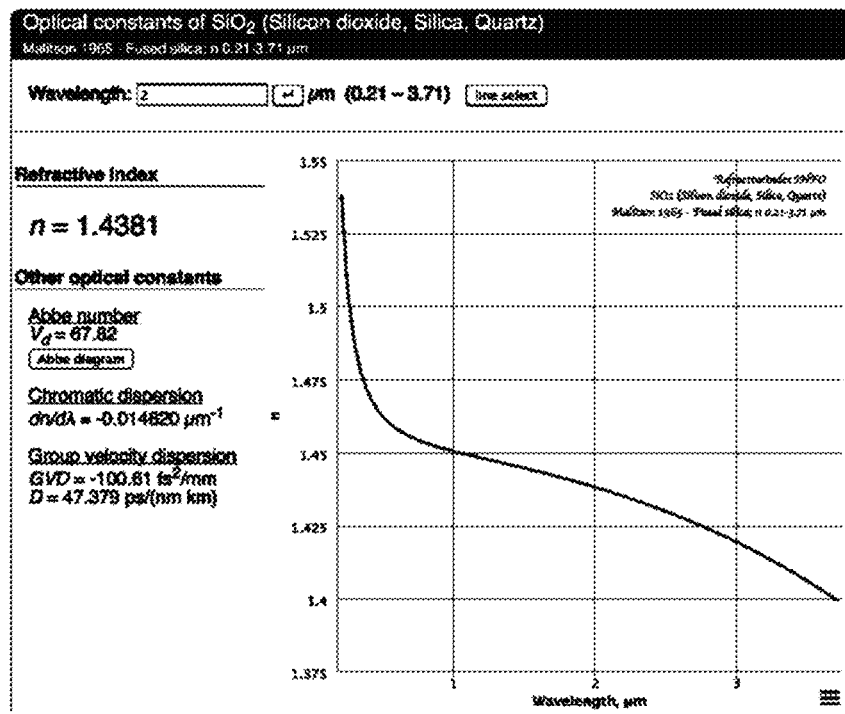
FIG. 23A shows a chart of $SiO_2$ refractive index vs. wavelength, in accord with an embodiment.
Figure 23B:
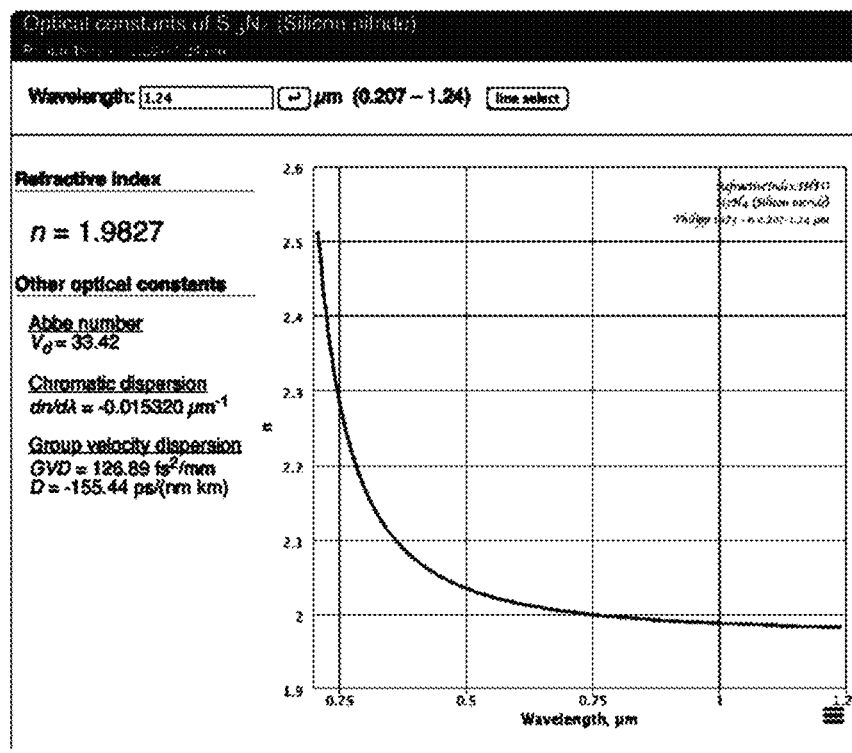
FIG. 23B shows a chart of $Si_3N_4$ refractive index vs. wavelength, in accord with an embodiment.

FIG. 14 illustrates a top surface of the structure shown in FIG. 11, coated with an optional anti-reflective (AR) coating 550 to improve outward coupling of light from waveguide layer 220 after it reflects from metal 470. AR coating 550 may be omitted in embodiments in which outward coupling efficiency is not critical, as discussed above. In some embodiments, AR coating 550 has a high refractive index of about 2.0 adjacent to waveguide bridges 540 or 540', and a low refractive index of about 1.45 at an upper surface thereof. Some examples of dielectrics used for AR coating 550 include $SiO_2$ and $Si_yN_x$ (e.g., $Si_3N_4$), which are relatively easy to obtain in CMOS foundries. For example, FIG. 23A shows a chart of $SiO_2$ refractive index vs. wavelength, indicating that $SiO_2$ has a refractive index of 1.4381 for light with a wavelength of 2 μm. FIG. 23B shows a chart of $Si_3N_4$ refractive index vs. wavelength, indicating that $Si_3N_4$ has a refractive index of 1.9827 for light with a wavelength of 1.24 μm.

In some embodiments, an added semiconductor chip is used to create an output coupling mirror for a waveguide. For example, a semiconductor chip may be placed in a pit as described in U.S. patent application Ser. No. 14/509,914, filed on Oct. 8, 2014, which is incorporated by reference. The pit may be defined, at least partially, by pit walls. The waveguide extends to a first one of the pit walls. An angled facet is formed on the second chip by etching the second chip (e.g., along a crystal plane). Metallic material is applied to the angled facet. In some embodiments, a bridge, (e.g., similar to waveguide bridges 540, 540' described above) is used to guide light from the waveguide to the angled facet.

Figure 15:
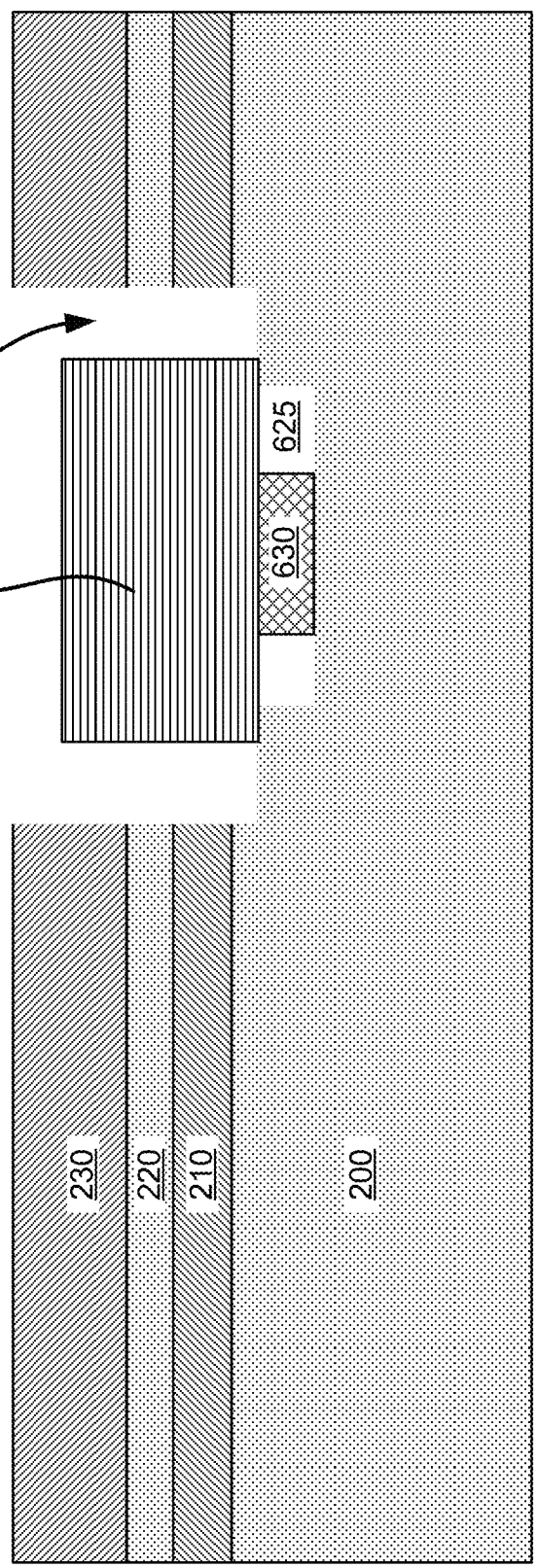
FIG. 15 illustrates a SOI substrate with a chip mounted in a pit that is formed in deposited layers and in the substrate, in accord with an embodiment.

FIG. 15 illustrates a SOI substrate with a chip 610 mounted in a pit 615 that is formed in deposited layers and in the substrate itself. Illustrated in FIG. 15 are substrate 200, BOX layer 210, waveguide layer 220 and upper cladding layer 230. Pit 615 and a secondary pit 625 are formed within the deposited layers and the substrate by etching; substrate 200 may also be etched, as shown in FIG. 15, or etching may stop at a top surface of substrate 200. Chip 610 is placed so as to overlap at least some edges of secondary pit 625, so that the height of chip 610 relative to layers 210, 220 and 230 are set by the depth of pit 615. In some embodiments, chip 610 is placed in pit 615 following a similar method as described in the '914 application. In some of these, and other embodiments, chip 610 is aligned to the waveguide in order to orient a crystal plane of the chip with the waveguide. One skilled in the art will readily recognize many variations, modifications and equivalents. A bonding material 630 (e.g., metal) secures chip 610 within pit 615. Though chip 610 shown in FIG. 15 is described below as an InP chip, other materials (e.g., semiconductor materials such as IV, III-V, II-VI, etc.) could be used. For example, in some embodiments, chip 610 is made of crystalline silicon, germanium, or GaAs. In some embodiments, a III-V material is used because other III-V materials are used for other functions being added to the wafer (e.g., a gain medium), are available, and are compatible with other processing steps herein. One important consideration is that the material selected be capable of forming a tilted plane 635 as described below.

Figure 16:
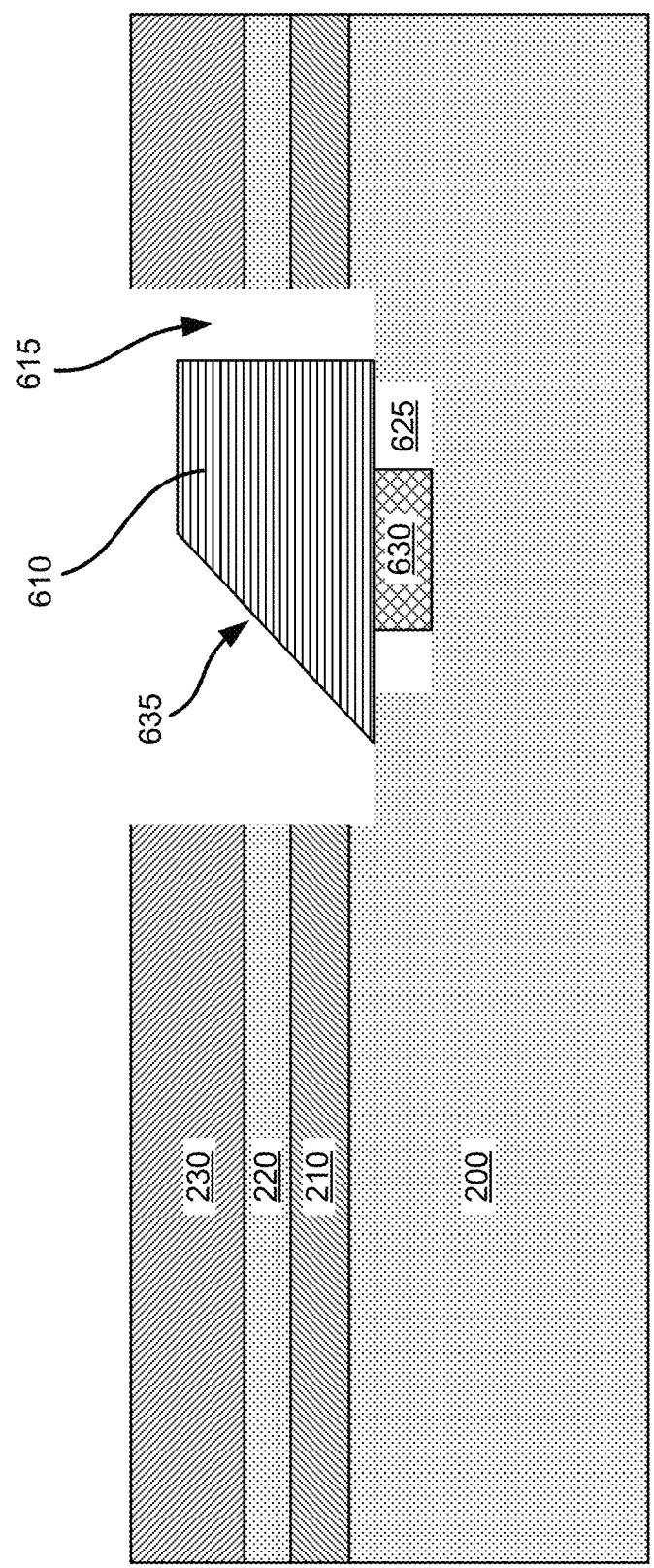
FIG. 16 illustrates the chip of FIG. 15 after selectively etching along a crystal plane to form an angled facet, in accord with an embodiment.

FIG. 16 illustrates chip 610 after selectively etching along a crystal plane to form an tilted plane 635. Because chip 610 is placed independently of the structure of waveguide layer 220, it is important that the angle of placement of chip 610 be controlled so that the vertical coupler thus formed directs light in the expected direction.

It is contemplated that in embodiments, the structure shown in FIG. 16 could be generated not only by the process described above, but also by first generating a chip with an angled facet, and then bonding such chip into pit 615. In these embodiments, similar to the case noted above, care would be needed to align the angled facet properly so that the vertical coupler formed would direct light in the expected direction. Assuming the ability to fabricate tilted plane 635 out of another material by some method (e.g., perhaps mechanically) this approach could reduce fabrication cost by allowing substitution of less expensive material instead of the semiconductor crystalline materials discussed above.

Figure 17:
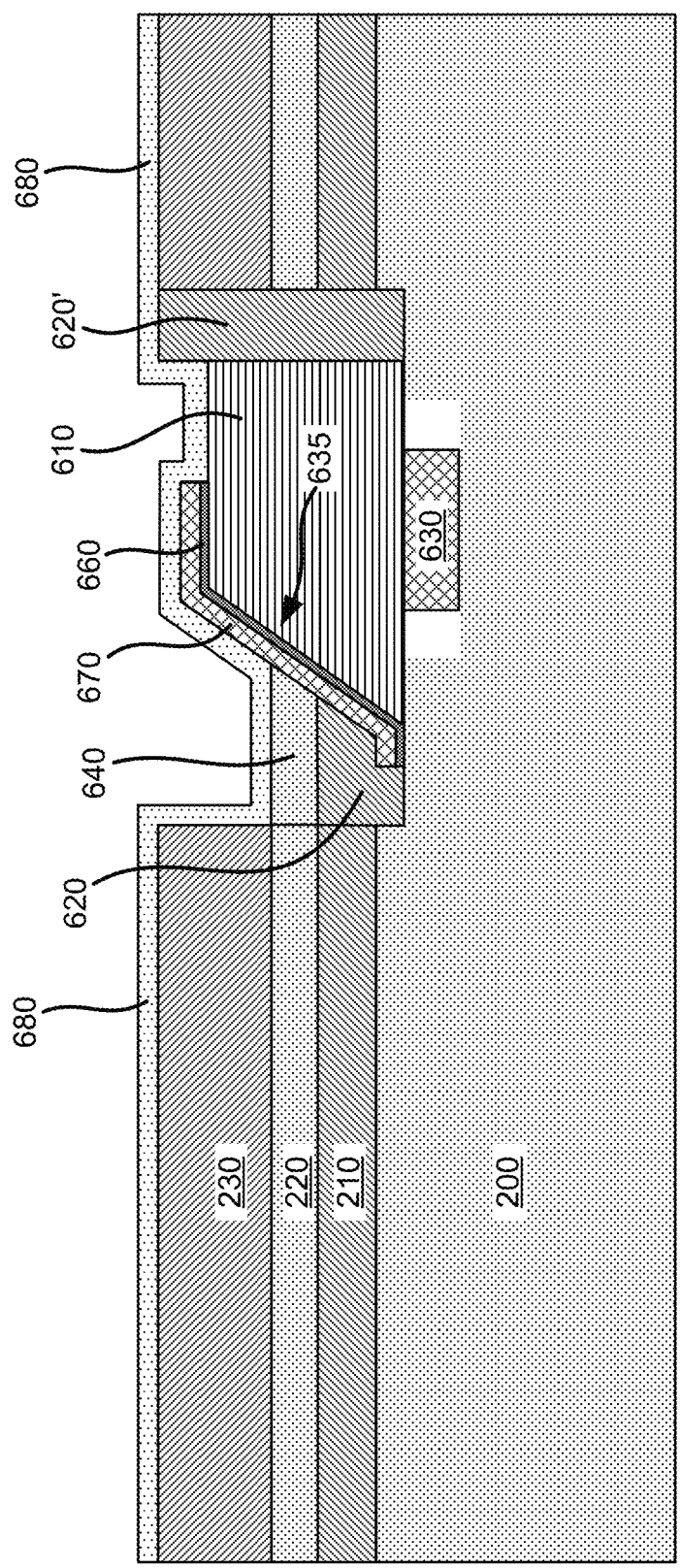
FIG. 17 illustrates a waveguide bridge that optically couples a waveguide formed in a waveguide layer shown in FIG. 16, with a mirror formed of an adhesion layer 660 and metal 670, then coated with an AR layer, in accord with an embodiment.

FIG. 17 illustrates a waveguide bridge 640 that optically couples a waveguide formed in waveguide layer 220, with a mirror formed of an adhesion liner 660 and metal 670. FIG. 17 also illustrates coating of this structure with an AR coating 680. In some embodiments, waveguide bridge 640 is formed using depositions, CMP and etching steps as described above. Beneath waveguide bridge 640 is a bridge support 620, typically formed of oxide (e.g., SiO$_2$); the same deposition that provides oxide to form bridge support 620 also provides a filling oxide 620' between chip 610 and an adjoining edge of pit 615 (FIGS. 15, 16)

Figure 18:
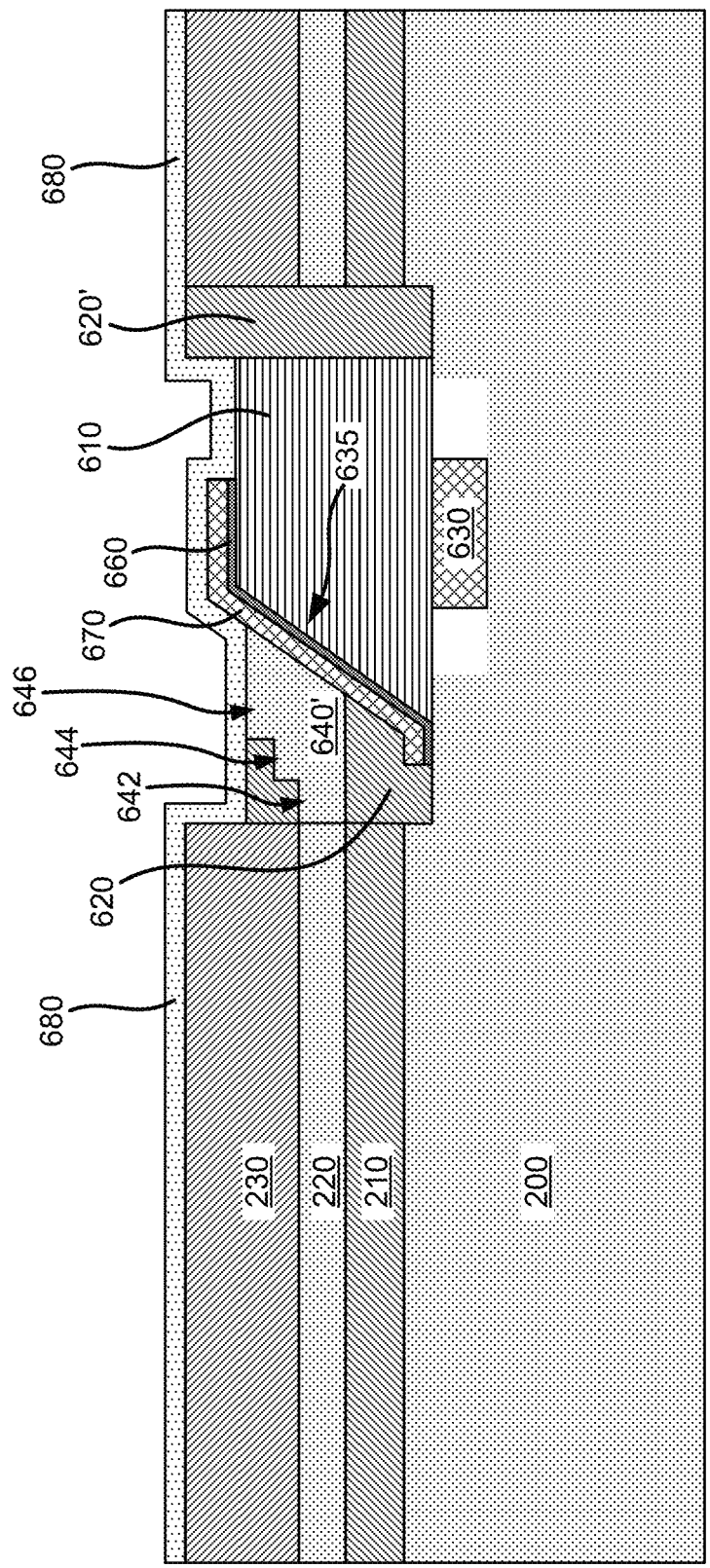
FIG. 18 illustrates a waveguide bridge that includes multiple stages in addition to its initial waveguide ridge, in accord with an embodiment.

FIG. 18 illustrates a waveguide bridge 640' that includes multiple stages 644, 646 in addition to its initial waveguide ridge 642. Stages 644, 646 and/or others are used to expand a beam from waveguide layer 220 as it passes through waveguide bridge 640' toward metal 670. In some embodiments, waveguide bridge 640' is formed by patterning an index matching material using techniques described in one or more of the following U.S. patent applications, which are incorporated by reference in their entireties for all purposes: 62/003,404, filed on May 27, 2014; Ser. No. 14/722,970, filed on May 27, 2015; 62/044,867, filed on Sep. 2, 2014; Ser. No. 14/722,983, filed May 27, 2015; 62/119,750, filed on Feb. 23, 2015; Ser. No. 15/051,348, filed Feb. 23, 2016. In some embodiments, stages 642, 644 and/or others each form a taper that increases in width along a direction of light propagation, that is, from waveguide layer 220 towards metal 670. Thus, in some embodiments, use of chip 610 facilitates a size increase of the mirror formed by metal 670 in the vertical output coupler, relative to a mirror size obtainable by using material of waveguide layer 220 alone to form tilted crystal plane 320 (FIGS. 3-14). In some embodiments, chip 610 and waveguide bridge 640' are used to increase a beam size (e.g., fundamental mode) of an optical beam for improved coupling (e.g., to an optical fiber or a detector such as a photodiode or an avalanche photodiode). That is, when a coupler is fabricated as shown in FIGS. 3-14, a mirror is limited in a vertical direction to a height of waveguide layer 220, but use of chip 610 allows formation of a mirror having a vertical height greater than the height of the waveguide layer 220, and hence greater surface area for a larger beam.

The depiction of two stages in FIG. 18 is for illustrative purposes only; embodiments may have fewer or more stages than those illustrated. Many other aspects of bridge support 620, waveguide bridges 640 (FIGS. 17) and 640', and AR layer 680 can be adjusted, in embodiments, according to the principles discussed above in connection with FIGS. 3-14. One skilled in the art will readily recognize many variations, modifications and equivalents.

Figure 19:
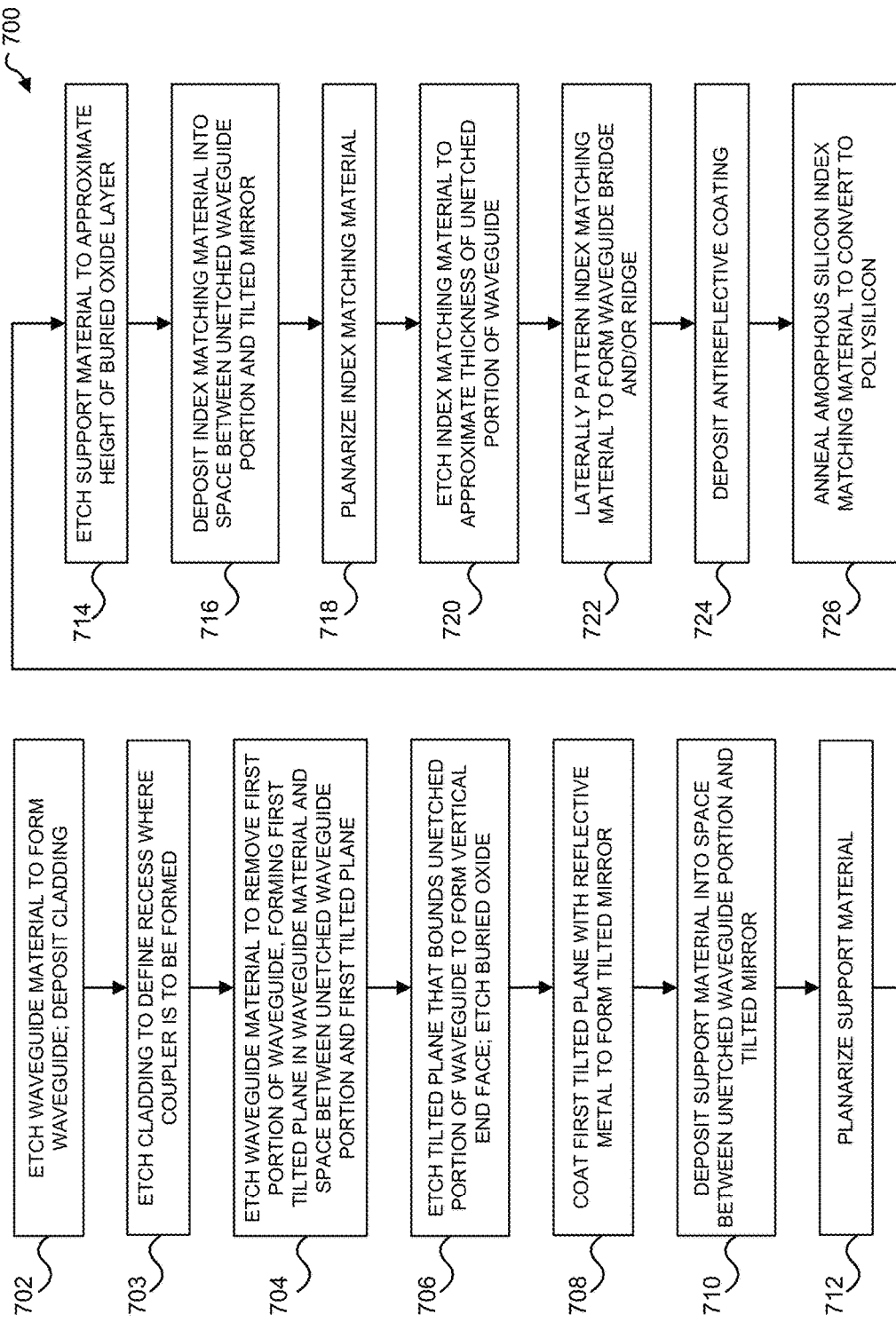
FIG. 19 is a flowchart of a method for forming a vertical coupler for a waveguide, in accord with an embodiment.

FIG. 19 is a flowchart of a method 700 for forming a vertical coupler for a waveguide. Although the steps of method 700 will be discussed as pertinent to a single vertical coupler; it should be understood that these steps are typically performed on an SOI substrate having multiple instances of the vertical coupler being manufactured in parallel. It will be evident to one skilled in the art that many of the steps of method 700 are optional, that is, by omitting such steps, a finished vertical coupler can still be built but may not have the same finished configuration as one built with all of the steps. Furthermore, certain ones of the steps of method 700 can be performed in a different order, and/or repeated. Where any of the steps of method 700 indicate that a material is to be patterned or etched, it should be understood that a photoresist layer may be patterned to protect structures that are not to be affected by the etch.

Step 702 is an optional or preparatory step in which a layer of waveguide material on an SOI substrate is etched to form one or more waveguides. Areas etched in step 702 would typically be defined by photolithography and would include either and/or both of etching through a waveguide material layer to define individual portions of waveguide material and etching edges of a waveguide to leave a ridge for guiding an optical mode. After the waveguides and/or ridges are defined, a cladding material may be deposited. An example of step 702 is etching waveguide layer 220 as shown in any of FIGS. 2-14 to define individual waveguides, and/or etching an individual waveguide to leave ridge 224, FIGS. 12 and 13, and depositing cladding layer 230, FIGS. 2-14.

Step 703 etches the cladding material to define a recess in which a vertical coupler will be formed. An example of step 703 is etching cladding layer 230 to form recess 310, FIG. 3. Step 704 etches waveguide material of a waveguide to remove a first portion of the waveguide, forming at least a first tilted plane in the waveguide material, and a space between an unetched waveguide portion and the first tilted plane. An example of step 704 is etching waveguide layer 220 as shown in FIG. 3, forming tilted planes 320.

An optional step 706 etches a second tilted plane that bounds an unetched portion of the waveguide to form a vertical end face, and further etches a buried oxide underneath the portion etched and the recess, to deepen the recess formed so that metal of a mirror that is later formed is offset from a beam path of light within the waveguide. An example of step 706 is etching tilted plane 320 that is not protected by photoresist 410, FIG. 4, to form the structure shown in FIG. 5, and etching buried oxide 210, FIG. 6.

Step 708 coats the first tilted plane with reflective metal to form a tilted mirror. An example of step 708 is coating tilted plane 320 with adhesion liner 460 and metal 470, as shown in FIG. 7. As noted above, the reflective metal and/or adhesion liner may be blanket deposited and selectively etched, or formed by defining a space with a photoresist mask, and using a liftoff process.

An optional set of steps 710 through 714 form a bridge support, for example bridge support 520, FIG. 9. Step 710 deposits a support material into a space between the unetched waveguide portion and the tilted mirror formed in step 708. An example of step 710 is depositing support material 480 into recess 310, as shown in FIG. 8. Step 712 planarizes the support material. An example of step 712 is planarizing support material 480 to form a planar top surface 485, as shown in FIG. 8. Step 714 etches back the support material to an approximate height of the buried oxide layer of the SOI substrate. An example of step 714 is etching back support material 480 to an approximate height of BOX layer 210, as shown in FIG. 9.

An optional set of steps 716 through 720 form a waveguide bridge, for example waveguide bridge 540 or 540', FIGS. 11-13. Step 716 deposits an index matching material into a space between the unetched waveguide portion and the tilted mirror formed in step 708. An example of step 716 is depositing index matching material 530 into recess 310, as shown in FIG. 10. Step 718 planarizes the index matching material. An example of step 718 is planarizing index matching material 530 to be coplanar with top surface 485, as shown in FIG. 10. Step 720 etches back the support material to an approximate height of the unetched portion of the waveguide. An example of step 720 is etching back index matching material 530 to an approximate height of waveguide layer 220, as shown in FIG. 11.

Further optional steps 722 through 726 form additional features, or modify features, of the vertical coupler. Step 722 laterally patterns the index matching material deposited in step 716, to form a waveguide bridge and/or a ridge therein. Examples of step 722 are laterally patterning index matching material 530 to form a shoulder portion 542 and/or a ridge portion 544 or 544', as illustrated in FIGS. 12 and 13. Step 724 deposits an antireflective coating. An example of step 724 is depositing antireflective coating 550, FIG. 14. In embodiments where amorphous silicon was deposited as an index matching material, step 726 anneals the index matching material to convert it to polysilicon for best index match with an abutting waveguide, to reduce losses by reducing reflections at the interface of the waveguide with the index matching material. An example of step 726 is annealing index matching material 530 to form polysilicon.

Figure 20:
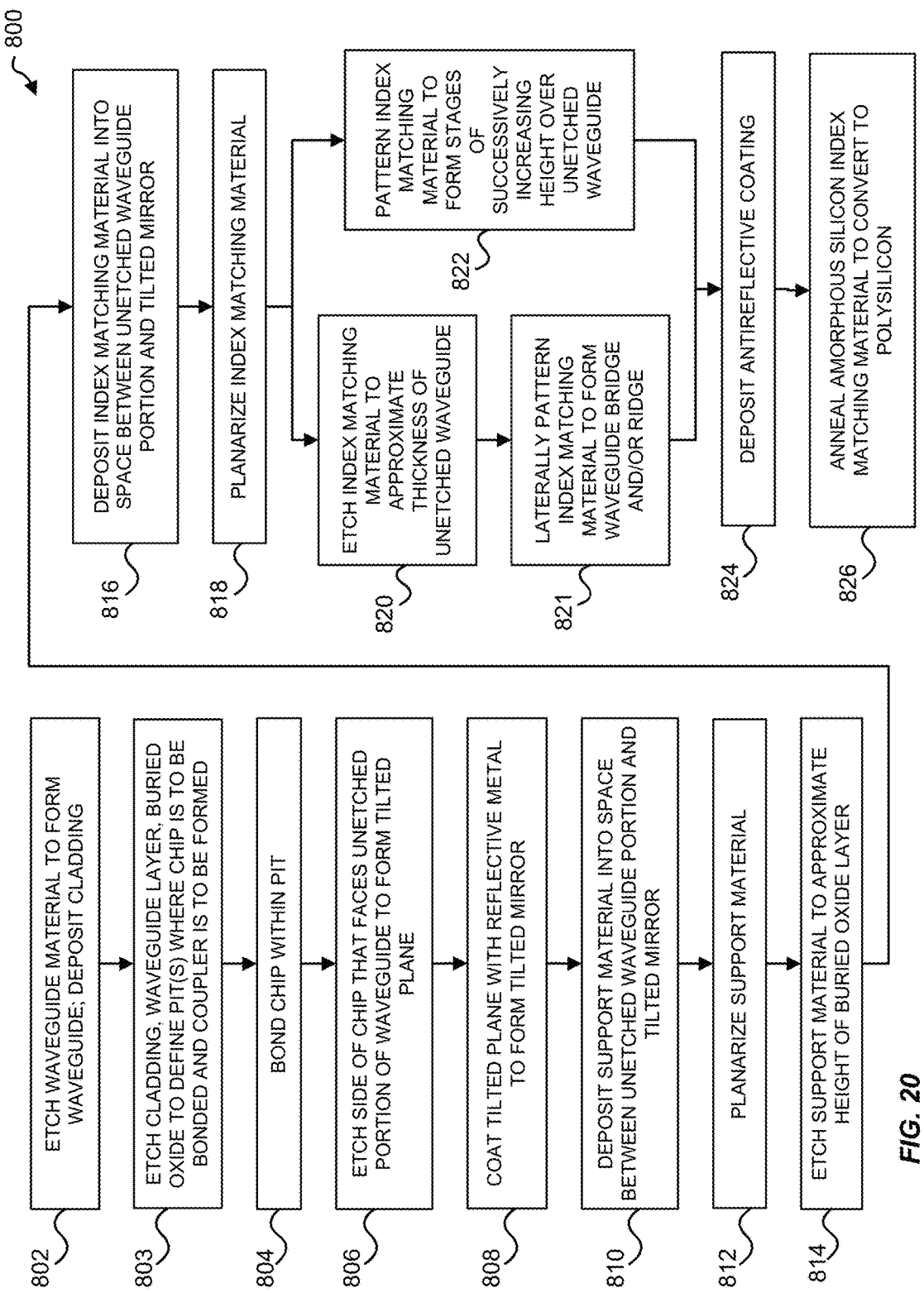
FIG. 20 is a flowchart of a method for forming a vertical coupler for a waveguide, based on bonding a chip within a recess and forming a tilted mirror with the chip, in accord with an embodiment.

FIG. 20 is a flowchart of a method 800 for forming a vertical coupler for a waveguide, based on bonding a chip within a recess and forming a tilted mirror with the chip. Similarly to method 700, the steps of method 800 will be discussed as pertinent to a single vertical coupler but should be understood that in the context of multiple instances of the vertical coupler being manufactured in parallel; many of the steps of method 800 are optional; certain ones of the steps of method 800 can be performed in a different order, and/or repeated; and it should be understood that a photoresist layer may be patterned to protect structures that are not to be affected by an etch. Furthermore, details of many of the steps of method 800 will be understood as being similar to steps of method 700.

Step 802 is an optional or preparatory step in which a layer of waveguide material on an SOI substrate is etched to form one or more waveguides, and optionally cladding material is deposited thereon. Step 802 is identical to step 702, method 700.

Step 803 etches the cladding material to define one or more pits in which a chip will be bonded and used to form a vertical coupler. An example of step 803 is etching cladding layer 230, waveguide layer 220, BOX layer 210 and optionally substrate 200 to form pit 615, FIG. 15, then etching substrate 200 further to form pit 625. Step 804 bonds a chip within one of the pits. An example of step 804 is bonding chip 610 with a bonding material that bonds to substrate 200 at a bottom of pit 625.

Step 806 etches a tilted plane on one side of the chip bonded within the pit in step 804. An example of step 806 is etching tilted plane 635 on chip 610, FIG. 16. Step 808 coats the tilted plane with reflective metal to form a tilted mirror. An example of step 808 is coating tilted plane 635 with adhesion liner 660 and metal 670, as shown in FIG. 17. As noted above, the reflective metal and/or adhesion liner may be blanket deposited and selectively etched, or formed by defining a space with a photoresist mask, and using a liftoff process.

An optional set of steps 810 through 814 form a bridge support, for example bridge support 620, FIG. 17. Step 810 deposits a support material into a space between the unetched waveguide portion and the tilted mirror formed in step 808. An example of step 810 is depositing support material into pit 615, as shown in FIG. 17. Step 812 planarizes the support material. Step 814 etches back the support material to an approximate height of the buried oxide layer of the SOI substrate. An example of step 814 is etching back support material to an approximate height of BOX layer 210, as shown in FIG. 17.

An optional set of steps 816 through 820 or 821 form a waveguide bridge, for example waveguide bridge 640, FIG. 17, or 640', FIG. 18. Step 816 deposits an index matching material into a space between the unetched waveguide portion and the tilted mirror formed in step 808. An example of step 816 is depositing index matching material into pit 615. Step 818 planarizes the index matching material.

At this point in method 800, a different step is performed depending on whether the waveguide bridge being formed, is to: (a) be of the same height as waveguide layer 220, or (b) increase in height as it proceeds toward the tilted mirror. In case (a), step 820 etches back the support material to an approximate height of the unetched portion of the waveguide. An example of step 820 is etching back index matching material to an approximate height of waveguide layer 220, as shown in FIG. 17. Then, optionally, step 821 laterally patterns the index matching material deposited in step 816, to form a waveguide bridge and/or a ridge therein. Examples of step 821 are laterally patterning index matching material to form a shoulder portion and/or a ridge portion, similar to shoulder portion 542 and/or ridge portion 544 or 544' as illustrated in FIGS. 12 and 13. In case (b), step 822 patterns the index matching material to form stages of successively increasing height over the original height of the unetched waveguide. An example of step 822 is patterning index matching material to form stages 644 and 646, FIG. 18 (although, in different embodiments, only one stage over the height of waveguide layer 220, or more than two stages, may be formed by step 822).

Further optional steps 824 and 826 form additional features, or modify features, of the vertical coupler. Step 824 deposits an antireflective coating. An example of step 824 is depositing antireflective coating 680, FIGS. 17 and 18. In embodiments where amorphous silicon was deposited as an index matching material, step 826 anneals the index matching material to convert it to polysilicon for best index match with an abutting waveguide, to reduce losses by reducing reflections at the interface of the waveguide with the index matching material. An example of step 826 is annealing index matching 530 to form polysilicon.

In other embodiments, a mirror is formed by etching a through-silicon via (TSV) through a backside of an SOI substrate, forming a tilted crystal plane exposed by the TSV, and forming a mirror on the tilted crystal plane. As noted above, references to processing steps being performed on or to "the wafer" represent multiple instances of the structure shown individually in the drawings being processed at the same time. Further, references to processing a "front" or "top" side of the wafer will be understood as modifying an upper surface of the structure as shown in the orientation of the drawing labels, while references to processing a "back" side of the wafer will be understood as modifying a lower surface of the structure as shown in the orientation of the drawing labels.

Figure 21:
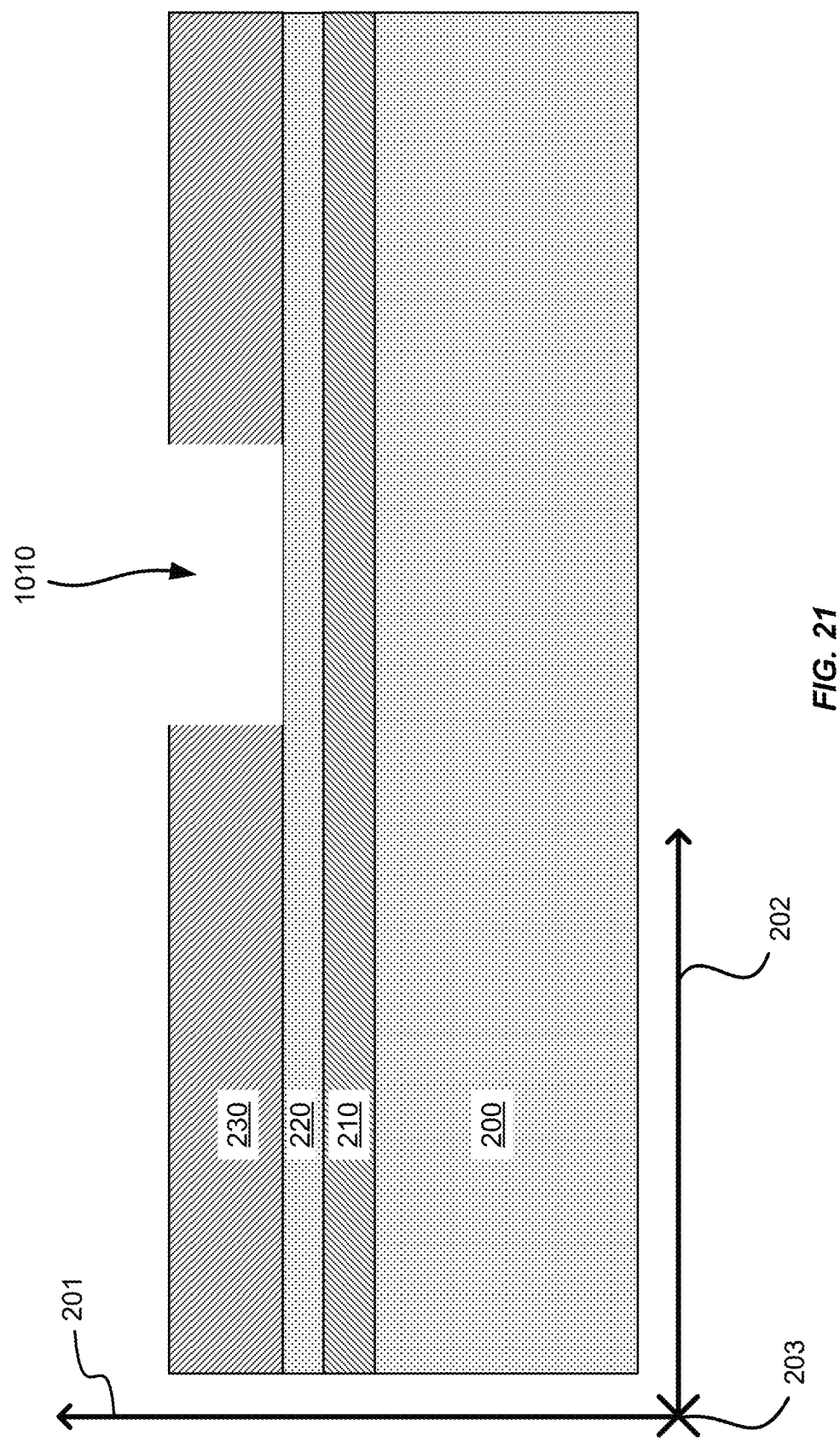
FIG. 21 illustrates a structure formed from the layers illustrated in FIG. 2, with a recess opened in a cladding layer by an etch that is selective to Si, in accord with an embodiment.

FIG. 21 illustrates a structure formed from the layers illustrated in FIG. 2, with a recess 1010 opened in cladding layer 230 by an etch that is selective to Si, that is, the etch removes cladding layer 230 at a much higher rate than it removes waveguide layer 220. In some embodiments, recess 1010 is between 5 μm and 15 μm along horizontal axis 202, and between 5 and 15 μm along lateral axis 203. Z-axis 201 is a normal axis to surfaces of substrate 200 and layers 210, 220, 230.

Figure 22:
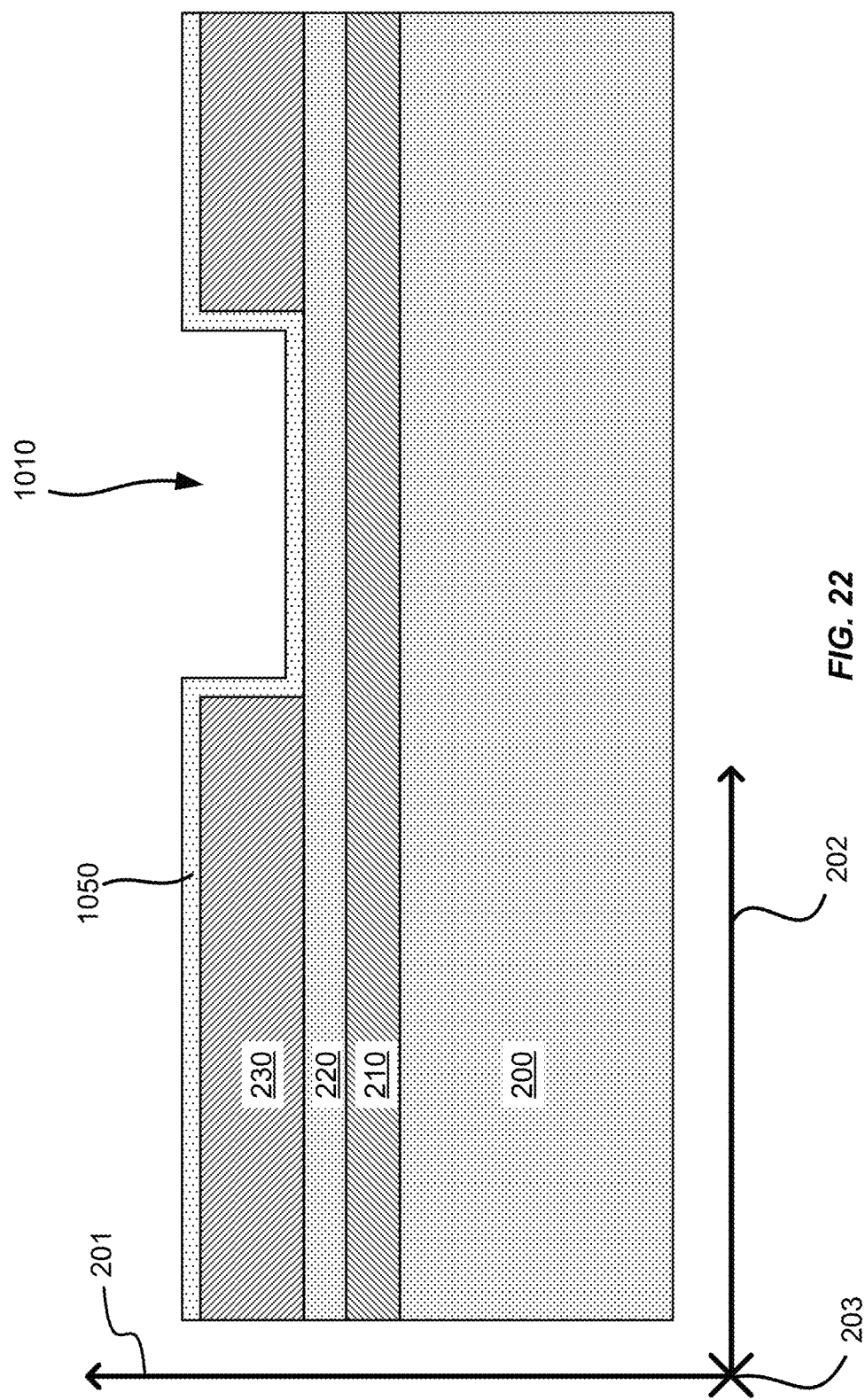
FIG. 22 illustrates an anti-reflective (AR) coating applied to a front surface of the structure illustrated in FIG. 21, in accord with an embodiment.

FIG. 22 illustrates an anti-reflective (AR) coating 1050 applied to a front surface of the structure illustrated in FIG. 21, including recess 1010. In some embodiments, AR coating 1050 is a single or double dielectric layer placed directly on waveguide layer 220. In some embodiments, high density plasma chemical vapor deposition (HDP/CVD) thickness control of AR coating 1050 is +/−5%, with optimization. In some embodiments, AR coating 1050 has a high refractive index of about 2.0 adjacent to waveguide layer 220, and a low refractive index of about 1.45 at an upper surface thereof. As discussed above in connection with FIG. 14, examples of dielectrics used for the AR coating include $SiO_2$ and $Si_yN_x$ (e.g., $Si_3N_4$), which are relatively easy to obtain in CMOS foundries.

Figure 24:
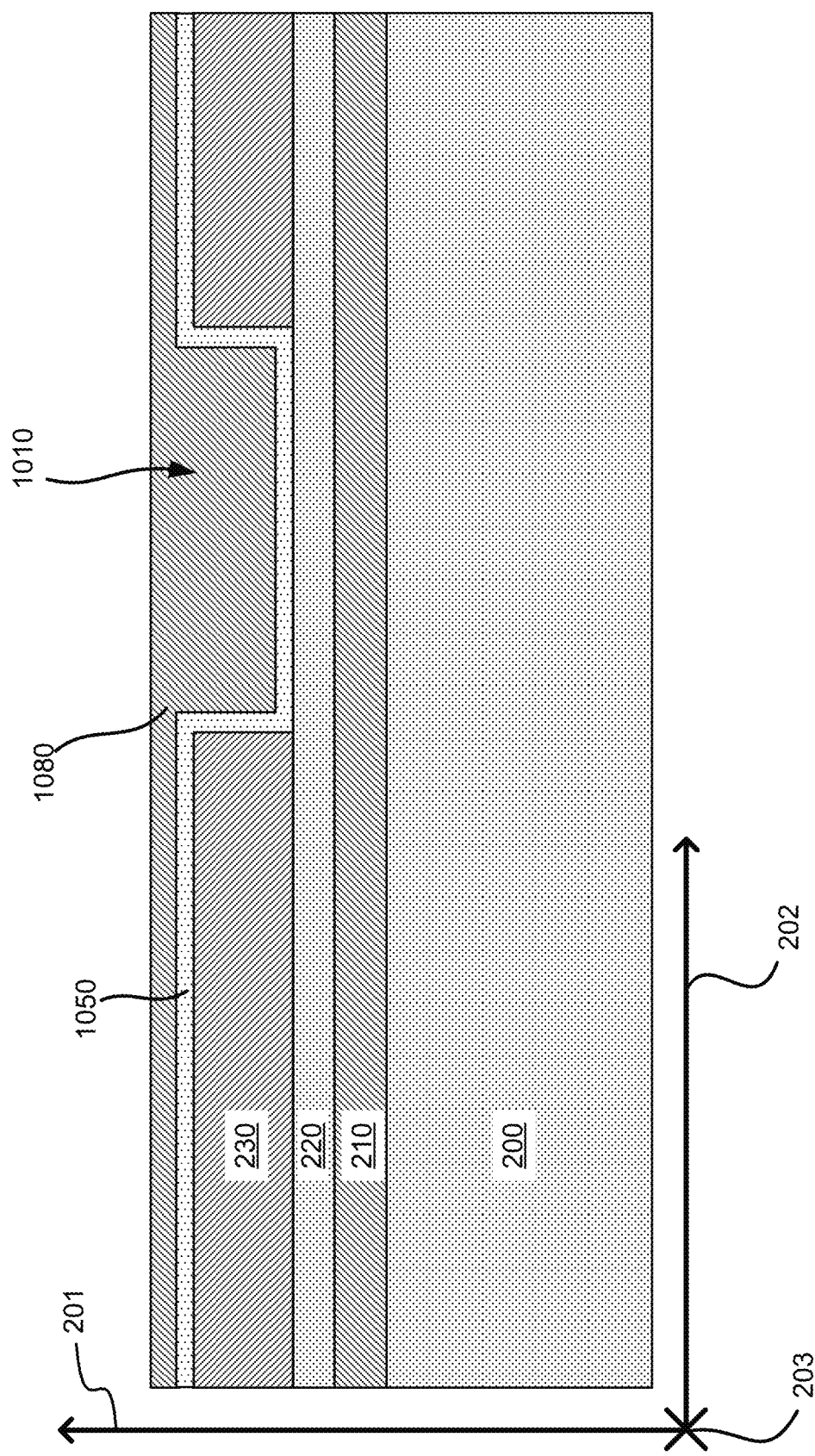
FIG. 24 illustrates a top side protective layer 1080 (e.g., $SiO_2$) deposited over, in accord with an embodiment.

FIG. 24 illustrates a top side protective layer 1080 (e.g., $SiO_2$) deposited over AR coating 1050, filling the first window and covering AR coating 1050. Top side protective layer 1080 is polished back to form a planar upper surface (e.g., using CMP). In some embodiments, the top side protective layer provides stability to the AR coating during additional processing (e.g., during TSV processing which, as noted below, processes a back side of the wafer, such that the front side including AR coating 1050 is subjected to mechanical handling).

Figure 25:
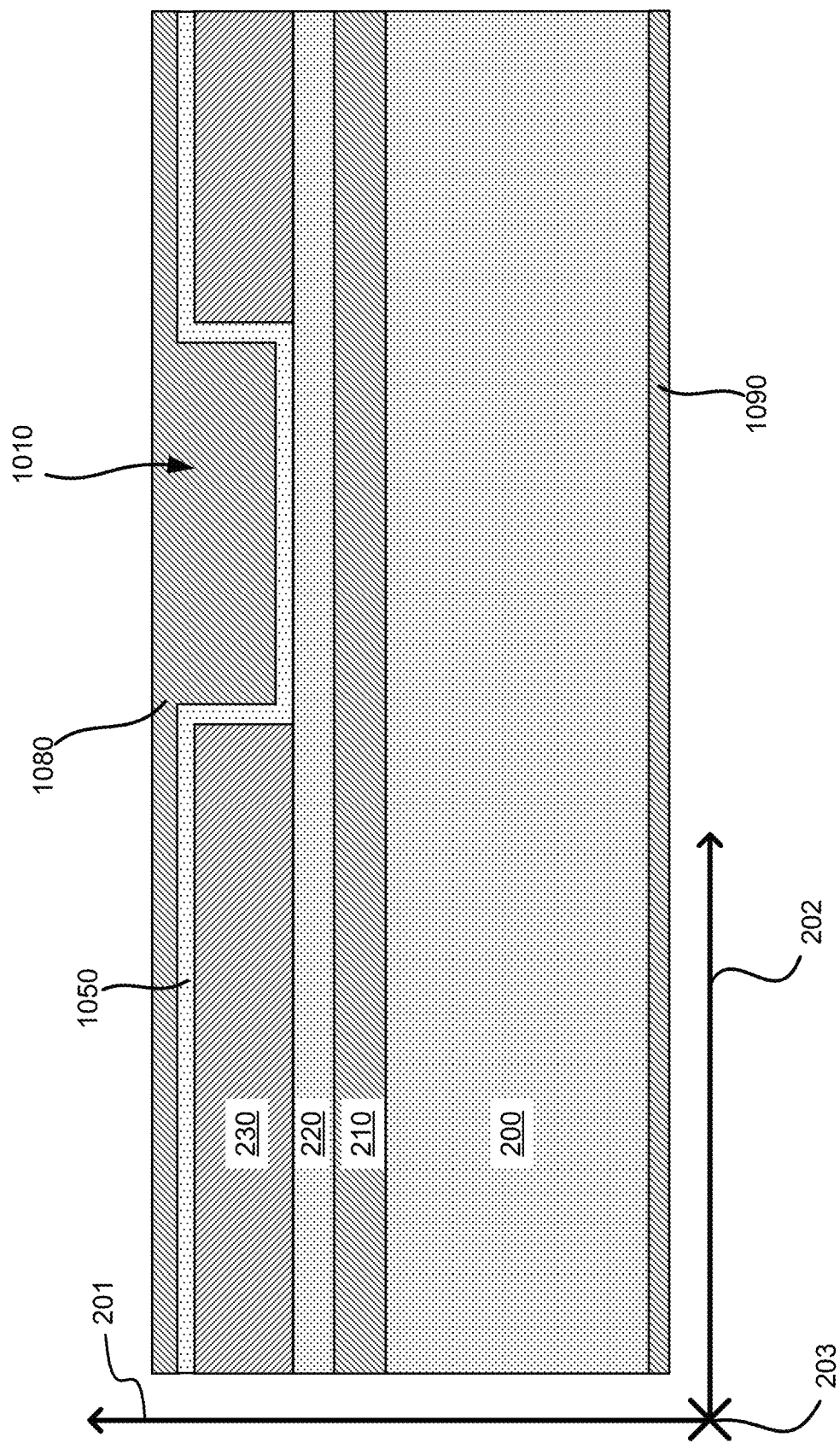
FIG. 25 illustrates a back side protective layer 1090 deposited on a back side of the structure illustrated in FIG. 24, in accord with an embodiment.

FIG. 25 illustrates a back side protective layer 1090 deposited on a back side of the wafer. In some embodiments, back side protective layer 1090 is added to the back of the wafer to protect the back of the wafer (e.g., handle portion) during later etching or other processing. Back side protective layer 1090 may be formed of any convenient material that is compatible with processing herein; $SiO_2$ and/or $Si_3N_4$ are typical choices of material for back side protective layer 1090.

Figure 26:
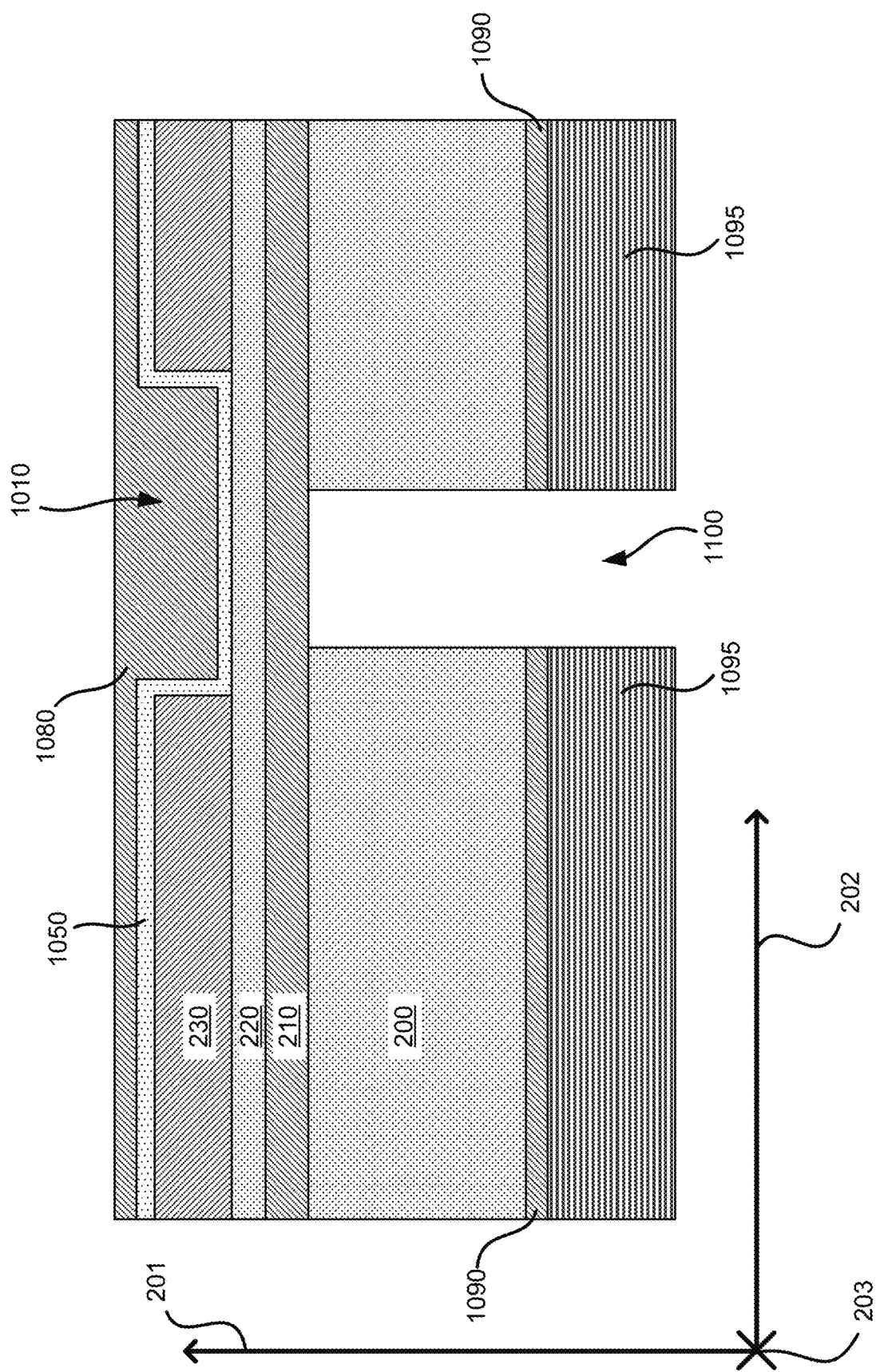
FIG. 26 illustrates a back-to-front photolithography alignment and generation of a photoresist mask, and etching of a back side protective layer and a substrate layer to form a through-silicon via (TSV), in accord with an embodiment.

FIG. 26 illustrates a back-to-front photolithography alignment, definition of a photoresist mask 1095, and etching of back side protective layer 1090 and substrate 200 to form a TSV 1100. Photoresist mask 1095 defining TSV 1100 is on the back side of the wafer, and is aligned so as to be positioned within the horizontal and lateral bounds of recess 1010 on the front side of the wafer. For example, in some embodiments, recess 1010 may be approximately square in the X (horizontal) and Y (lateral) directions, with dimensions of about 15 μm each in X and Y, and backside-to-frontside X and Y registration of the photolithography step that generates mask 1095 may be +/−5 μm, so that TSV 1100 always registers somewhere within the X and Y bounds of recess 1010. Although X and Y registration is generally loose by photolithography norms when aligning from wafer frontside to backside, rotation can usually be controlled relatively well because frontside features that are substantially across the wafer from one another can be used for rotational alignment corrections. Thus, in some embodiments, orthogonality to the waveguide is preserved (e.g., frontside to backside rotation match <0.5 or 0.2 degrees). After locally removing back side protective layer 1090, a TSV etch (e.g., a dry etch that is highly selective to Si over oxide) etches through substrate 200 and stops at BOX layer 210. Photoresist mask 1095 protects other surfaces on the back surface of the wafer except where TSV 1100 is etched.

Figure 27:
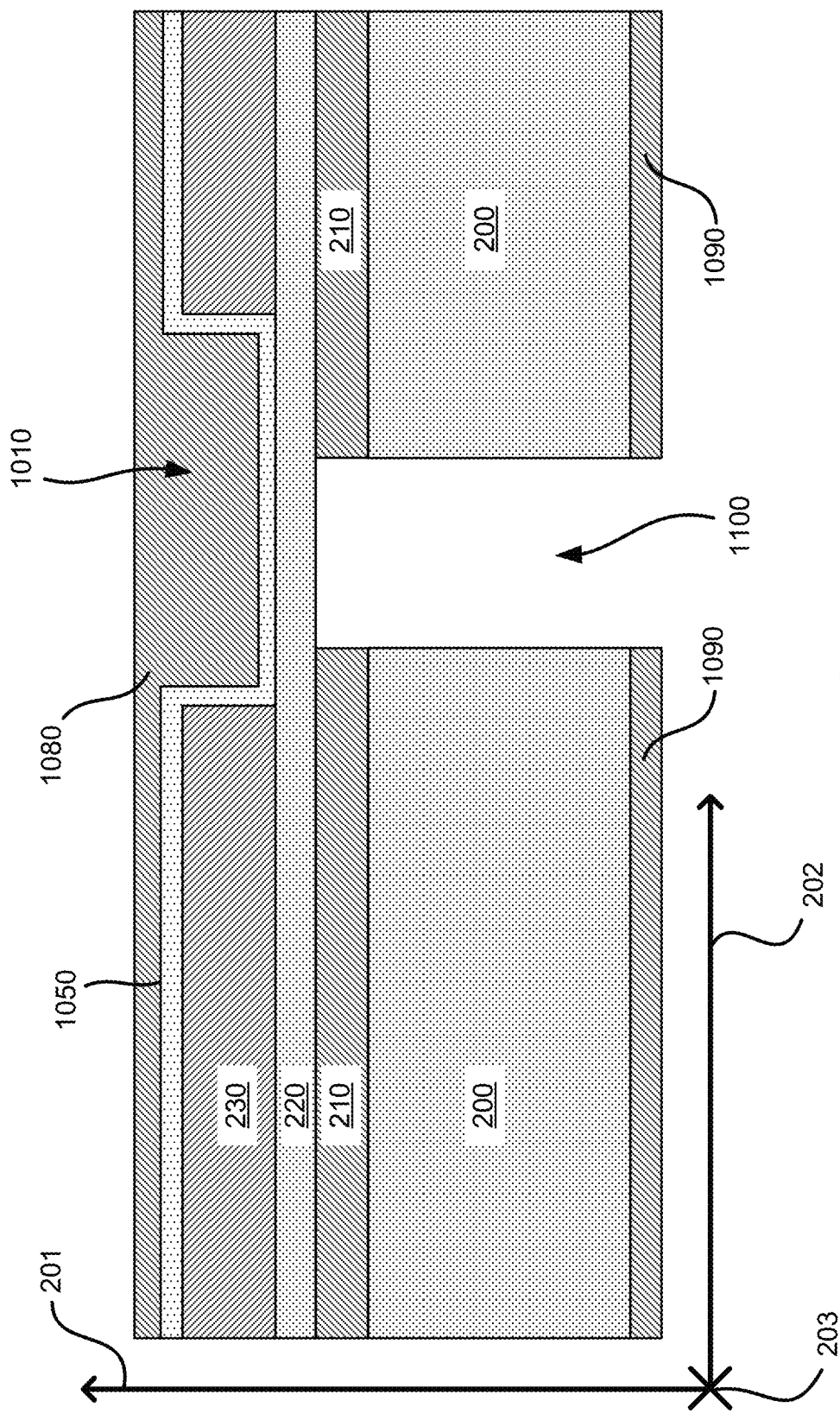
FIG. 27 illustrates a bottom oxide (BOX) layer 210 away from a backside of the structure illustrated in FIG. 26, in accord with an embodiment.

FIG. 27 illustrates BOX layer 210 etched away from the wafer backside, that is, in the area of TSV 1100, using an etch that is selective to the material of BOX layer 210, for example an etch that is selective to Si over $SiO_2$. The etch may be a dry or a wet etch.

Figure 28:
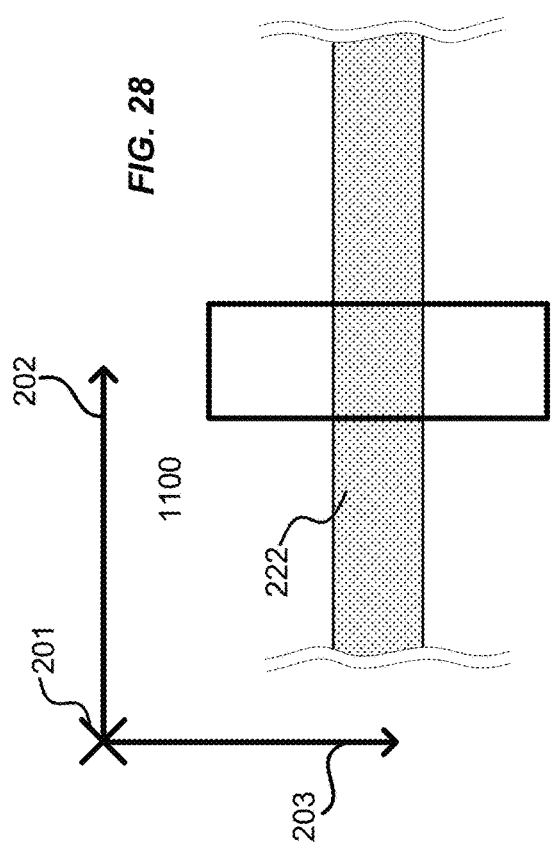
FIG. 28 illustrates an example of a TSV in relation to a waveguide formed from a waveguide layer, in accord with an embodiment.
Figure 29:
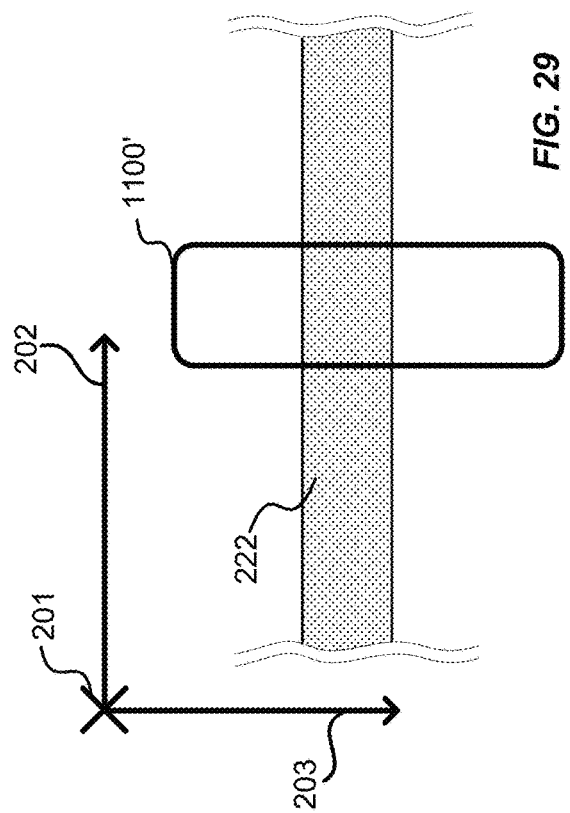
FIG. 29 illustrates another example of a TSV in relation to a waveguide formed from a waveguide layer, in accord with an embodiment.

FIGS. 28 and 29 are schematic plan views illustrating examples of TSVs 1100, 1100' in relation to a waveguide 222 formed from waveguide layer 220. FIGS. 28 and 29 are bottom plan views relative to the wafer, but depict only relative positions of waveguide 222, omitting other layers for clarity of illustration. In FIG. 28, a shape of TSV 1100 is rectangular. TSV 1100 has a width along the x-axis, and a length along the y-axis. In some embodiments, if backside to frontside registration is +/−5 μm along each of the x-axis and the y-axis, then a width of TSV 1100 can be about 5-7 μm and the length of TSV 1100 can be about 16 μm. In some embodiments, TSV 1100 can have a dimension large enough to overlap the waveguide and the first window. In other embodiments, TSV 1100 can be kept small (but within registration tolerances) to minimize material needed to fill the TSV opening (see, e.g., FIG. 36).

In embodiments, it is advantageous to form TSVs with straight sides that are orthogonal to a direction of an intersecting waveguide, and orthogonal to crystal planes of the waveguide. This ensures that mirrored, tilted crystal planes generated by etching material of the waveguide do not introduce a lateral angle into reflected light.

For example, FIG. 29 illustrates a TSV opening 1100' that has a rectangular shape and has maximum dimensions in X and Y similar to those of TSV 1100, but with rounded corners. Rounding can sometimes occur in microfabrication due to photolithography focus effects, wet etches and/or etching of large geometries. In some embodiments, sides of the TSV opening are straight and/or orthogonal with respect to waveguide 222. As shown in FIG. 29, a side of TSV 1100' opening is at least straight and/or orthogonal where it crosses waveguide 222, so that while etching the waveguide, a single plane is etched. For example, if the TSV opening were rounded or curved across the waveguide, it would be difficult to generate a straight, tilted crystal plane.

Figure 30:
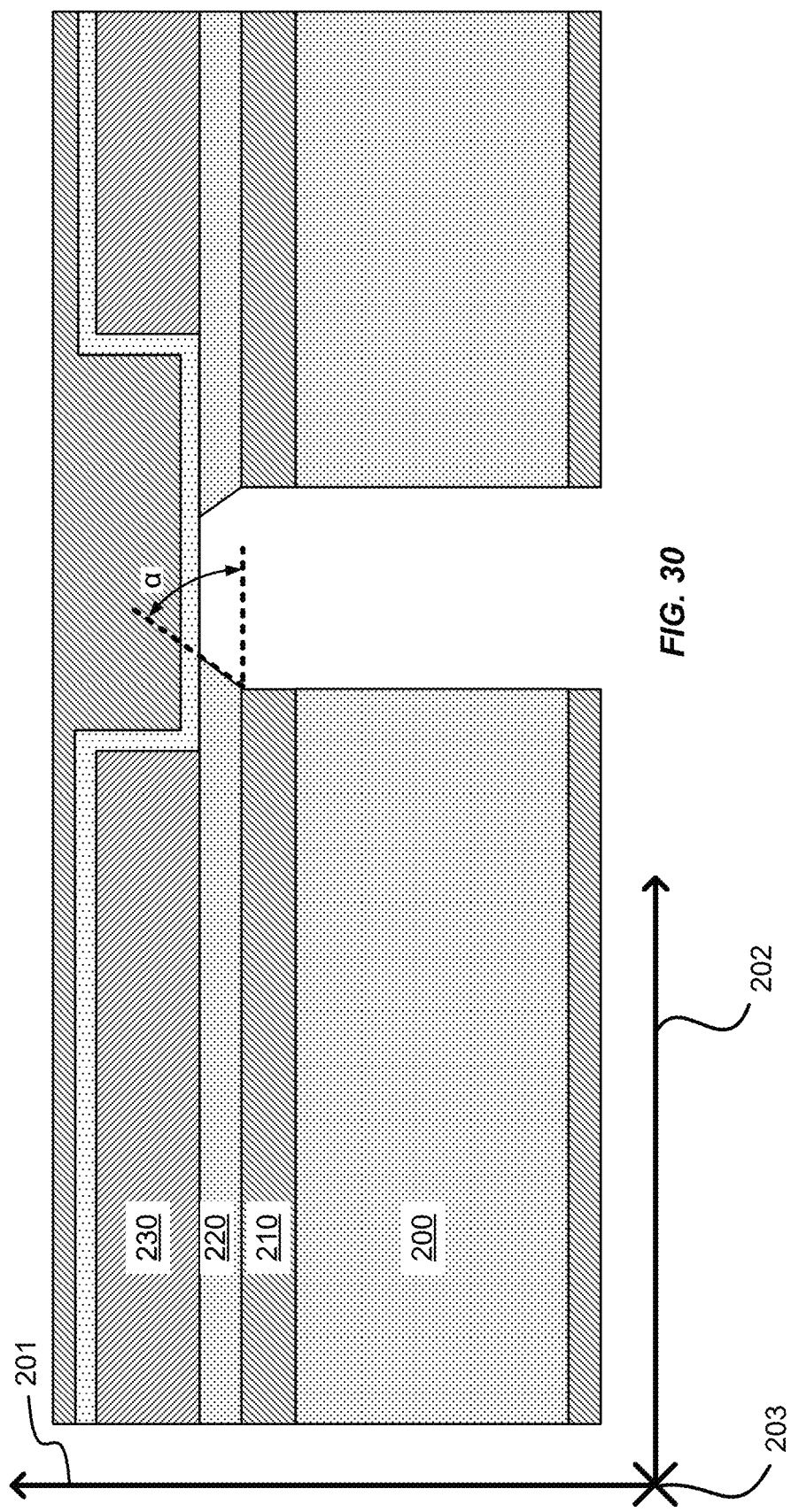
FIG. 30 illustrates the structure shown in FIG. 27 after etching the waveguide layer to form one or more planes at an angle with respect to the horizontal axis, in accord with an embodiment.

FIG. 30 illustrates the structure shown in FIG. 27 after etching waveguide layer 220 (e.g., with a wet etch such as KOH or other alkaline solution) to form one or more planes at an angle α with respect to horizontal axis 202. For example, KOH etches silicon anisotropically along the {111} crystal plane and forms an angle of 54.74 degrees with respect to the {100} plane. Thus α=54.74 degrees. A person of ordinary skill in the art will recognize variations using different materials and/or different silicon crystal cuts and/or etching along different planes.

Figure 31:
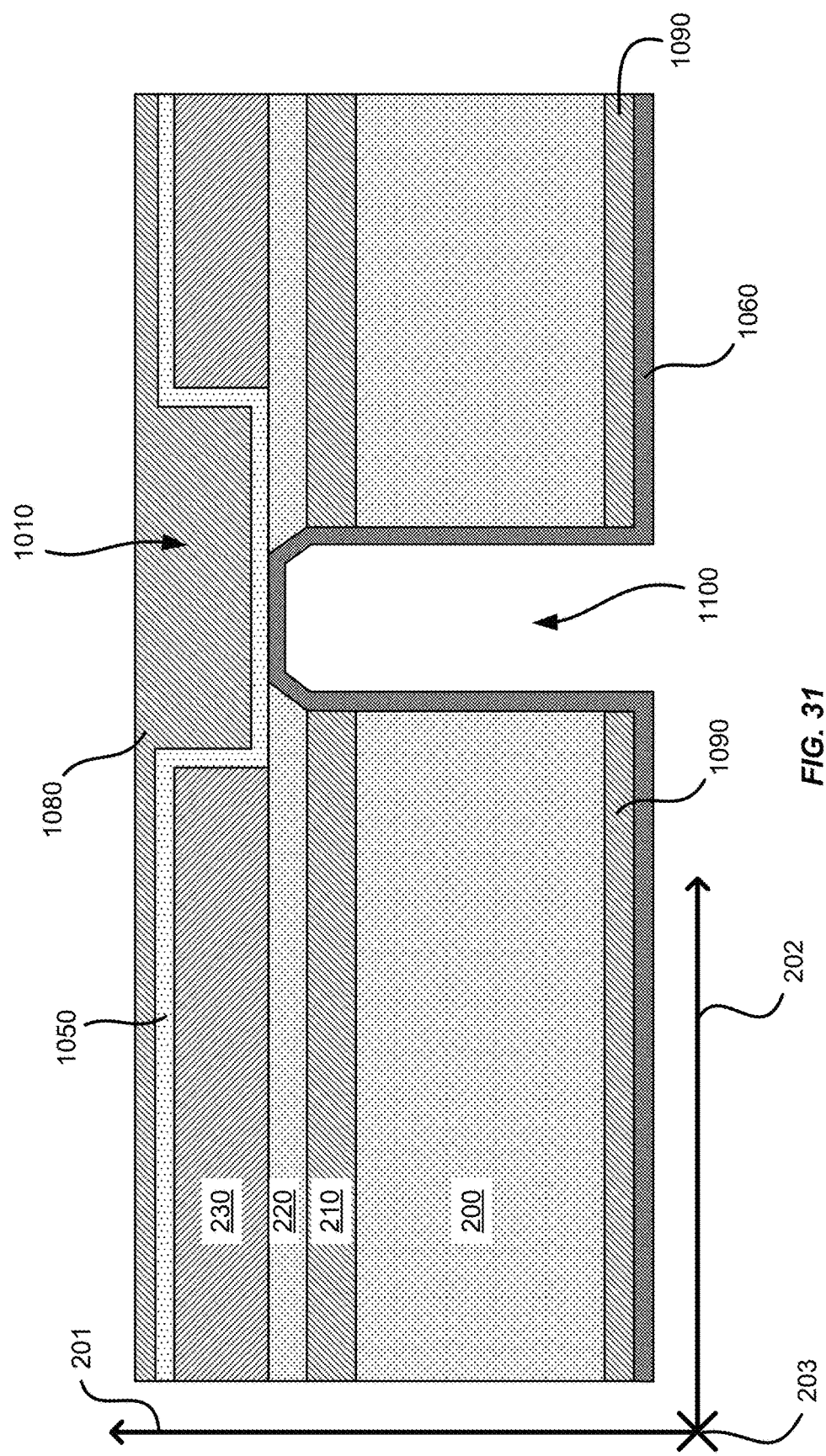
FIG. 31 illustrates deposition of a liner on the back of the structure depicted in FIG. 30, in accord with an embodiment.
Figure 32:
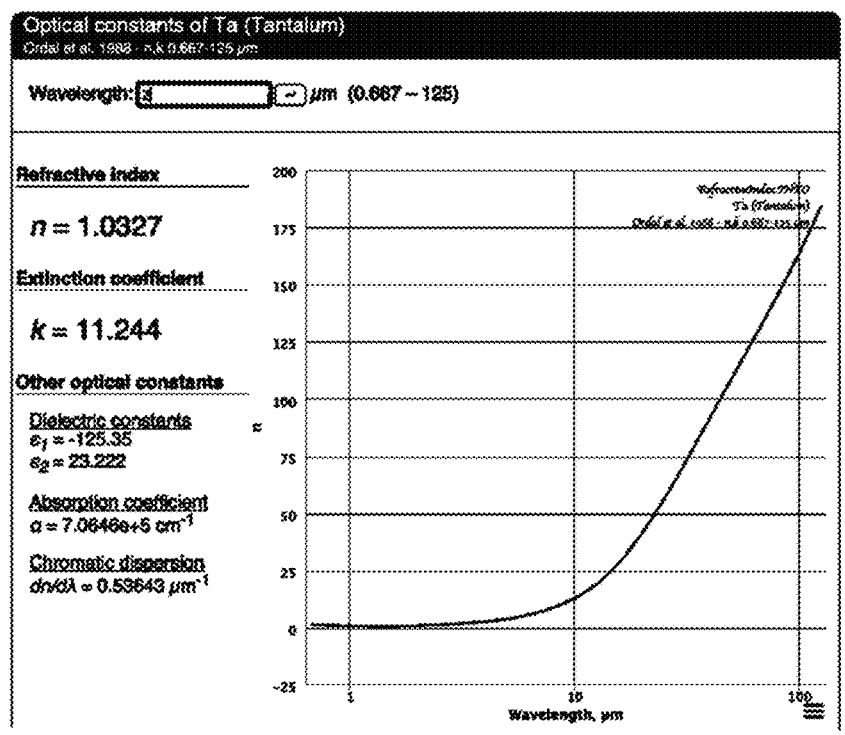
FIG. 32 illustrates refractive index of Ta, in accord with an embodiment.
Figure 33:
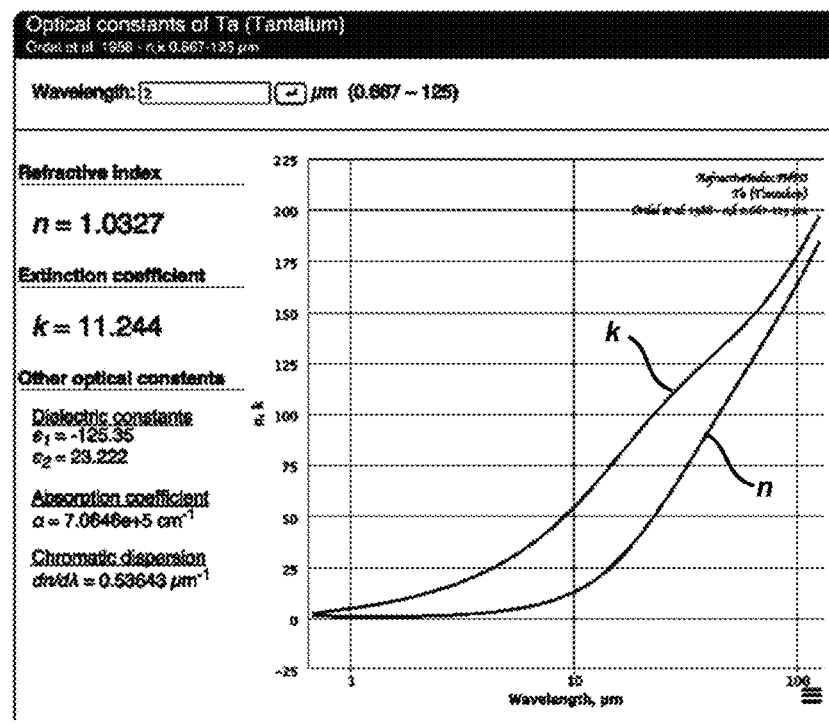
FIG. 33 illustrates refractive index and extinction coefficient of Ta, in accord with an embodiment.
Figure 35:
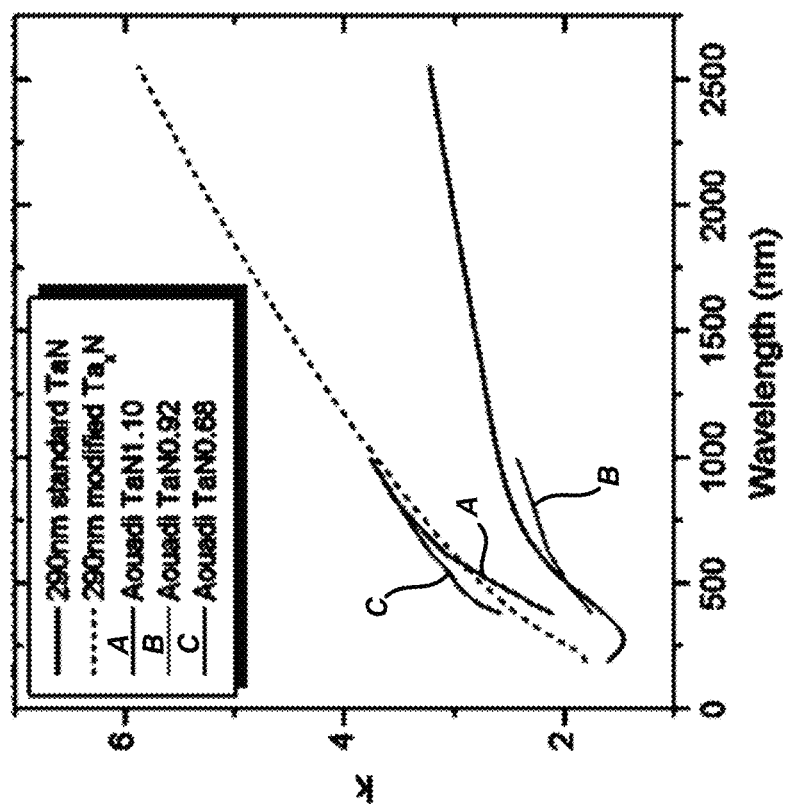
FIG. 35 illustrates extinction coefficient of TaN and $Ta_xN$, in accord with an embodiment.
Figure 34:
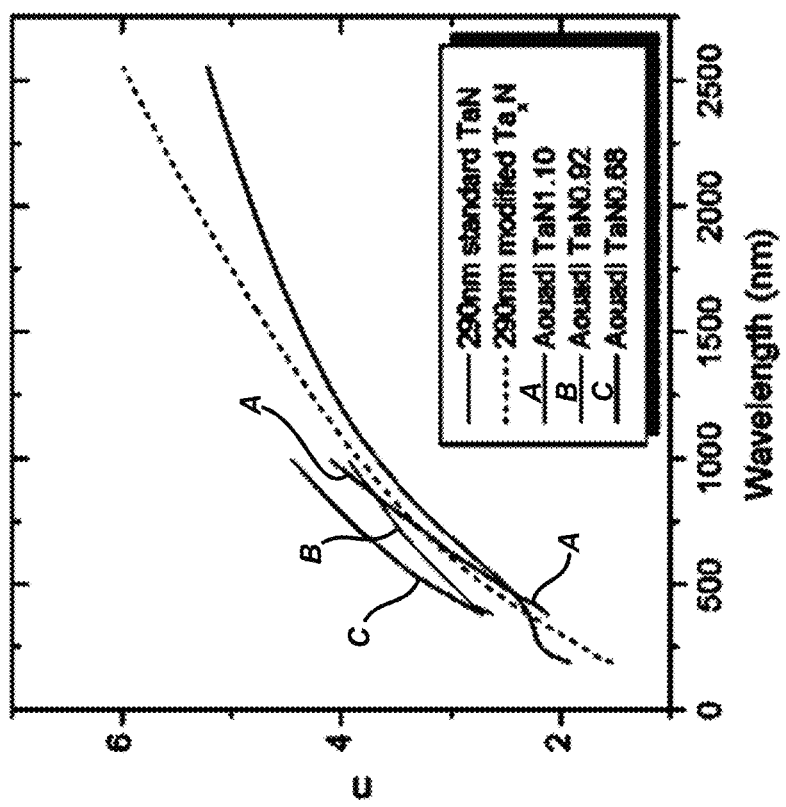
FIG. 34 illustrates refractive index of TaN and $Ta_xN$, in accord with an embodiment.

FIG. 31 illustrates deposition of a liner 1060 on the back of the wafer, including within TSV 1100. Liner 1060 is an example of one or more reflective layers that are applied to the tilted crystal planes illustrated in FIG. 30 to form a tilted mirror. In embodiments, chemical vapor deposition (CVD) is used to apply liner 1060. In some embodiments, liner 1060 is a metal (e.g., Tantalum (Ta) or Tantalum Nitride (TaN)). In some embodiments, the liner has a thickness between 5 nm and 500 nm. Liner 1060 acts as an anti-diffusion barrier for a TSV plug (e.g., copper (Cu), see FIGS. 36-37). In other embodiments, Ta is used instead of TaN because Ta has a larger absorption coefficient (extinction coefficient). FIGS. 32-35 illustrate optical constants, including refractive index (n) and extinction coefficient (k), of Ta, TaN and $Ta_xN$, where x=2 or 4. Values and curve shapes are close to literature data. See also S. M. Aouadi, M. Debessai, *J. Vac. Sci. Technol. A* 22(5), 2004.

Figure 36:
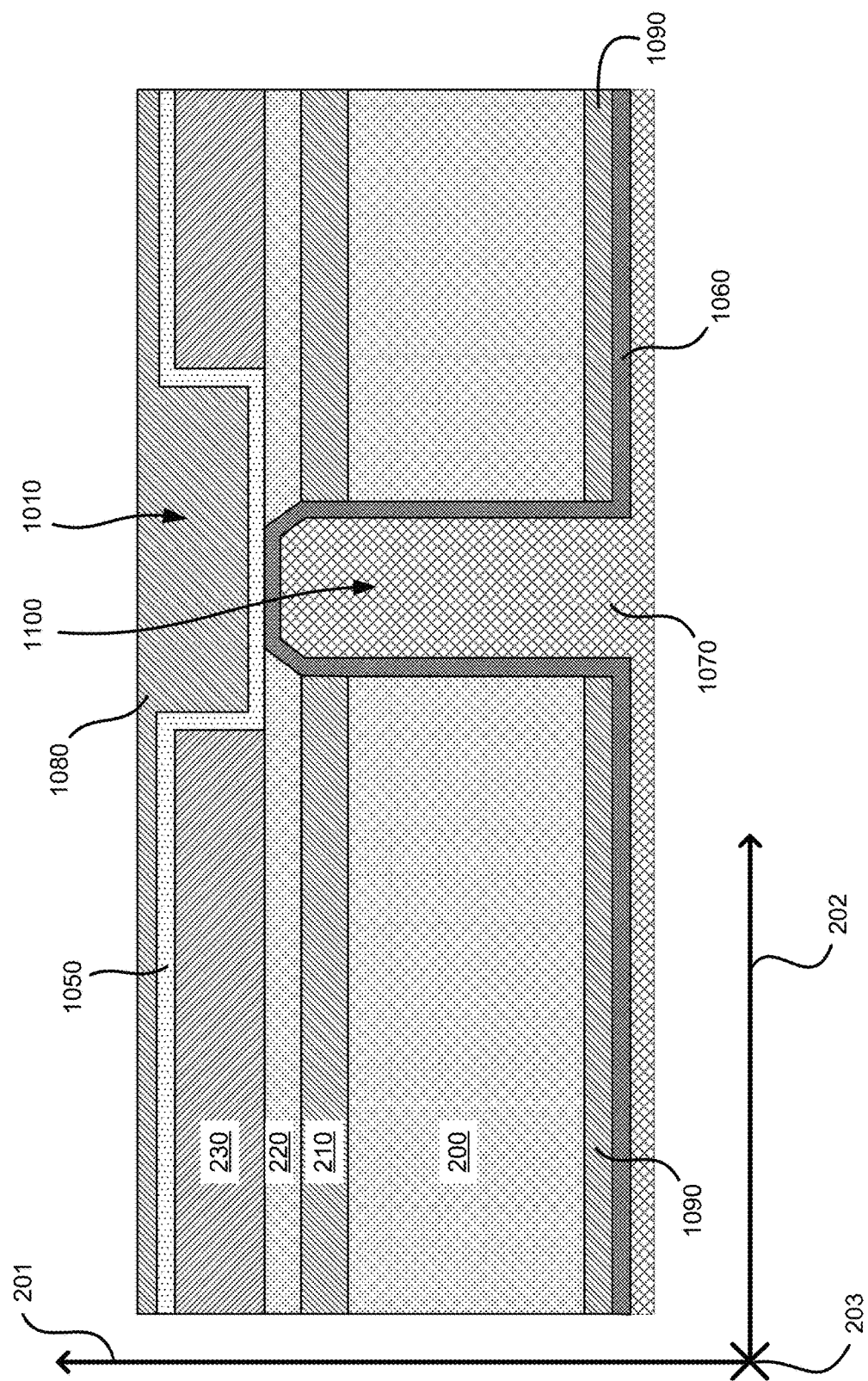
FIG. 36 illustrates the structure from FIG. 31, with metal filling a TSV, in accord with an embodiment.
Figure 37:
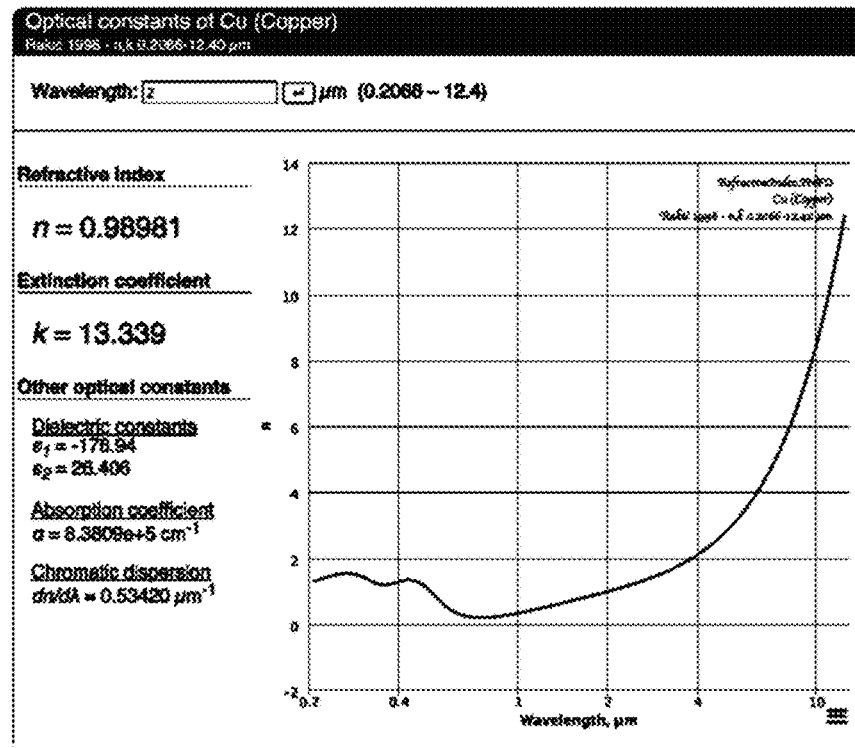
FIG. 37 illustrates refractive index of Cu, in accord with an embodiment.
Figure 38:
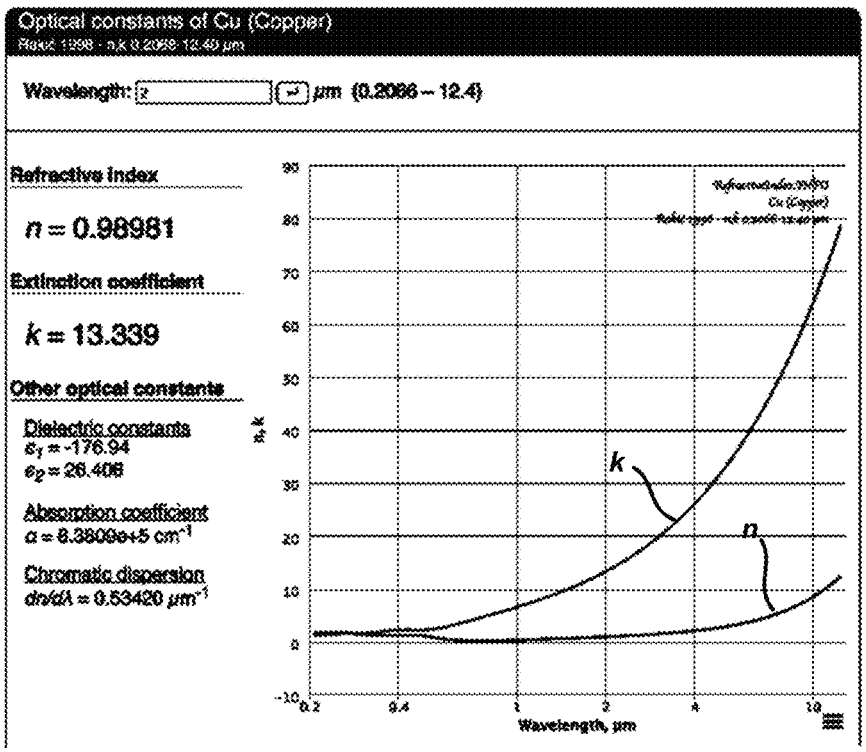
FIG. 38 illustrates refractive index and extinction coefficient of Cu, in accord with an embodiment.

In some embodiments, a thick liner 1060 is used, and the TSV is filled with a non-metallic material (e.g., a dielectric such as $SiO_2$ or SiN). In other embodiments, the TSV is not filled at all besides liner 1060. However, CVD liner deposition can be time consuming, costly, and when too thin, may not reflect all incident light at a mirror thus formed. Thus, in still other embodiments, a liner is not used to save cost, at the expense of less light being reflected from the etched surface. In still other embodiments, a metallic filler such as Cu is used to substantially fill TSV 1100 (in this case, "substantially fill" means that at least one-third of a volume defined by TSV 1100 is filled with the filler). FIG. 36 illustrates the structure from FIG. 31, with metal 1070 filling TSV 1100. In some embodiments, metal 1070 is electroplated copper, while in other embodiments, other plug material is used, such as Al filler with a TiN liner. In some embodiments, TSV holes are filled (e.g., as illustrated in FIG. 36, where metal 1070 fills TSV 1100 clear to the back surface of the wafer) to provide mechanical strength, while in other embodiments, TSV holes are only partially filled (e.g., to save material and/or time). FIGS. 37 and 38 illustrate the refractive index and the extinction coefficient of copper.

Figure 39:
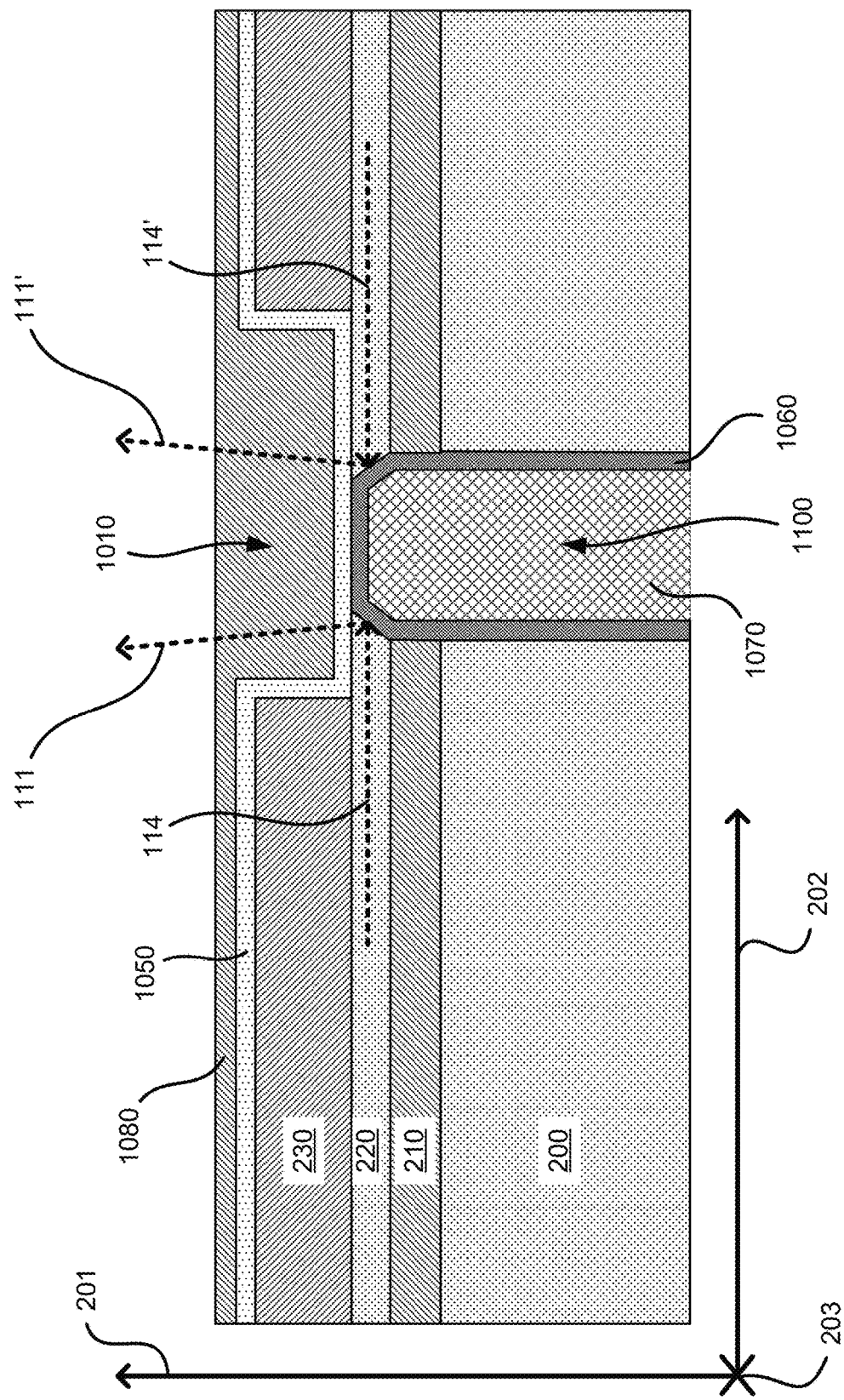
FIG. 39 illustrates the structure shown in FIG. 36, after an optional step of removing excess metal, liner and a back side protective layer, in accord with an embodiment.

FIG. 39 illustrates the structure shown in FIG. 36, after an optional step of removing excess metal 1070, liner 1060 and back side protective layer 1090 from the back of the wafer (e.g., using CMP). Removal of metal 1070, liner 1060 and back side protective layer 1090 from the wafer backside may advantageously improve thermal properties by reducing layers that would impede heat transfer. In use, light 114, 114' traveling through waveguide layer 220 reflects on the mirror formed by TSV processing, and exits through the front of the wafer as light 111, 111'. As shown in FIG. 39, light 114 could approach TSV 1100 from one side while light 114' approaches TSV 1100 from another side, such that a single TSV 1100 could form two output couplers (or up to four output couplers, as discussed below in connection with FIG. 41).

The steps resulting in the structure illustrated in FIG. 39 are presented in the order of etching frontside recess 1010, depositing AR coating 1050 and depositing top side protective layer 1080 before patterning and forming TSV 1100 and the mirror and plug within TSV 1100. However, it is contemplated that such processing could be done in reverse order, that is, forming TSV 1100 first, and forming frontside recess 1010 and AR coating 1050 later. Also, the step of etching through waveguide layer 220 to form tilted planes could possibly be done either before or after frontside recess 1010 is formed, but care should be taken that an uncovered recess 1010 and TSV 1100 do not form a continuous hole at any time, such that liner 1060 and/or AR coating 1050 could not form.

Figure 40:
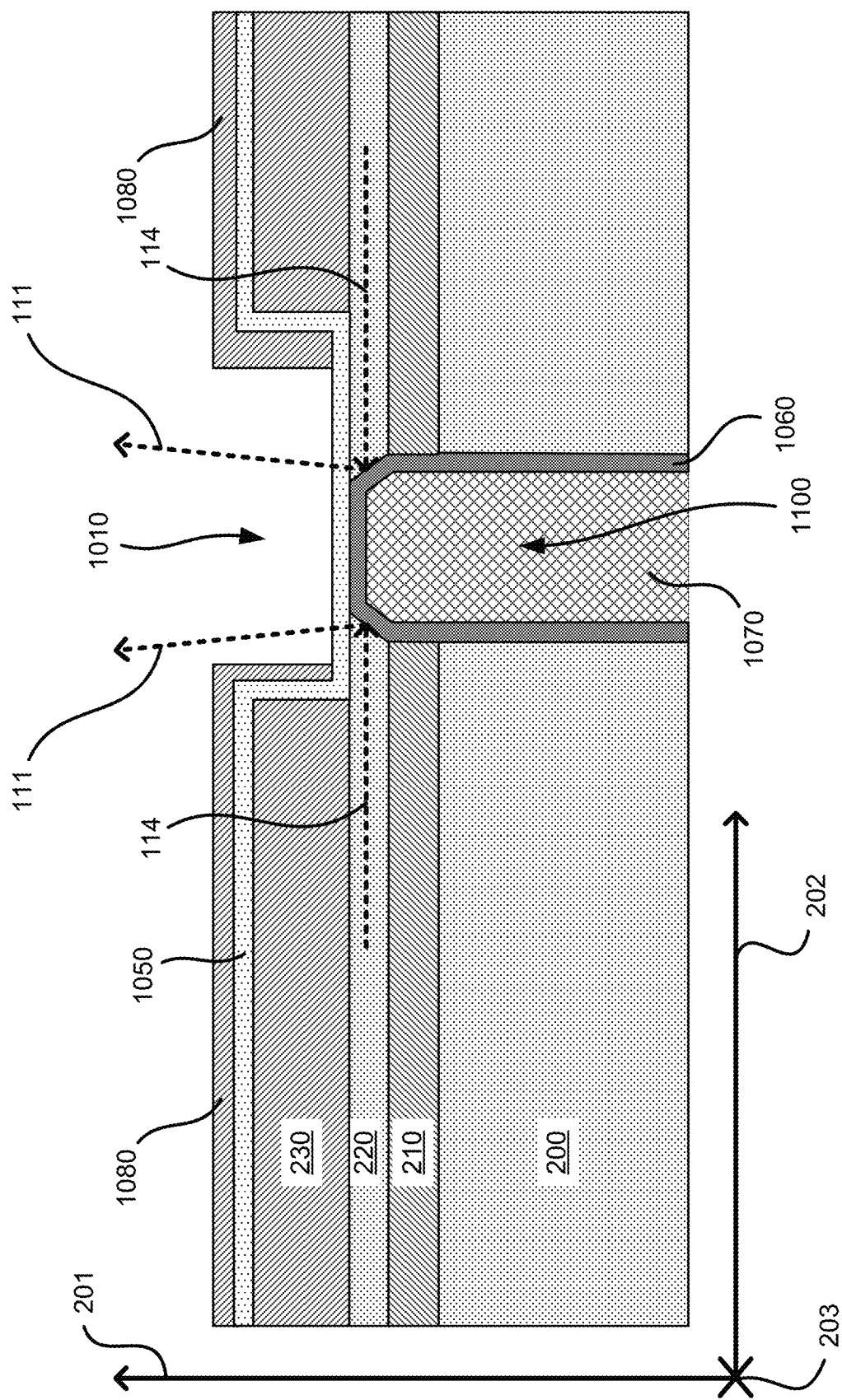
FIG. 40 illustrates the structure shown in FIG. 39, after an optional step of forming a window in a top side protective layer, in accord with an embodiment.

FIG. 40 illustrates the structure shown in FIG. 39, after an optional step of forming a window in top side protective layer 1080, in recess 1010 on the front of the wafer. Top side protective layer 1080 may be etched using etch that is highly selective to the material of top side protective layer 1080 over the material of AR coating 1050. Removal of top side protective layer 1080 may advantageously improve upward transmission of light from waveguide layer 220, by allowing AR coating 1050 to minimize Fresnel reflections and/or to reduce attenuation of light 111. In some embodiments, an additional AR coating is added after the window in top side protective layer 1080 is formed. In other embodiments, the window in top side protective layer 1080 is not formed, for simplicity and/or cost savings.

Figure 41:
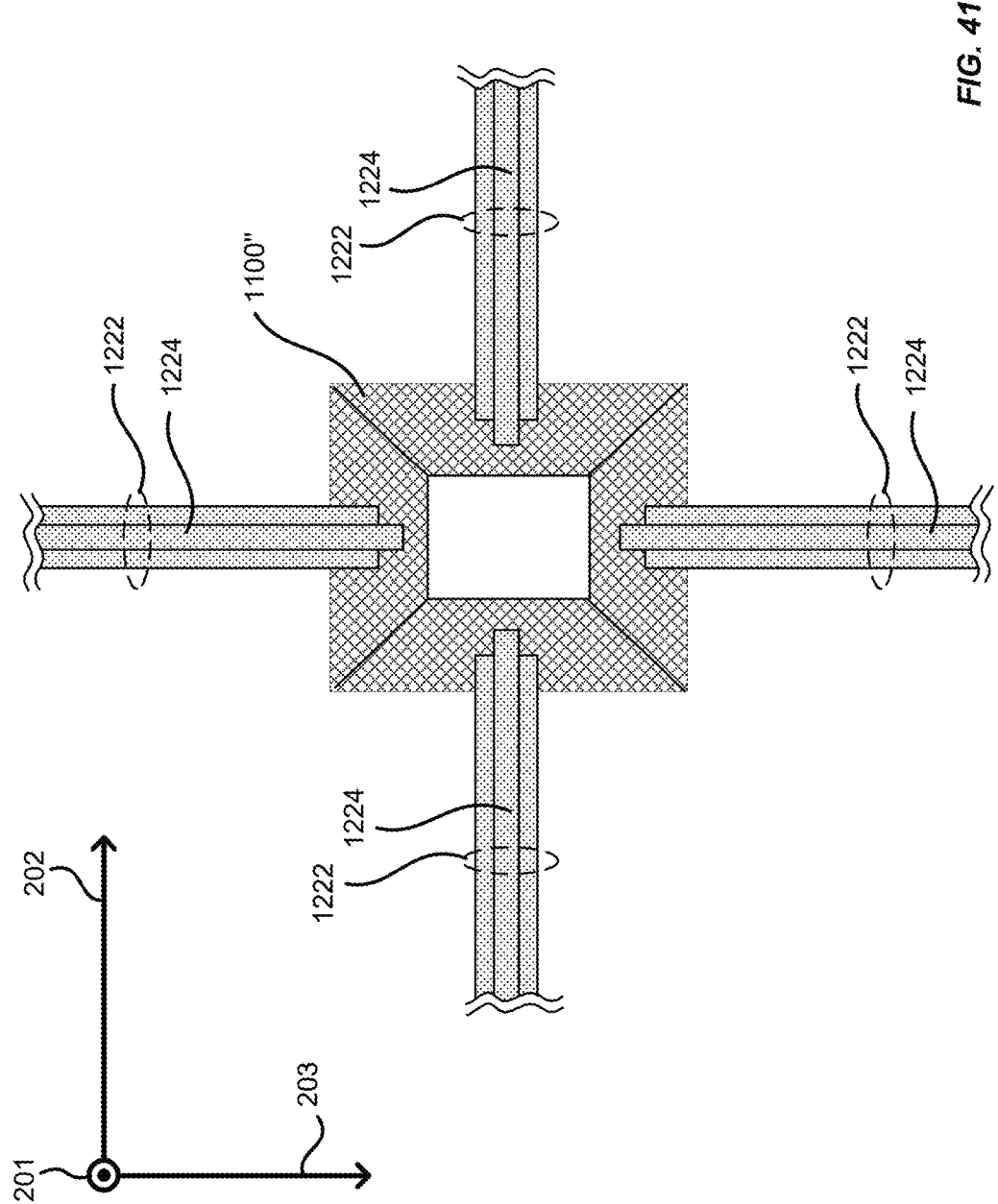
FIG. 41 schematically illustrates, in a plan view, four waveguides with respective ridges intersecting a single TSV, thus forming four output couplers, in accord with an embodiment.

Upon reading and understanding the present disclosure, one skilled in the art will readily recognize many variations, modifications and equivalents to the apparatus and methods described herein. For example, in some embodiments, a plane is etched to form a mirror for output coupling where only one waveguide will intersect it. In other embodiments, two waveguides intersect sides of a single TSV opening to form two output couplers. Similarly, if up to four waveguides were to intersect a single TSV orthogonally to sides of the TSV, up to four output couplers could be formed in one relatively compact TSV opening. FIG. 41 schematically illustrates, in a plan view, a case in which four waveguides 1222 with respective ridges 1224 intersect a single TSV 1100", thus forming four output couplers (only the reflective facets of TSV 1100" are shown, other layers and structures are not shown for clarity of illustration). Similarly, multiple waveguides could intersect the same side of a single, elongated TSV; such an arrangement may be particularly advantageous for forming output couplers of arrayed waveguides. Thus, it is contemplated that when multiple waveguides intersect a common TSV to form output couplers, the waveguides need not face one another, nor be on different sides of the common TSV.

In some embodiments, waveguide layer 220 is processed prior to formation of a TSV based output coupler, or an extra etch stop layer is provided, to facilitate etching a TSV to an appropriate depth without overetching upwards into other layers of the SOI wafer. Such embodiments recognize that when an underlying oxide layer is etched in the vicinity of a waveguide, the oxide etch will continue to etch "around" the waveguide unless etching is stopped at the precise moment that the underside of the waveguide is reached. For example, referring back to FIG. 27, as BOX layer 210 is etched, the cross-section shown in FIG. 27 suggests that a selective etch may stop when it reaches waveguide layer 220, but if FIG. 28 is considered, it becomes evident that the etch will only stop in the cross-sectional plane of FIG. 27 and may not stop in areas of TSV 1100 that extend beyond waveguide 222. Such continued etching can be detrimental because light propagation within waveguide 222 may depend in part on optical interaction between the waveguide and surrounding cladding layers, that is, if such cladding is replaced by a void or a different substance, light propagation and/or mode confinement thereof may be affected.

Figure 42:
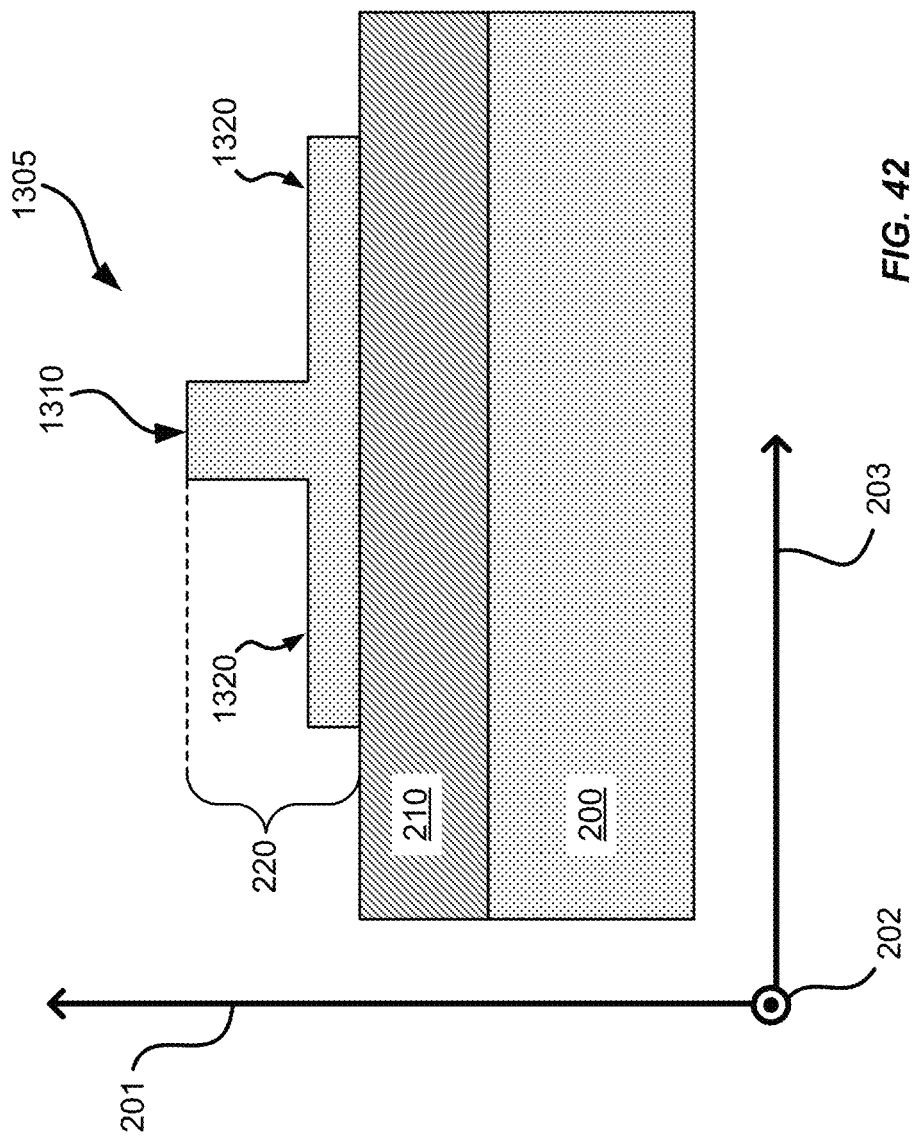
FIG. 42 schematically illustrates a partially formed waveguide 1305 with shoulders for blocking a backside TSV etch, in accord with an embodiment.

FIG. 42 schematically illustrates an embodiment that includes a partially formed waveguide 1305 with shoulders 1320 for blocking a backside TSV etch. As noted above, waveguides are typically formed by photolithography and etching of waveguide layer 220. In the embodiment illustrated in FIG. 42, waveguide 1305 is partially formed, and includes a waveguide main portion 1310 and shoulders 1320. Main portion 1310 has a width that is typically less than one of 12, 10, 8, 5, 4, 3, 2, 1.7, 1.6, or 1.5 µm. In embodiments, the width of main portion 1310 is less than a width of a TSV being etched from the backside. In these cases, the TSV etch would encounter main portion 1310 in some locations while other locations would undesirably continue etching through an overlying cladding around the sides of main portion 1310.

Figure 43:
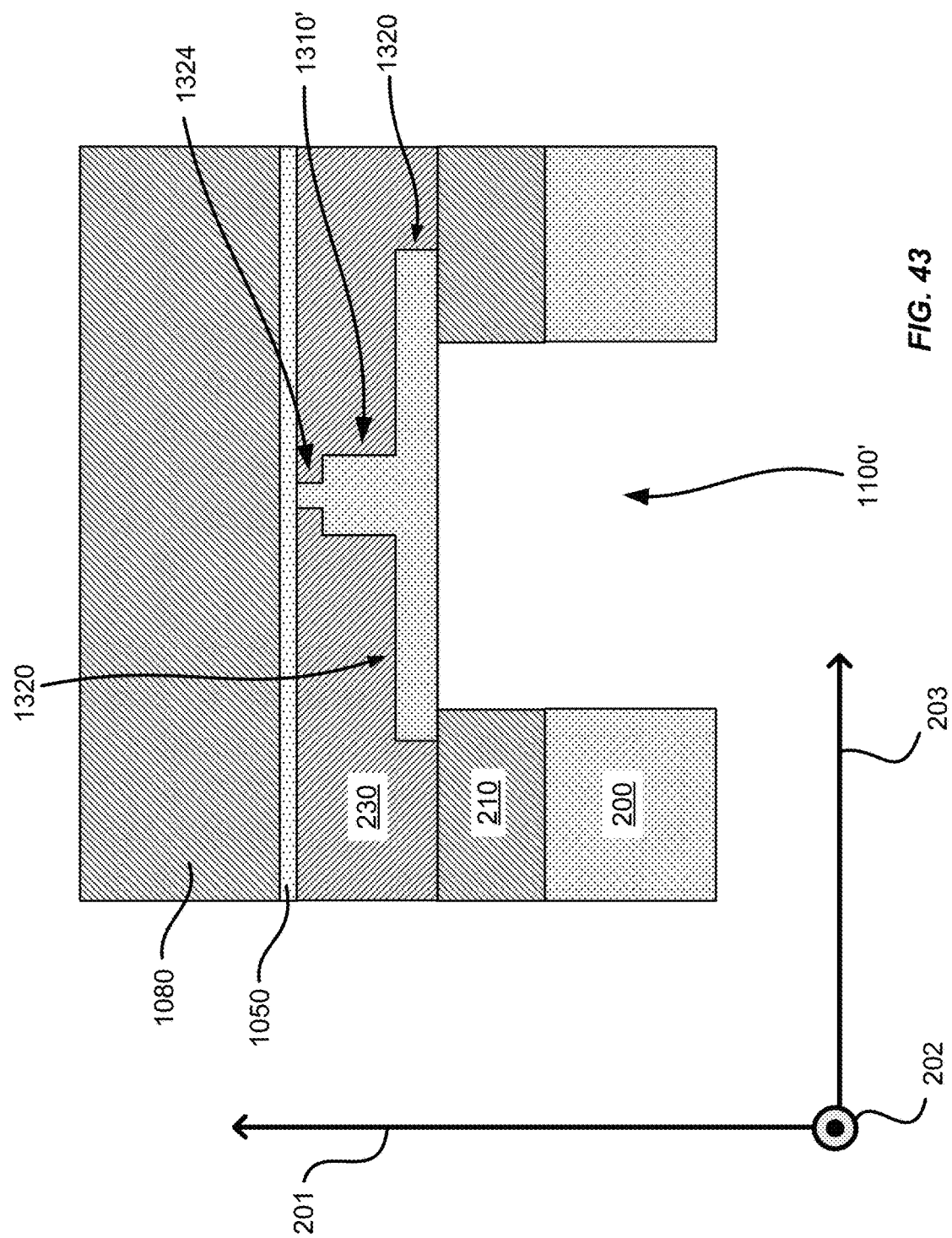
FIG. 43 schematically illustrates the structure of FIG. 42, after further processing, in accord with an embodiment.

A typical process sequence for forming partially formed waveguide 1305 may include blanket deposition of waveguide layer 220, photolithography and etching of waveguide main portion 1310 to an intermediate depth so as to leave an unetched portion of waveguide layer 220 everywhere, and photolithography and etching that protects main portions 1310 and shoulders 1320, clearing the unetched portion away in unneeded areas (e.g., outside a likely intersection of a TSV, as discussed below). Alternatively, the photolithography and etch steps could be reversed to first define full thickness portions of waveguide layer 220 everywhere to the lateral and horizontal extents of main portion 1310 and shoulders 1320, then use photolithography to protect waveguide main portions 1310 everywhere, and etch only shoulders 1320 to the intermediate depth. One skilled in the art will readily recognize many variations, modifications and equivalents. Shoulders 1320 are advantageously thin (e.g., on the order of 100 Å, 1000 Å, 2000 Å or 3000 Å for waveguides that are to be used with light of 1.3 µm-1.55 µm wavelength, and scaled appropriately for shorter or longer wavelengths) so that light being guided by the finished waveguide is not appreciably affected by their presence. That is, an optical mode (e.g., a fundamental mode propagating within waveguide 1305) does not "see" shoulders 1320 (i.e., the optical mode would change little, or not at all, if shoulders 1320 were absent). FIG. 43 schematically illustrates the structure of FIG. 42, after a further photolithography and etch step modifies waveguide main portion 1310 to form waveguide 1322 to include a waveguide ridge 1324, and after cladding layer 230 is deposited, planarization is performed, and AR coating 1050 and top side protective layer 1080 are deposited (e.g., as depicted in FIGS. 22, 24 and others).

Figure 44:
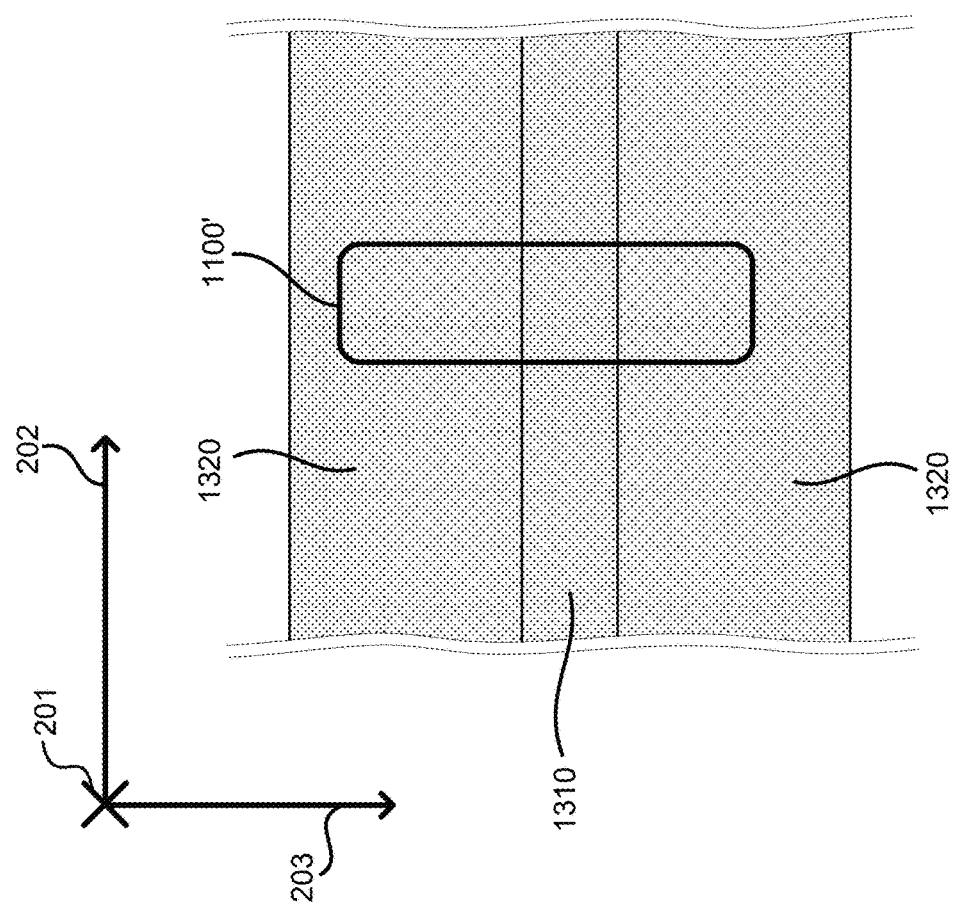
FIG. 44 schematically illustrates an outline of the same TSV as depicted in FIG. 28 against an underside of the structure depicted in FIGS. 42 and 43, in accord with an embodiment.

FIG. 44 schematically illustrates an outline of TSV 1100' (e.g., the same TSV outline as depicted in FIG. 28) against an underside of the structure depicted in FIGS. 42 and 43, and with cladding and handle layers omitted for clarity of illustration. Shoulders 1320 are next to waveguide main portion 1320. Because shoulders 1320 are made of the same material as waveguide 1310 (e.g., crystalline silicon) they can act as an etch stop, e.g., during the oxide etch of TSV 1100'. By preventing the adverse effects of such oxide etch next to a waveguide, shoulders 1320 thus permit larger registration tolerances and/or a larger TSV opening than if shoulders 1320 were not present. In some embodiments, the shoulders are thin (e.g., less than 300, 200, or 100 nm).

Figure 45:
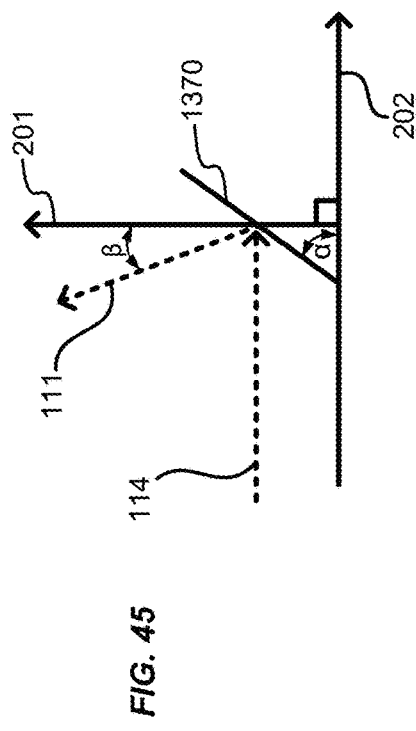
FIG. 45 schematically illustrates how a mirror at an angle with respect to a horizontal axis will reflect incident light traveling along the horizontal axis, in accord with an embodiment.

FIG. 45 schematically illustrates how a mirror 1370 at an angle α with respect to horizontal axis 202 will reflect incident light 114 traveling along horizontal axis 202 into an angle β with respect to normal axis 201 according to the equation:

$$\beta = 90 \text{ degrees} - 2\alpha \qquad \text{Equation (1)}$$

Thus, in one embodiment, if α=54.74 degrees, then β=−19.48 degrees. The negative sign indicates that the reflected light has a negative component along horizontal axis 202. In embodiments, β is advantageously within a range of |β|<50 degrees, so that light detection hardware can be positioned more or less vertically with respect to the waveguide being tested, to facilitate the light detection hardware having a small physical size, optimal alignment tolerance and good mechanical stability. Thus in these embodiments, from equation (1), it can be shown that 20 degrees<α<70 degrees. In some of these embodiments, β is most advantageously within a range of |β|<25 degrees, such from equation (1), 32.5 degrees<α<57.5 degrees.

Figure 48:
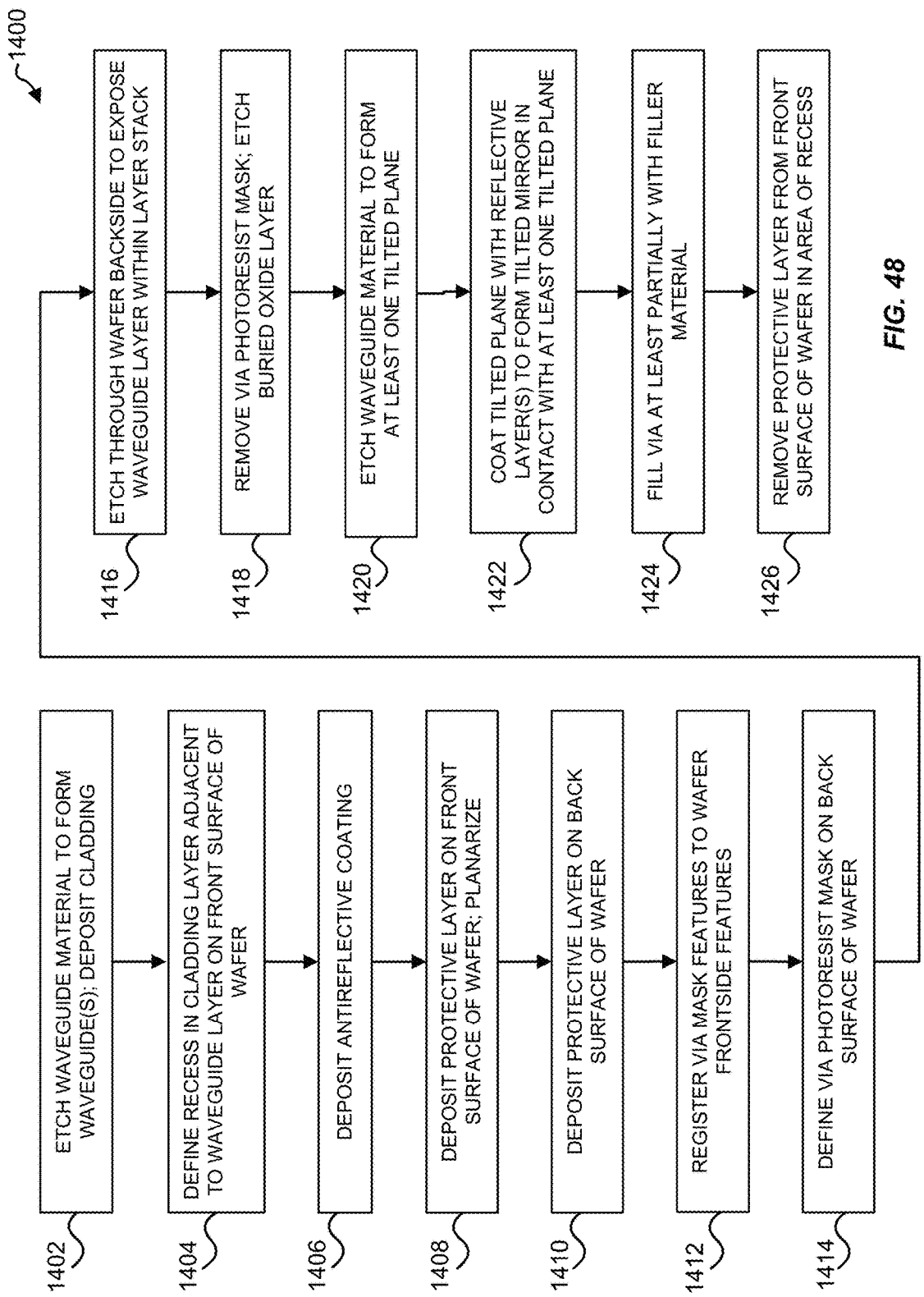
FIG. 48 is a flowchart of a method for forming a vertical coupler for a waveguide, in accord with an embodiment.

FIG. 48 is a flowchart of a method 1400 for forming a vertical coupler for a waveguide. Method 1400 is applicable when the waveguide is formed of a waveguide material that is disposed within a layer stack on a top surface of a wafer. Although the steps of method 1400 will be discussed as pertinent to a single vertical coupler; it should be understood that these steps are typically performed on an SOI substrate having multiple instances of the vertical coupler being manufactured in parallel. It will be evident to one skilled in the art that many of the steps of method 1400 are optional, that is, by omitting such steps, a finished vertical coupler can still be built but may not have the same finished configuration as one built with all of the steps. Furthermore, certain ones of the steps of method 1400 can be performed in a different order, and/or repeated. Where any of the steps of method 1400 indicate that a material is to be patterned or etched, it should be understood that a photoresist layer may be patterned to protect structures that are not to be affected by the etch.

Step 1402 is an optional or preparatory step in which a layer of waveguide material on an SOI substrate is etched to form one or more waveguides. Areas etched in step 702 would typically be defined by photolithography and would include either and/or both of etching through a waveguide material layer to define individual portions of waveguide material and etching edges of a waveguide to leave a ridge for guiding an optical mode. After the waveguides and/or ridges are defined, a cladding material may be deposited. Examples of step 1402 are etching waveguide layer 220 as shown in any of FIGS. 2, 21, 22, 24-27, 30, 31, 36, 39 and 40 to define individual waveguides, such as waveguides 222 shown in FIGS. 28 and 29 and/or waveguides 1222, FIG. 41, and depositing cladding layer 230, as shown in any of FIGS. 2, 21, 22, 24-27, 30, 31, 36, 39 and 40. The waveguide layer, the cladding layer and other layers (such as, but not limited to a buried oxide layer) are considered to be part of a layer stack on a front surface of a wafer.

Steps 1404, 1406, 1408 and 1410 are further optional steps of method 1400. Step 1404 defines a recess in a cladding layer on the front side of the wafer. An example of step 1404 is forming recess 1010 in cladding layer 230. In embodiments, the recess formed in optional step 1404 reduces a distance through which reflected light travels in a finished vertical coupler before passing into free space, which may help in beam control and/or reducing attenuation of the light. Step 1406 deposits an antireflective coating, for example antireflective coating 1050 as shown in any of FIGS. 21, 22, 24-27, 30, 31, 36, 39 and 40. Antireflective coating 1050 advantageously reduces reflections and increases forward coupling of light out of a vertical coupler. Steps 1408 and 1410 deposit protective layers on a front surface and a back surface of the wafer, respectively. Examples of steps 1408 and 1410 are depositing front side protective layer 1080 and back side protective layer 1090 respectively, as shown in FIGS. 24, 39 and 40 (layer 1080 only) and FIGS. 27, 30, 31, 36 (layers 1080 and 1090). Protective layers 1080 and/or 1090 advantageously protect underlying features on which they are deposited, through mechanical and/or chemical processing steps. In step 1408, protective layer 1080 is optionally planarized.

In step 1412, via mask features are registered with wafer frontside features through a back side to front side alignment, and in step 1414, a via photoresist mask is defined on the back surface of the wafer. An example of steps 1412 and 1414 are first aligning a mask on the wafer backside to wafer frontside features, then exposing and developing photoresist using the mask to form photoresist mask 1095, FIG. 26. Step 1416 etches through the wafer backside to the waveguide layer in the layer stack on the front surface of the wafer. An example of step 1416 is etching through substrate 200, FIG. 26. Step 1418 removes the photoresist mask and optionally etches a buried oxide layer. Examples of step 1418 are removing photoresist mask 1095 and etching buried oxide layer 210, as shown in FIG. 27. It will be appreciated that etching buried oxide layer is only done when the buried oxide layer is part of the front side layer stack, and that removing the via photoresist mask and etching the buried oxide layer may be done in the sequence listed, or in reverse sequence. One skilled in the art will readily recognize many variations, modifications and equivalents.

Step 1420 etches the waveguide material to form at least one tilted plane. An example of step 1420 is etching waveguide layer 220 to form the tilted planes shown in FIG. 30. Step 1422 coats the at least one tilted plane with one or more reflective layers to form a tilted mirror in contact with the at least one tilted plane. An example of step 1422 is depositing liner 1060, FIGS. 31, 36, 39, 40.

An optional step 1424 fills the via at least partially with a filler material; some embodiments only fill the via partially while others fill it completely. An example of step 1424 is filling via 1100 with filler material 1070, as shown in FIGS. 36, 39, 40. Another optional step 1426 removes the protective layer from the front surface of the wafer in the area of the recess (formed in step 1404). An example of step 1426 is removing front side protective layer 1080 from recess 1010, as shown in FIG. 40.

The specific details of particular embodiments may be combined in any suitable manner without departing from the spirit and scope of embodiments of the invention. For example, though a-Si is described in certain embodiments herein, the a-Si can be annealed to convert the a-Si to polysilicon. In another example, a waveguide bridge (e.g., any of waveguide bridges 540, 540', 640, 640' and/or others) may be made of a material (e.g., dielectric) with a greater index of refraction than material next to the bridge (e.g., greater than 1 (air) and/or an index of adjacent cladding layers (e.g., BOX layer 210 and/or upper cladding layer 230)). Using the waveguide bridge can better confine light than not having the waveguide bridge, improving performance of the output coupler by reducing light scatter to non-useful directions. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to explain the principles of the invention and its practical applications to thereby enable others skilled in the art to utilize the invention in various embodiments and with various modifications as are suited to the particular use contemplated.

What is claimed is:

1. A method of forming a vertical output coupler for a waveguide that propagates light, along a horizontal propagation direction, through a waveguide material that overlies a buried oxide layer, the method comprising:
   etching the waveguide material to form the waveguide;
   etching the waveguide material to remove at least a first portion of the waveguide, wherein the etching forms:
   at least a first tilted plane in the waveguide material, and
   a space between an unetched portion of the waveguide and the first tilted plane;
   coating the first tilted plane with a reflective metal to form a tilted mirror; and
   depositing an index matching material into the space between the unetched portion of the waveguide and the tilted mirror so that light propagating through the waveguide into the space continues through the index matching material to the tilted mirror, and the tilted mirror reflects the light upwardly, wherein depositing the index matching material into the space between the unetched portion of the waveguide and the tilted mirror comprises depositing amorphous silicon.

2. The method of claim 1, further comprising annealing the amorphous silicon, to convert the amorphous silicon to polysilicon.

3. A method of forming a vertical output coupler for a waveguide that propagates light, along a horizontal propagation direction, through a waveguide material that overlies a buried oxide layer, the method comprising:
   etching the waveguide material to form the waveguide;
   etching the waveguide material to remove at least a first portion of the waveguide, wherein the etching forms:
   at least a first tilted plane in the waveguide material, and
   a space between an unetched portion of the waveguide and the first tilted plane;
   coating the first tilted plane with a reflective metal to form a tilted mirror; and
   depositing an index matching material into the space between the unetched portion of the waveguide and the tilted mirror so that light propagating through the waveguide into the space continues through the index matching material to the tilted mirror, and the tilted mirror reflects the light upwardly, wherein depositing the index matching material into the space between the unetched portion of the waveguide and the tilted mirror comprises depositing the index matching material to a thickness that substantially exceeds a height of the unetched portion of the waveguide;
   the method further comprising etching the index matching material to form a bridge between the unetched portion of the waveguide and the tilted mirror, the bridge being approximately equal in height to the unetched portion of the waveguide.

4. The method of claim 3, further comprising planarizing the index matching material, prior to etching the index matching material to form the bridge between the unetched portion of the waveguide and the tilted mirror.

5. The method of claim 3, further comprising laterally patterning the index matching material to form a waveguide ridge that adjoins a waveguide ridge of the unetched portion of the waveguide.

6. The method of claim 5, wherein laterally patterning the index matching material to form the waveguide ridge comprises patterning the index matching material with a profile that tapers outwardly from an initial width matching the waveguide ridge of the unetched portion of the waveguide, to a final width proximate the tilted mirror so that a beam size of the light propagating through the waveguide expands as it propagates toward the tilted mirror.

7. A method of forming a vertical output coupler for a waveguide that propagates light, along a horizontal propagation direction, through a waveguide material that overlies a buried oxide layer, the method comprising:
    etching the waveguide material to form the waveguide;
    etching the waveguide material to remove at least a first portion of the waveguide, wherein the etching forms:
        at least a first tilted plane in the waveguide material,
        a space between an unetched portion of the waveguide and the first tilted plane, and
        a second tilted plane that bounds the unetched portion of the waveguide;
    coating the first tilted plane with a reflective metal to form a tilted mirror;
    depositing an index matching material into the space between the unetched portion of the waveguide and the tilted mirror so that light propagating through the waveguide into the space continues through the index matching material to the tilted mirror, and the tilted mirror reflects the light upwardly;
    forming a photoresist mask over the first tilted plane;
    etching away the second tilted plane to enlarge the space, leaving a substantially vertical end face on the unetched portion of the waveguide, while the photoresist mask protects the first tilted plane; and
    etching a portion of the buried oxide layer beneath the enlarged space, after etching away the second tilted plane and before depositing the index matching material;
    wherein the steps of forming the photoresist mask and etching away the second tilted plane precede coating the first tilted plane with the reflective metal.

8. A method of forming a vertical output coupler for a waveguide that propagates light, along a horizontal propagation direction, through a waveguide material that overlies a buried oxide layer, the method comprising:
    etching the waveguide material to form the waveguide;
    etching the waveguide material to remove at least a first portion of the waveguide, wherein the etching forms:
        at least a first tilted plane in the waveguide material,
        a space between an unetched portion of the waveguide and the first tilted plane, and
        a second tilted plane that bounds the unetched portion of the waveguide;
    coating the first tilted plane with a reflective metal to form a tilted mirror;
    depositing an index matching material into the space between the unetched portion of the waveguide and the tilted mirror so that light propagating through the waveguide into the space continues through the index matching material to the tilted mirror, and the tilted mirror reflects the light upwardly;
    forming a photoresist mask over the first tilted plane;
    etching away the second tilted plane to enlarge the space, leaving a substantially vertical end face on the unetched portion of the waveguide, while the photoresist mask protects the first tilted plane; and
    further comprising, after coating the first tilted plane with the reflective metal to form the tilted mirror:
    depositing a support material over the enlarged space and unetched portions of the waveguide; and
    etching back the support material deposited over the space until a top surface of the etched back support material substantially coincides with a top surface of the buried oxide layer, so that the remaining support material deposited over the space forms a bridge support for the index matching material;
    wherein:
    the steps of depositing the support material, planarizing the support material and etching the support material precede the step of depositing the index matching material; and
    the steps of forming the photoresist mask and etching away the second tilted plane precede coating the first tilted plane with the reflective metal.

9. The method of claim 8, further comprising planarizing the support material deposited over the space and the unetched portions of the waveguide prior to the step of etching back the support material.

10. A method of forming a vertical output coupler for a waveguide that propagates light, along a horizontal propagation direction, through a waveguide material that overlies a buried oxide layer, the method comprising:
    etching the waveguide material to form the waveguide;
    etching the waveguide material to remove at least a first portion of the waveguide, wherein the etching forms:
        at least a first tilted plane in the waveguide material, and
        a space between an unetched portion of the waveguide and the first tilted plane;
    coating the first tilted plane with a reflective metal to form a tilted mirror;
    depositing an index matching material into the space between the unetched portion of the waveguide and the tilted mirror so that light propagating through the waveguide into the space continues through the index matching material to the tilted mirror, and the tilted mirror reflects the light upwardly; and
    depositing an antireflective coating over the tilted mirror and the index matching material.

11. The method of claim 1, further comprising laterally patterning the index matching material to form a waveguide ridge that adjoins a waveguide ridge of the unetched portion of the waveguide.

12. The method of claim 11, wherein laterally patterning the index matching material to form the waveguide ridge comprises patterning the index matching material with a profile that tapers outwardly from an initial width matching the waveguide ridge of the unetched portion of the waveguide, to a final width proximate the tilted mirror so that a beam size of the light propagating through the waveguide expands as it propagates toward the tilted mirror.

13. The method of claim 3, wherein the index matching material is one of amorphous silicon and polysilicon.

14. The method of claim 3, wherein the index matching material is amorphous silicon, and further comprising annealing the amorphous silicon, to convert the amorphous silicon to polysilicon.

15. The method of claim 7, wherein the index matching material is one of amorphous silicon and polysilicon.

16. The method of claim 7, wherein the index matching material is amorphous silicon, and further comprising annealing the amorphous silicon, to convert the amorphous silicon to polysilicon.

17. The method of claim 8, wherein the index matching material is one of amorphous silicon and polysilicon.

18. The method of claim 8, wherein the index matching material is amorphous silicon, and further comprising annealing the amorphous silicon, to convert the amorphous silicon to polysilicon.

19. The method of claim 10, wherein the index matching material is one of amorphous silicon and polysilicon.

20. The method of claim 10, wherein the index matching material is amorphous silicon, and further comprising annealing the amorphous silicon, to convert the amorphous silicon to polysilicon.

\* \* \* \* \*